United States Patent [19]

Miyazaki et al.

[11] Patent Number: 5,671,212
[45] Date of Patent: Sep. 23, 1997

[54] DISC CARTRIDGE

[75] Inventors: Benichi Miyazaki, Katano; Yukio Nishino, Nara-ken; Junichi Murai, Kobe, all of Japan

[73] Assignee: Matsushita Electric Industrial Co., Ltd., Osaka, Japan

[21] Appl. No.: 389,966

[22] Filed: Feb. 16, 1995

Related U.S. Application Data

[63] Continuation of Ser. No. 90,535, Jul. 13, 1993, abandoned.

[30] Foreign Application Priority Data

| Jul. 15, 1992 | [JP] | Japan | 4-187774 |
| Sep. 1, 1992 | [JP] | Japan | 4-233358 |
| Sep. 2, 1992 | [JP] | Japan | 4-234410 |
| Dec. 8, 1992 | [JP] | Japan | 4-327751 |

[51] Int. Cl.⁶ .................................. G11B 23/04
[52] U.S. Cl. .................................. 369/291
[58] Field of Search .................. 369/291; 360/133

[56] References Cited

U.S. PATENT DOCUMENTS

| 4,740,948 | 4/1988 | Nakamori et al. | 369/291 |
| 4,876,619 | 10/1989 | Suzuki | 369/291 |
| 4,945,530 | 7/1990 | Sandell et al. | 369/291 |
| 5,063,558 | 11/1991 | Takahashi | 360/133 |
| 5,077,625 | 12/1991 | Shiba et al. | 360/133 |
| 5,153,801 | 10/1992 | Ikebe et al. | 360/133 |

FOREIGN PATENT DOCUMENTS

| 0 164 647 | 12/1985 | European Pat. Off. |
| 0 440 175 | 8/1991 | European Pat. Off. |
| 0 448 320 | 9/1991 | European Pat. Off. |
| 39 08 032 | 10/1989 | Germany |
| 61-983 | 1/1986 | Japan |

OTHER PUBLICATIONS

Patent Abstracts of Japan, vol. 15, No. 382 (P-1257) Sep. 26, 1991.

Patant Abstracts of Japan, vol. 13, No. 403 (P-929) Sep. 7, 1989.

Patent Abstracts of Japan, vol. 10, No. 147 (P-460) May 29, 1986.

Primary Examiner—Stuart S. Levy
Assistant Examiner—George J. Letscher
Attorney, Agent, or Firm—Wenderoth, Lind & Ponack

[57] ABSTRACT

A disc cartridge has a casing having first and second apertures and first and second shutters slidably mounted to the casing for selectively opening and closing the first and second apertures. First and second shutter openers are respectively connected to the first and second shutters. Only the first aperture is opened using the first shutter opener when the disc cartridge is loaded in a standard specifications or existing recording and/or reproducing apparatus. When the disc cartridge is loaded in an optional specifications apparatus, both the first and second shutter openers are used to open the first and second apertures, respectively. A disc cartridge compatible with both new plural head recording and reproducing apparatuses and existing single head recording and reproducing apparatuses is thus provided while offering improved resistance to penetration of dust and other foreign matter into the casing by opening only the aperture(s) required for head insertion.

8 Claims, 30 Drawing Sheets

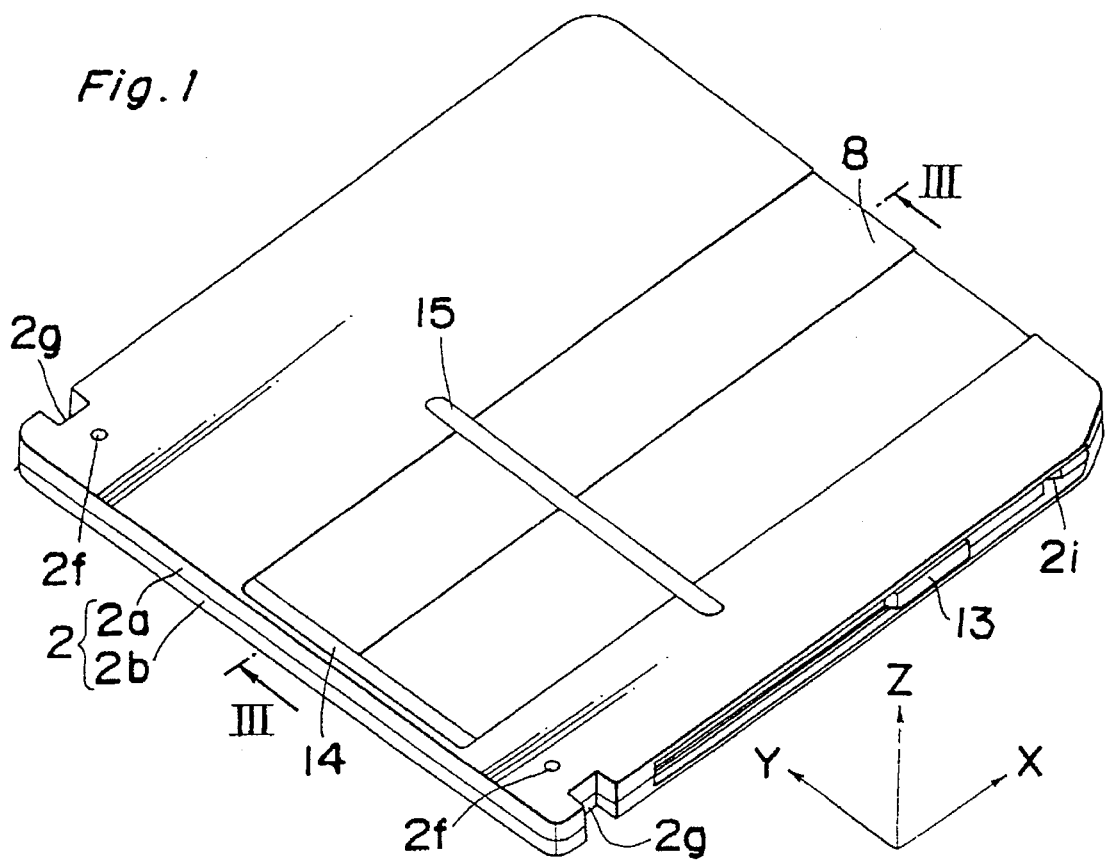
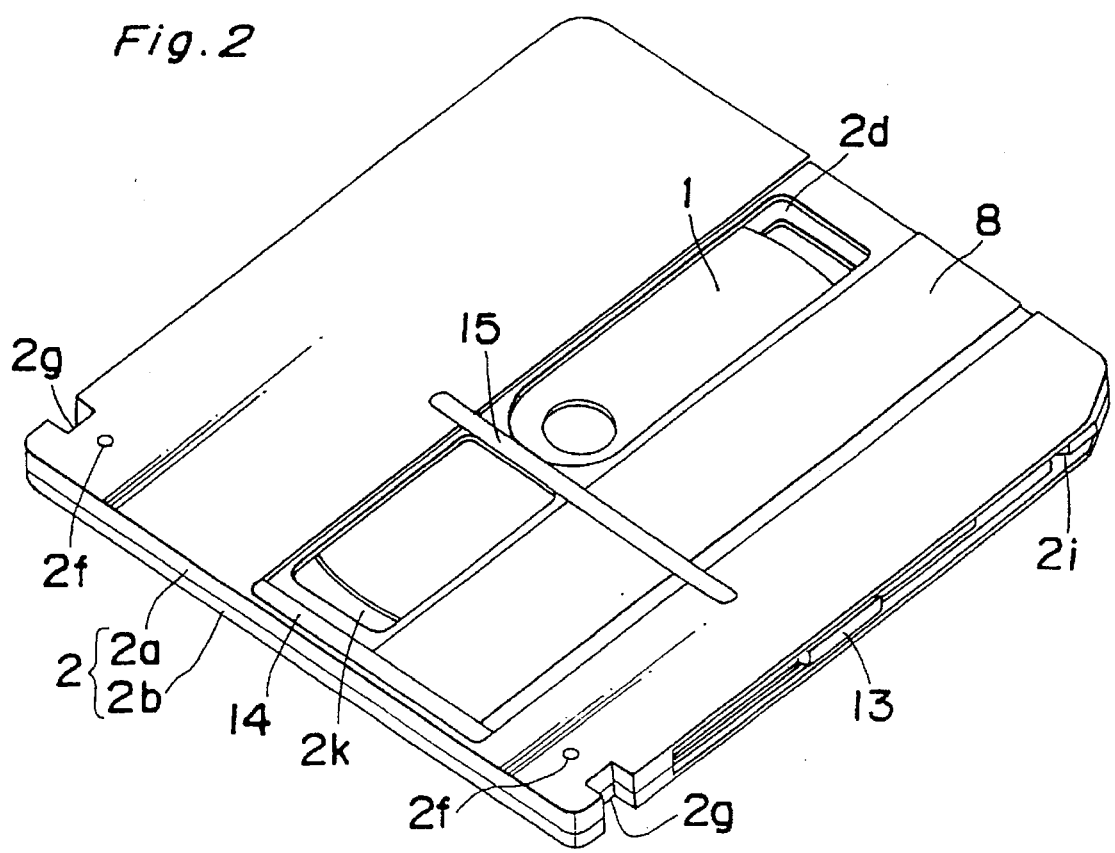

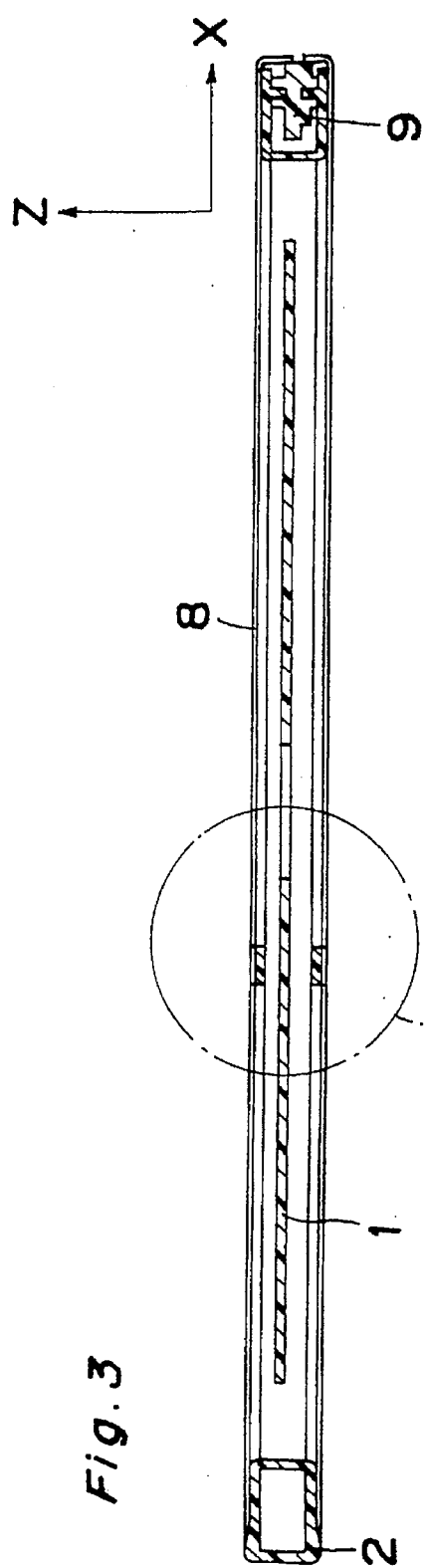
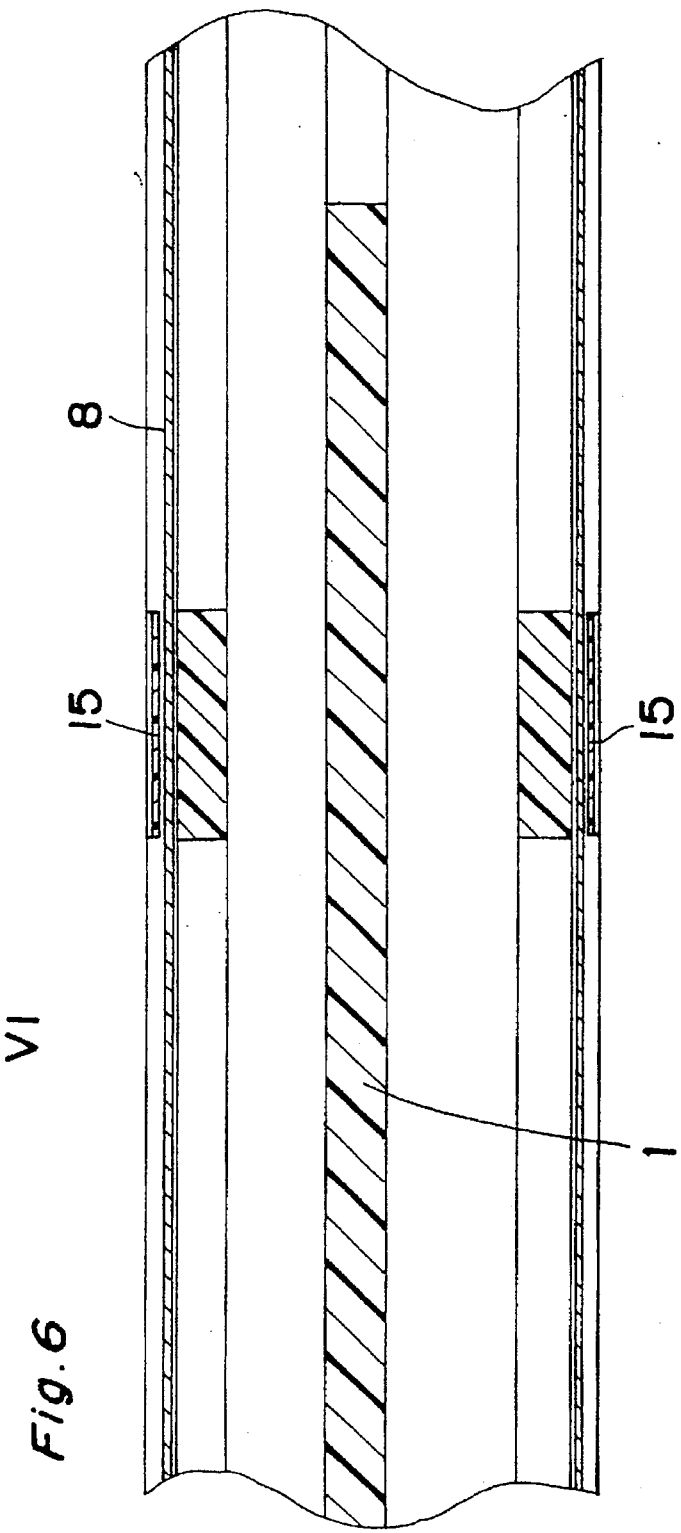
Fig.3
Fig.6

Fig.9
Fig.10
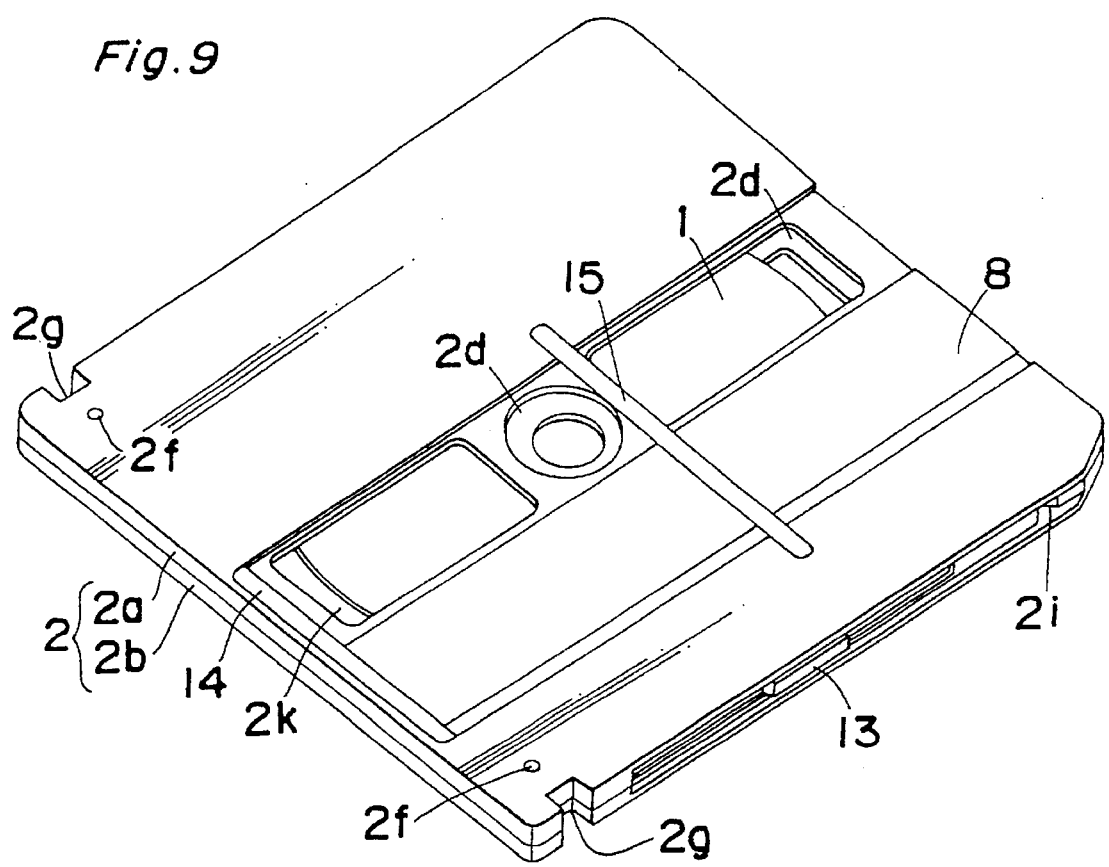
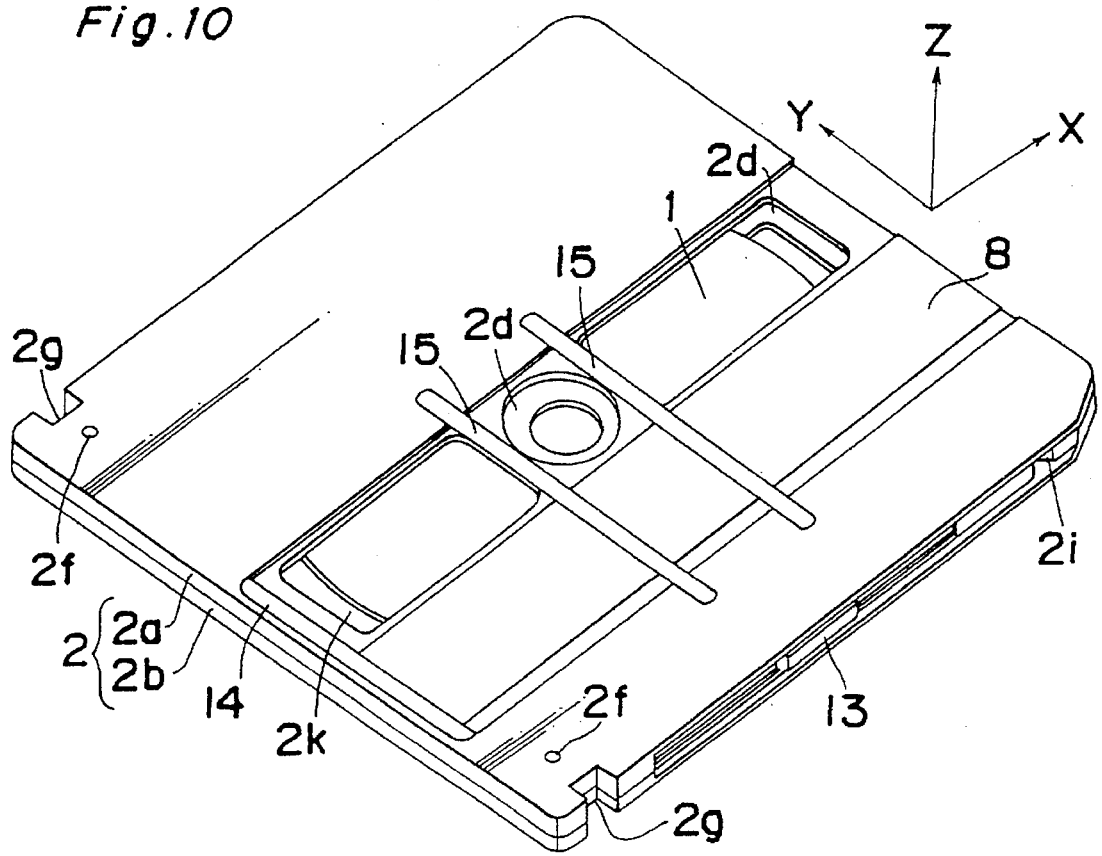

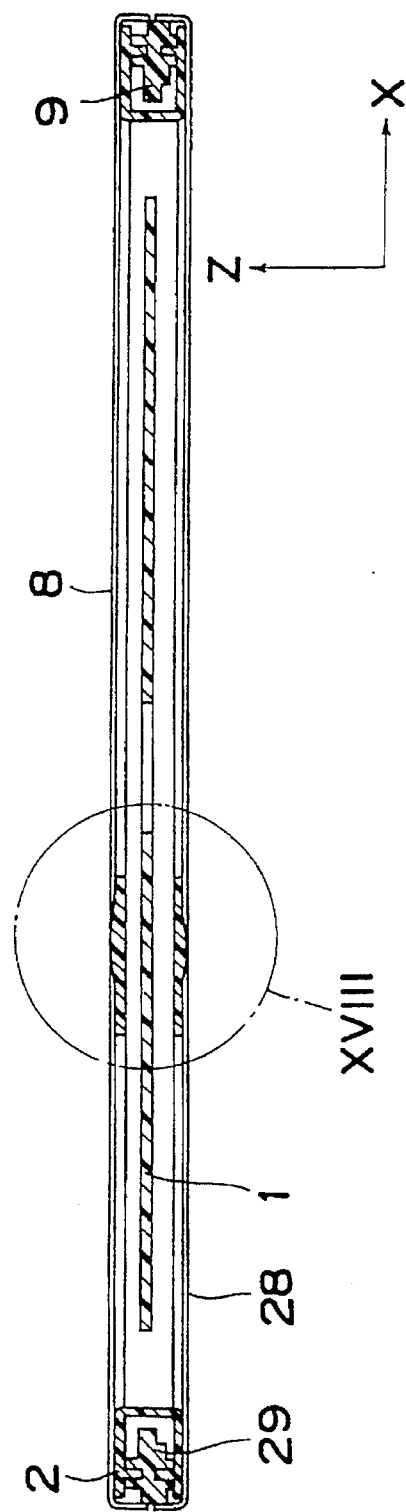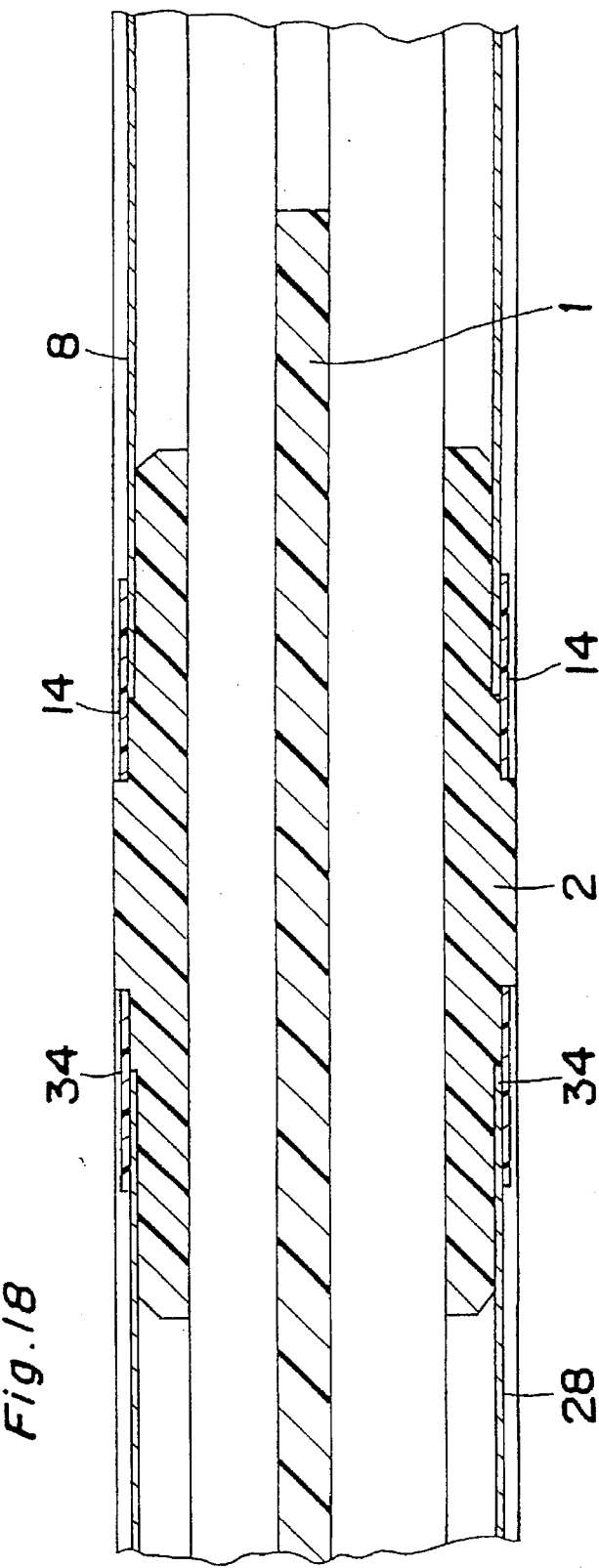

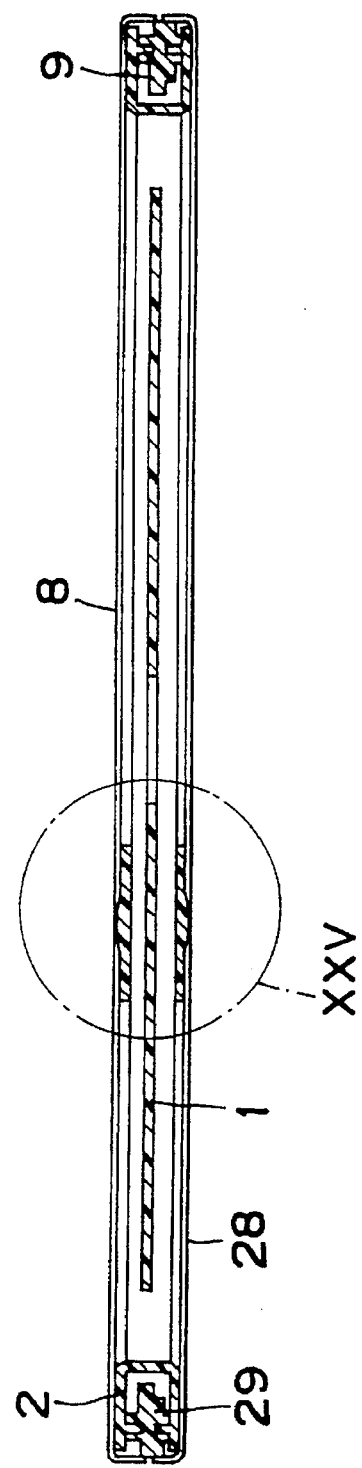
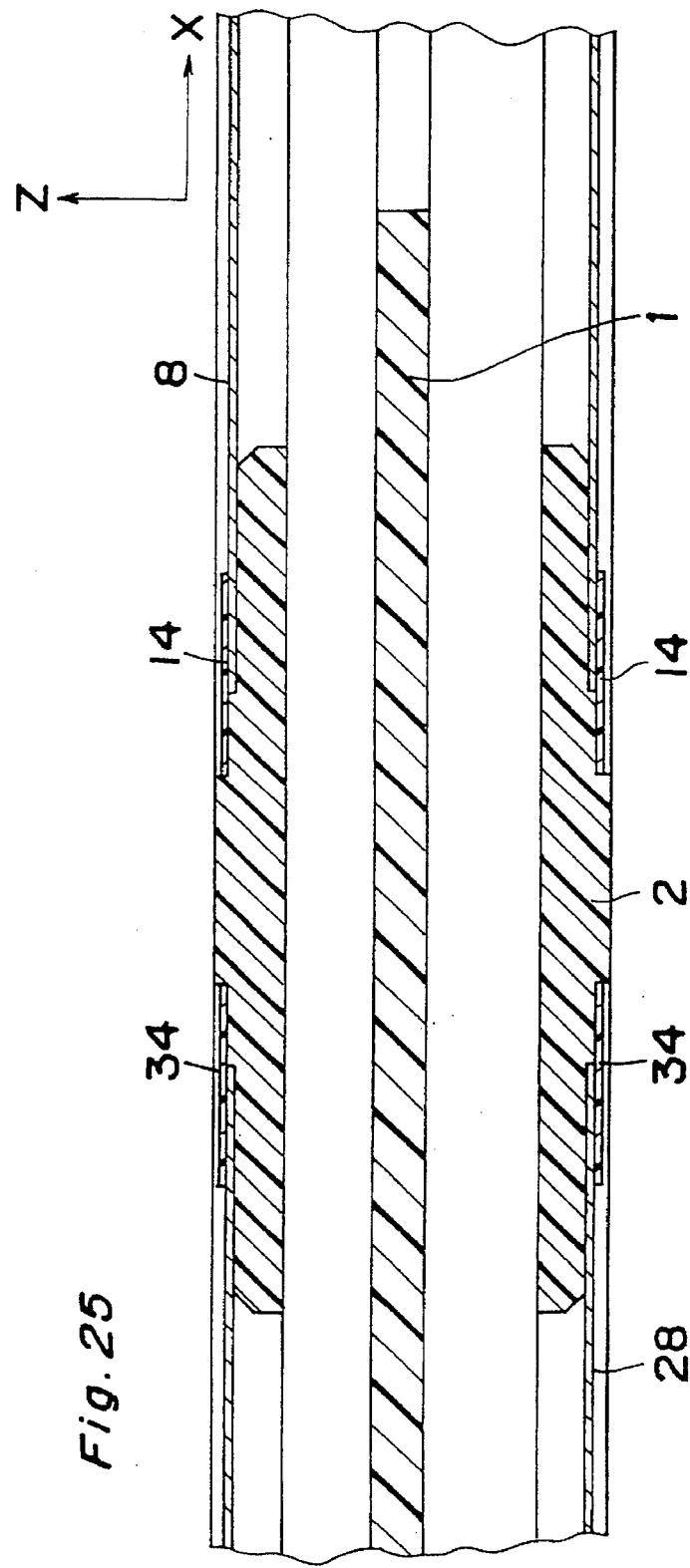

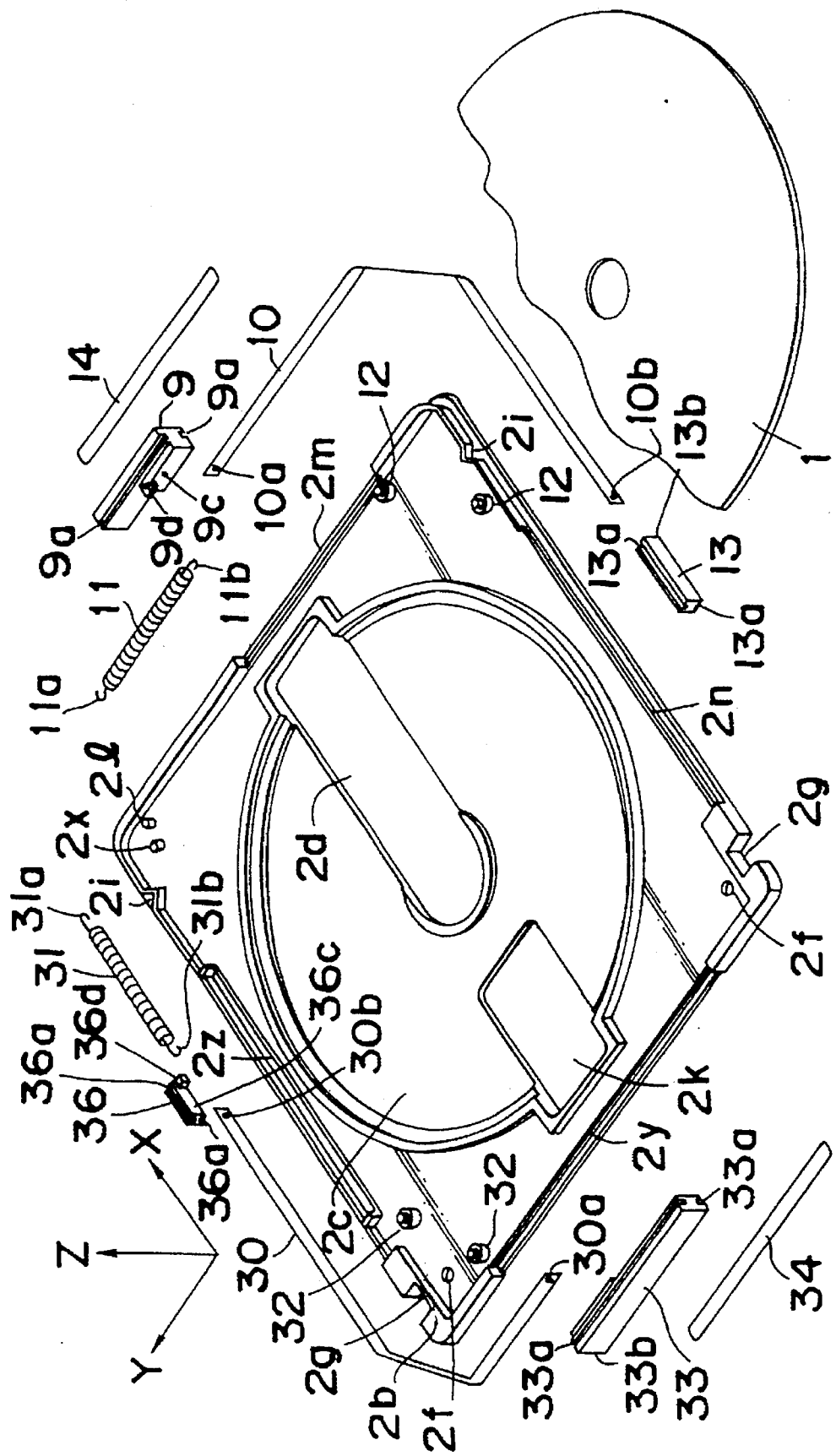

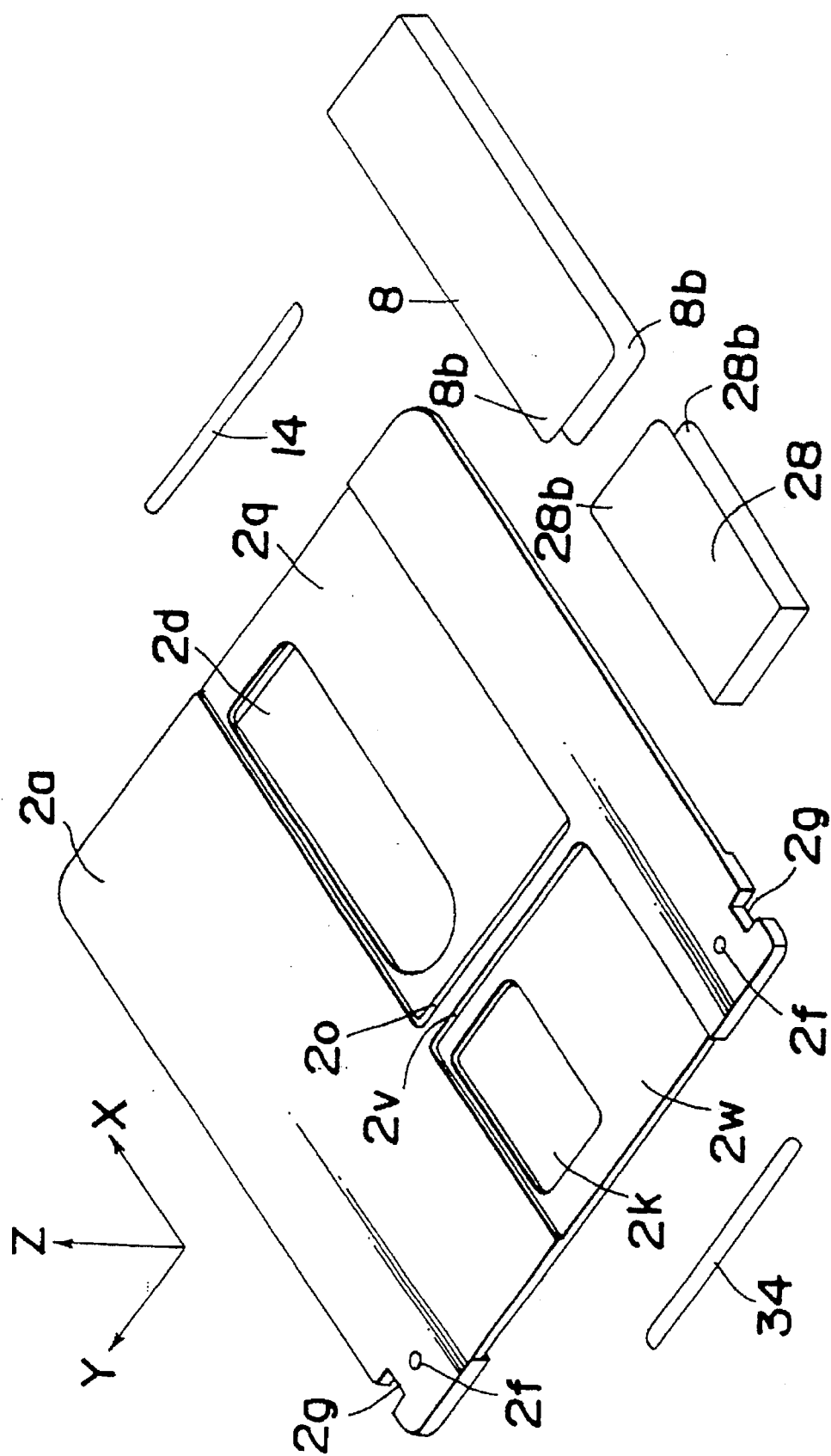

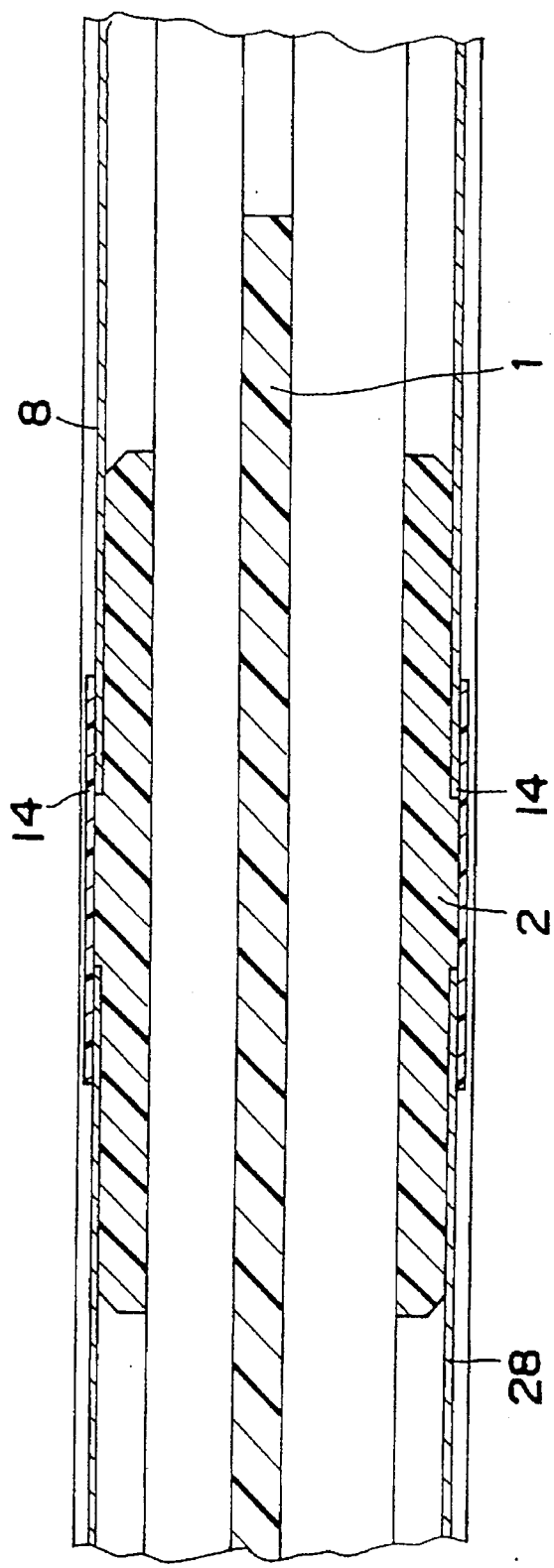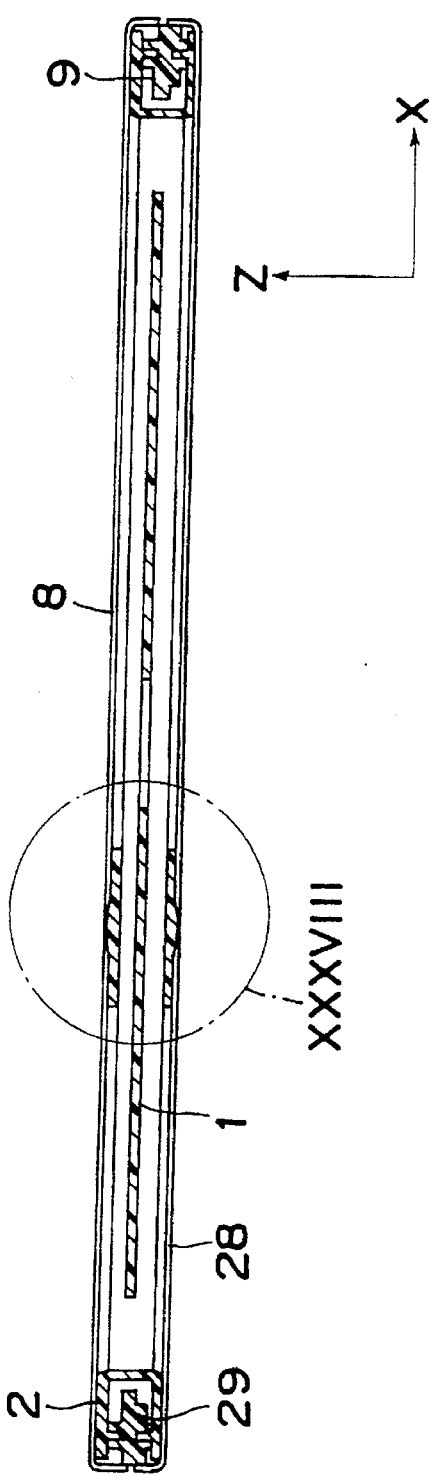

DISC CARTRIDGE

This application is a continuation of now abandoned application, Ser. No. 08/090,535, filed Jul. 13, 1993 now abandoned.

BACKGROUND OF THE INVENTION

1. Field of the Invention

The present invention relates generally to a disc cartridge for accommodating a disc for use in a recording and/or reproducing apparatus which records or reproduces information on or from business image files, computer data files, or other editable data files, or for use in a reproducing apparatus such as, for example, a CD player. In particular, the present invention relates to a disc cartridge for use in a recording and/or reproducing apparatus having a plurality of heads.

2. Description of the Prior Art

Discs such as optical discs used for data storage are usually accommodated in a disc cartridge which is then loaded into a recording and/or reproducing apparatus because of concerns about dust, fingerprints, and other foreign contaminants adhering to the disc surface. The disc cartridge usually has an aperture enabling insertion of heads and a disc drive motor spindle, and a shutter to open and close the aperture.

In the disc cartridge described in Japanese Laid-open Patent Publication (unexamined) No. 61-983 (filed on Jun. 12, 1984), plural apertures enabling compatibility with plural heads on a single side of the disc are provided, and a single shutter opens and closes the plural apertures.

In this disc cartridge, the plural apertures enabling insertion of the motor spindle and the plural heads are provided in-line in a casing, and the shutter of a rectangular box-like structure is slidably accommodated in the casing to open and close the plural apertures.

In this type of disc cartridge, however, the shutter is relatively long radially to the disc because the plural in-line apertures are opened and closed by the single shutter. This shutter dimension becomes particularly long with large diameter discs having a diameter of 300 mm or greater. The shutter thus tends to flex in a direction longitudinally thereof, allowing dust and other foreign matter to enter from a gap between the shutter and the casing, and even causing the shutter to contact the disc surface.

SUMMARY OF THE INVENTION

The present invention has been developed to overcome the above-described disadvantages.

It is accordingly an object of the present invention to provide a highly reliable disc cartridge which provides better protection against the entry of dust and other foreign matter into the casing, and prevents contact between the shutter and the disc. In particular, a disc cartridge compatible with plural heads accessing a single side of the disc is provided.

In accomplishing the above and other objects, a disc cartridge according to the present invention comprises a casing having a disc cavity defined therein for accommodating a rotatable disc therein and also having a first aperture defined therein to enable insertion of a disc motor spindle and a first head of a recording and/or reproducing apparatus therethrough when the disc cartridge is loaded in such an apparatus, and a shutter mounted on the casing for sliding movement between open and closed positions, said shutter in the closed position closing the first aperture. At least one shutter retainer is secured to the casing at a position corresponding to a non-data area of the disc to retain and guide a generally middle portion of the shutter.

Preferably, a second aperture is defined in the casing in line with, and on one side of a center of the disc opposite to, the first aperture, to enable insertion of a second head of the recording and/or reproducing apparatus therethrough when the disc cartridge is loaded in such an apparatus. In this case, the shutter also closes the second aperture when in the closed position.

In another form of the present invention, a disc cartridge comprises a casing having a disc cavity defined therein for accommodating the disc therein and also having a first aperture defined therein to enable insertion of a disc motor spindle and a first head of a recording and/or reproducing apparatus therethrough when the disc cartridge is loaded in such an apparatus, and first and second shutters mounted on the casing for sliding movement between open and closed positions. The first shutter in its closed position closes the first aperture, whereas the second shutter in its closed position closes the second aperture.

This disc cartridge will preferably further comprise a first shutter opening member connected to the first shutter for opening the first shutter and a second shutter opening member connected to the second shutter for opening the second shutter. Both of the first and second shutter opening members are exposed to the outside of the casing.

The first and second shutter opening members may be replaced by a common shutter opening member connected to both the first and second shutters and exposed to the outside of the casing.

This disc cartridge will preferably further comprise a shutter retainer for retaining and guiding ends of both the first and second shutters.

In a another form of the present invention, a disc cartridge is operable with any one of a first recording and/or reproducing apparatus having at least first and second heads and with a second recording and/or reproducing apparatus having a single head. This disc cartridge comprises a casing having a disc cavity defined therein for accommodating a rotatable disc therein and also having first and second apertures defined therein in line with each other. The first aperture is provided to enable insertion of both a disc motor spindle and any one of the first and single heads therethrough when the disc cartridge is loaded in any one of the first and second apparatuses, whereas the second aperture is provided to enable insertion of the second head of the first apparatus therethrough when the disc cartridge is loaded in the first apparatus. A positioning means is defined in the casing and is cooperable with any one of the first and second apparatuses to enable the casing to be loaded to a predetermined position within any one of the first and second apparatuses.

This disc cartridge will preferably further comprise a shutter mounted on the casing for sliding movement between open and closed positions, said shutter in the closed position closing at least the first aperture, and a shutter opening member connected to the shutter and exposed to the outside of the casing for opening the shutter when the disc cartridge is loaded in any one of the first and second apparatuses.

In the above-described construction, the movement of a middle portion of the shutter in a direction perpendicular to the casing is restricted by the shutter retainer mounted on the casing at a position corresponding to the non-data area positioned radially inwardly of the disc. Accordingly, the disc cartridge according to the present invention is highly reliable in that flexing of the shutter is suppressed, penetration of dust and other foreign matter into the casing is reliably prevented, and shutter-disc contact is prevented without reducing a data area of the disc. In addition, by providing a single shutter to selectively open and close both the first and second apertures on the casing, the disc cartridge can be used with recording and reproducing apparatuses having plural heads on one or both sides of the disc, and plural apertures can be closed by a single shutter, thus reducing cost, simplifying construction, and reducing the number of parts while more effectively preventing the penetration of dust and other foreign matter into the casing.

By alternatively providing the first shutter to selectively open and close the first aperture and the second shutter to selectively open and close the second aperture, the disc cartridge can be used with recording and reproducing apparatuses having plural heads on one or both sides of the disc, and the length of each shutter can be shortened, thus providing a highly reliable disc cartridge whereby penetration of dust and other foreign matter into the casing is reliably prevented, and shutter-disc contact is prevented.

By enabling the first and second shutters to open and close independently to open only the required aperture, penetration of dust and other foreign matter into the casing can be even more effectively prevented.

By connecting the first and second shutters, the shutter opening and closing operation by a loading mechanism of the recording and/or reproducing apparatus can be simplified, reducing the number of parts, and achieving a low cost disc cartridge. The number of parts and thus cost can be further reduced by guiding the ends of both the shutters using a single member.

A disc cartridge compatible with plural heads provided on one or both sides of the disc, and that can be used with both new recording and reproducing apparatuses having plural heads and conventional or existing recording and reproducing apparatuses with a single head, can be provided. By maintaining compatibility with conventional casing designs in the shutter opening and closing mechanism, the shutter can be automatically opened and closed during loading and unloading in both new recording and reproducing apparatuses with plural heads and conventional recording and reproducing apparatuses with a single head.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein:

FIG. 1 is a perspective view of a first embodiment of a disc cartridge according to the present invention when not loaded in a recording and/or reproducing apparatus;

FIG. 2 is a perspective view of the disc cartridge of FIG. 1 when loaded and positioned in the recording and/or reproducing apparatus;

FIG. 3 is a cross-sectional view taken along line III—III in FIG. 1;

FIG. 6 is an enlarged cross-sectional view of part VI in FIG. 3;

FIG. 9 is a view similar to FIG. 2 but showing another modification of the first embodiment;

FIG. 10 is a view similar to FIG. 2 but showing a further modification of the first embodiment;

FIG. 15 is a cross-sectional view taken along line XV—XV in FIG. 12;

FIG. 18 is an enlarged cross-sectional view of part XVIII in FIG. 15;

FIG. 22 is a cross-sectional view taken along line XXII—XXII in FIG. 19;

FIG. 23 is a partially exploded perspective view of the disc cartridge of FIG. 19;

FIG. 24 is another partially exploded perspective view of the disc cartridge of FIG. 19;

FIG. 25 is an enlarged cross-sectional view of part XXV in FIG. 22;

FIG. 32 is an enlarged cross-sectional view of essential components of the disc cartridge of FIG. 30;

FIG. 35 is a cross-sectional view taken along line XXXV—XXXV in FIG. 33;

DETAILED DESCRIPTION OF THE PREFERRED EMBODIMENTS

Figure 4:
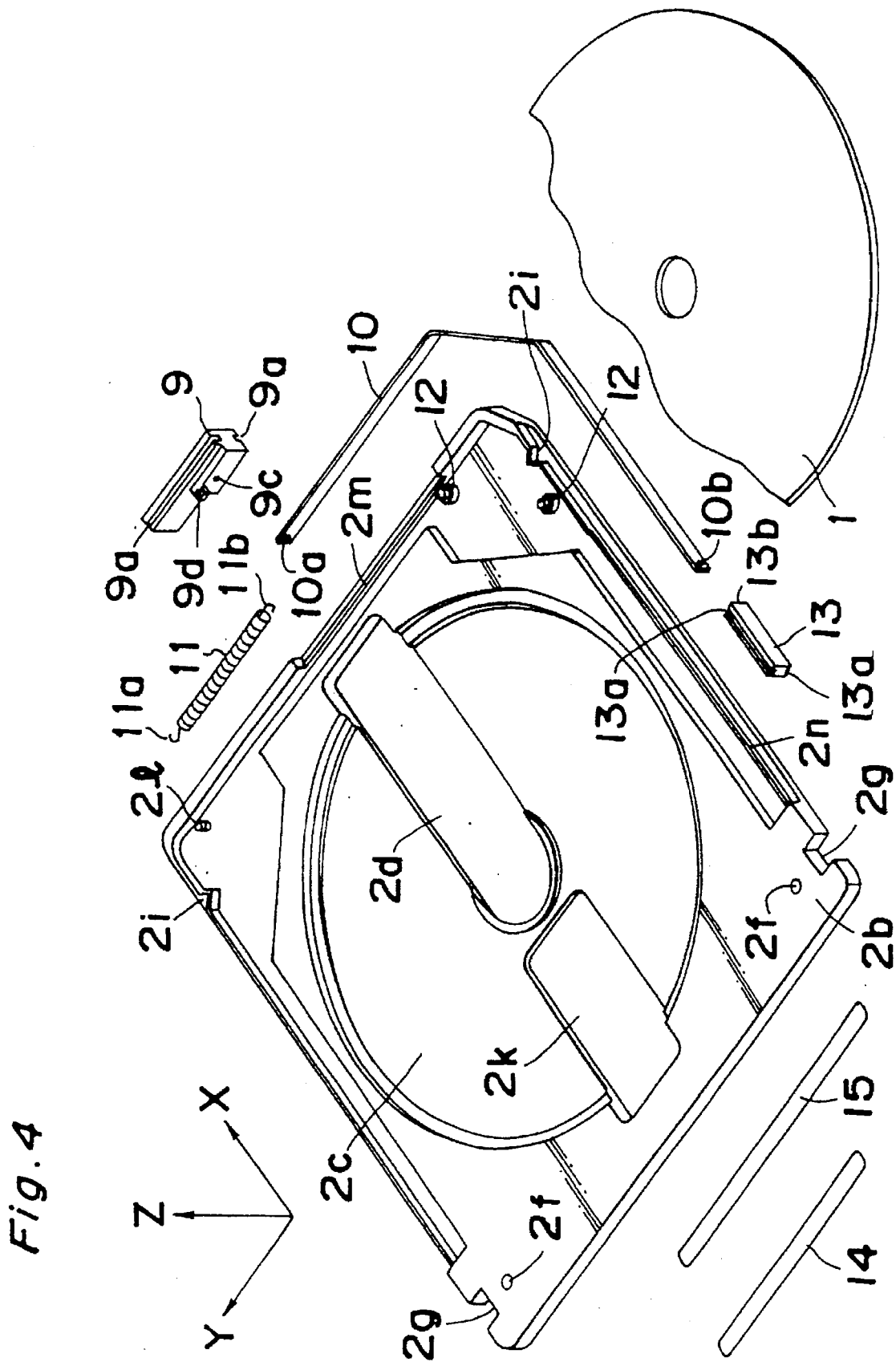
FIG. 4 is a partially exploded perspective view of the disc cartridge of FIG. 1.
Figure 5:
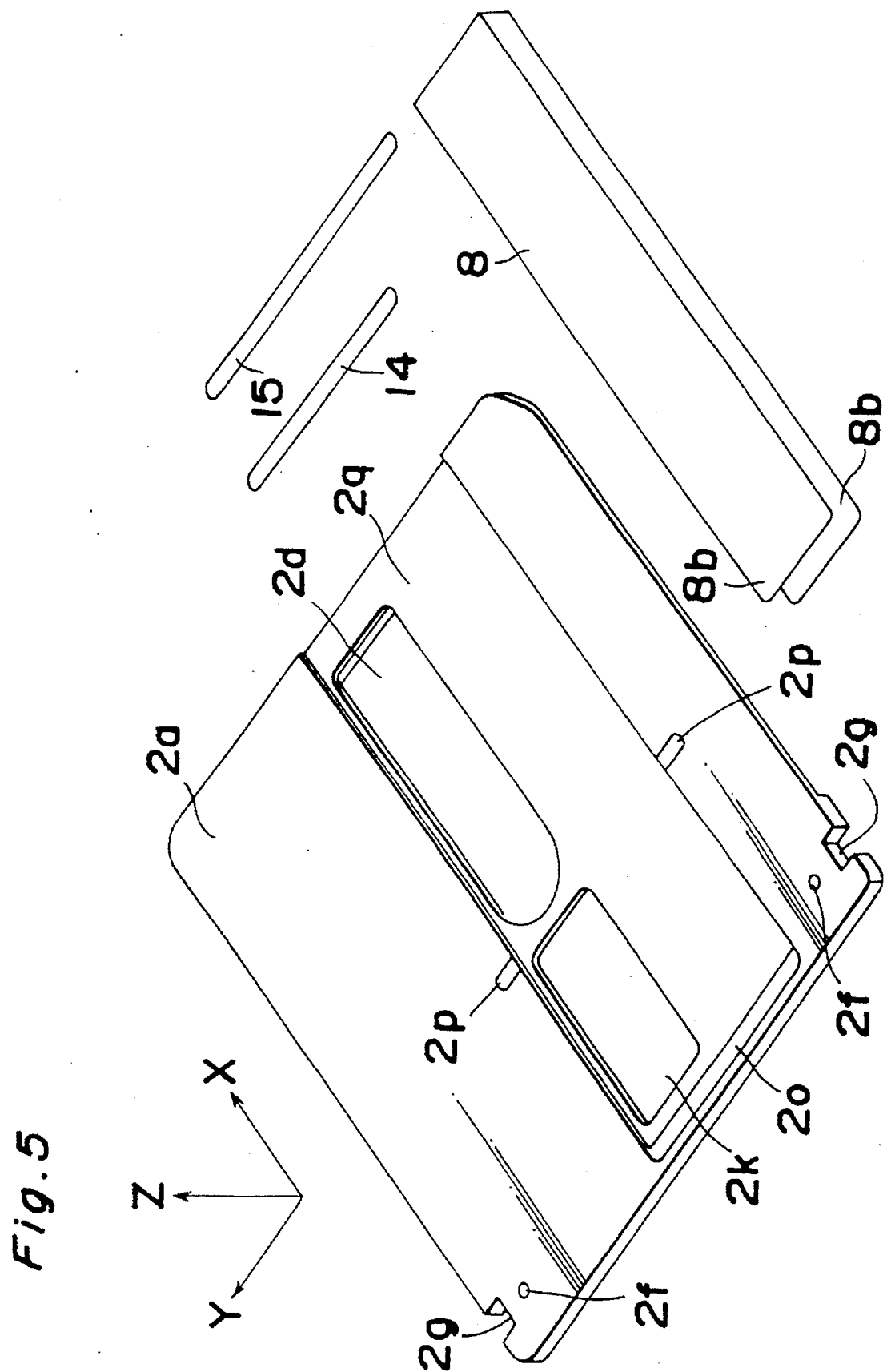
FIG. 5 is another partially exploded perspective view of the disc cartridge of FIG. 1.
Figure 7:
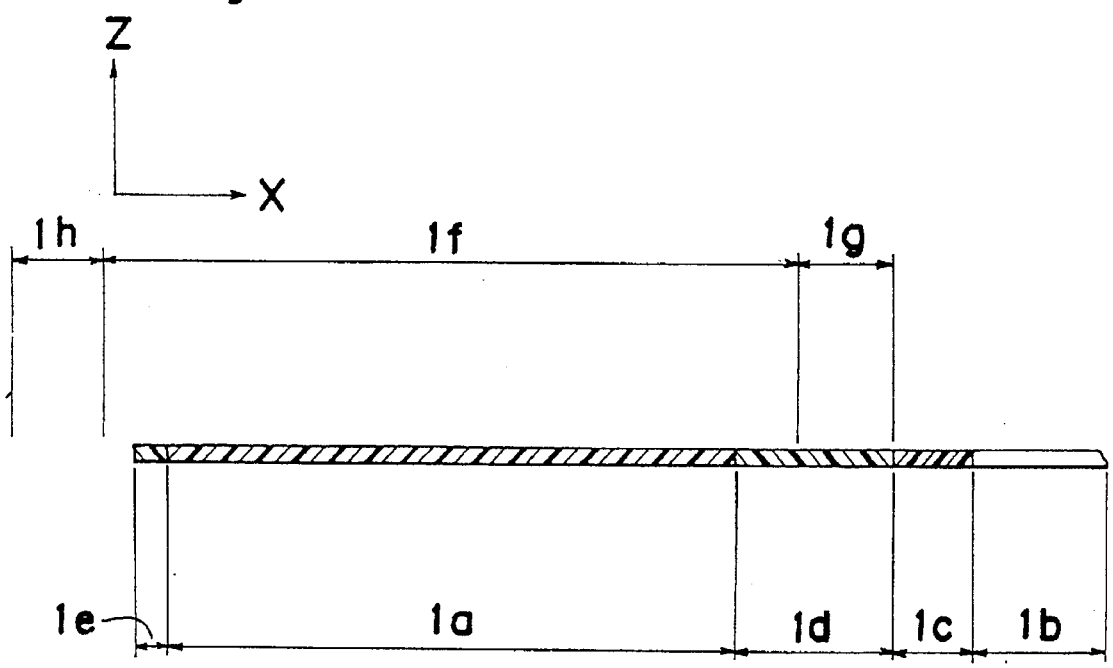
FIG. 7 is a schematic view indicating various areas of a disc accommodated in the disc cartridge of FIG. 1.

Referring now to the drawings, there is shown in FIGS. 1 through 7 a first embodiment of a disc cartridge according to the present invention.

Note that a recording and/or reproducing apparatus is not shown in FIGS. 1 and 2.

As shown in FIGS. 1 through 7, a disc 1 has a recording surface on one or both sides. Data such as, for example, user data or control data are recorded on and read from a data area $1a$. A center hole area $1b$ is provided coaxially to a disc motor spindle (not shown in the figures) of the recording and/or reproducing apparatus, and is the area whereby the disc 1 is mounted on the disc motor spindle. A turntable area $1c$ is the part of the disc 1 that rides on a turntable (not shown in the figures) of the disc motor when the disc is loaded in the apparatus. A non-data area $1d$ is provided radially inwardly of the data area $1a$ and radially outwardly of the turntable area $1c$, and no data is recorded on or reproduced from the non-data area $1d$. Another non-data area $1e$ is provided radially outwardly of the data area $1a$, and no data is recorded on or reproduced from the non-data area $1e$.

A head movement area $1f$ is the area through which the head (not shown in the figures) moves when recording or reproducing data on or from the data area $1a$. When data is recorded on or reproduced from the inner circumferential portion of the data area $1a$, the head projects outside the data area $1a$ to the +X axis side. When data is recorded on or reproduced from the outer circumferential portion of the data area $1a$, the head projects outside the data area $1a$ to the −X axis side. The head movement area $1f$ is therefore wider than the data area $1a$ by an amount equal to the width of the head extending beyond the data area $1a$ at each of the inner and outer circumferences of the data area.

An optimum shutter middle retainer area $1g$ is positioned radially inwardly of the head movement area $1f$ and overlaps the inner circumferential portion of the inside non-data area $1d$, and is the area at which a shutter middle retainer 15 (described below) should be positioned for greatest effectiveness. One end of a head support member or ends of head support members (e.g., two guide shafts), which support and allow movement of the head in the X direction, i.e., radially to the disc, are mounted on that part of the apparatus which is opposed to the optimum shutter middle retainer area $1g$.

An optimum shutter retainer area $1h$ is positioned radially outwardly of the head movement area $1f$, and is the area at which a shutter retainer 14 (described below) should be positioned for greatest effectiveness.

A casing 2 is formed by a top half $2a$ and a bottom half $2b$ fastened together by screws or heat fusion. The top and bottom halves $2a$, $2b$ are molded from acrylonitrile-butadiene-styrene (ABS) resin or another resin to form a disc cavity or pocket $2c$ in which the disc 1 is held inside the casing 2 when the two halves $2a$ and $2b$ are joined. Two apertures $2d$ and $2k$ are formed in the casing 2.

The first aperture $2d$ allows insertion of a first head, a disc motor spindle, and a disc clamp from the apparatus. The second aperture $2k$ is provided in line with the first aperture $2d$ in a direction of insertion of the disc 1 to the apparatus, and allows insertion of a second head provided in the apparatus.

Positioning holes $2f$, one of which is round and the other oval (both shown as being round in the figures), are used to correctly position the casing 2 when loaded in the apparatus. Positioning notches $2g$ are provided for compatibility with stocker type or so-called juke-box type apparatus which accommodate plural disc cartridges and automatically load and unload them. The positioning notches $2g$ specifically enable chucking in an automatic loading and unloading mechanism. V-shaped positioning notches $2i$ enable chucking when the disc cartridge is loaded in the apparatus. A pin $2l$ is used to hold one end $11a$ of a spring 11, which is discussed later.

A channel $9a$ in a shutter guide 9 rides on a rail $2m$. A channel $13a$ in a shutter opener 13 rides on a rail $2n$. A positioning channel $2o$ in which the shutter retainer 14 is mounted is provided at a position corresponding to the optimum shutter retainer area $1h$ of the disc 1. A positioning channel $2p$ in which the shutter middle retainer 15 is mounted is provided at a position corresponding to the optimum shutter middle retainer area $1g$ of the disc 1. A channel $2q$ enabling a shutter 8 to slide in the Y direction is formed at a position lower than both the positioning channels $2o$ and $2p$.

The shutter 8 simultaneously opens and closes both the first aperture $2d$ and second aperture $2k$. The shutter guide 9 holds the shutter 8 with screws, for example, with the channel $9a$ receiving the rail $2m$ to enable sliding in the Y direction, thus forming a guide whereby the shutter 8 slides in the Y direction relative to the casing 2. The shutter guide 9 is preferably of polyacetal or another resin providing the lowest possible sliding resistance and wear when moved against the mating material (i.e., the ABS casing 2 in this embodiment).

A belt 10 has one end $10a$ secured by, for example, a screw to a screw hole $9c$ in the shutter guide 9, and the other end 10b secured by, for example, a screw to the shutter opener 13. The belt 10 is guided by pulleys 12 mounted in the casing 2.

One end 11a of the spring 11 is caught on the pin 2l in the casing 2, and the other end 11b is hooked in a hole 9d of the shutter guide 9. When the disc cartridge is not loaded in the apparatus, i.e., when it is not in use, the spring 11 pulls the shutter 8 closed over the first aperture 2d and second aperture 2k.

The shutter opener 13 fits over the rail 2n, and slides in the X direction. The shutter retainer 14 extends in the Y direction and is fastened to the positioning channel 2o with adhesive, for example, with an end 8b of the shutter 8 held between the shutter retainer 14 and the channel 2q, thus preventing the end 8b of the shutter 8 from lifting up in the Z direction.

The shutter middle retainer 15 extends parallel to the shutter retainer 14 and is fastened to the positioning channel 2p with adhesive, for example, with the middle of the shutter 8 held between the shutter middle retainer 15 and the channel 2q, thus preventing the middle of the shutter 8 from lifting up in the Z direction. The shutter middle retainer 15 thus reduces bending of the shutter 8 in the X direction, and reduces the gap between the shutter 8 and casing 2.

The operation of the first embodiment of the present invention thus comprised is described below.

The operation whereby the disc cartridge is loaded and positioned in the apparatus is described first.

When the disc cartridge is held at the −X axis side thereof and inserted into the apparatus, the positioning notches 2i in the casing 2 are chucked by holding pins of a cartridge guide mechanism of the apparatus, and the disc cartridge is thus guided in the +X direction, i.e., into the apparatus.

When the end 13b of the shutter opener 13 is caught by a claw in the apparatus, a +X direction movement of the casing 2 causes the shutter opener 13 to move in the −X direction relative to the casing 2. The belt 10 connected to the shutter opener 13 thus pulls the spring 11, and the shutter 8 moves in the −Y direction to fully open the first aperture 2d and second aperture 2k.

The casing 2 is accurately positioned by, for example, positioning pins of the apparatus using the positioning holes 2f. The disc motor spindle and disc clamp of the apparatus are inserted through the first aperture 2d, and the disc 1 is thus clamped by the clamp coaxially to the disc motor turntable. A total of four heads may be inserted using the first aperture 2d and second aperture 2k on each side of the disc 1 with a first head and a second head received in the respective apertures. It is thereby possible to record, read, and erase data from the disc.

The operation whereby the disc cartridge is ejected from the apparatus is described next.

When the positioning of the casing 2 by the use of the positioning holes 2f is released, the disc clamp is also released, the disc motor spindle and clamp of the apparatus are removed from the first aperture 2d, and the first and second heads are removed from the first aperture 2d and second aperture 2k, respectively.

The disc cartridge is then ejected by essentially the reverse of the loading operation. It follows that when the positioning notches 2i are unchucked and the apparatus claw disengages from the end 13b of the shutter opener 13, the restoring force of the spring 11 moves the shutter 8 in the +Y direction to completely close the first aperture 2d and second aperture 2k. The shutter opener 13 is also moved in the +X direction via the belt 10.

When the disc cartridge is ejected from the apparatus, the permanent tension of the spring 11 on the shutter 8 closes both the first aperture 2d and second aperture 2k.

By guiding the middle of the shutter 8 at a position corresponding to the inside non-data area 1d of the disc 1 (and particularly the optimum shutter middle retainer area 1g in this first embodiment) using the shutter middle retainer 15 provided on the casing 2, a highly reliable disc cartridge can be provided wherein flexing of the shutter 8 can be effectively suppressed, penetration of dust and other foreign matter to the casing 2 can be prevented, and contact between the shutter 8 and disc 1 can be prevented without reducing the size of the data area 1a.

By providing the second aperture 2k in line with the first aperture 2d on the opposite side of the center of the disc 1, and providing a single shutter 8 in the casing 2 to open and close both the first aperture 2d and second aperture 2k, the disc cartridge can be used with an apparatus having plural heads on one or both sides of the disc. This disc cartridge is specifically compatible with an apparatus having a total of four heads, two heads on each side of the disc with one head received in each of the apertures on each side of the disc. In addition, because plural apertures are opened and closed by a single shutter 8, a disc cartridge with real practical effectiveness can be provided at a low cost, simple construction, and with a small number of parts while efficiently preventing penetration of dust and other foreign matter inside the casing 2.

It is to be noted that the position of the shutter middle retainer 15 in the X direction corresponds to the optimum shutter middle retainer area 1g of the disc 1 in this embodiment, but it is sufficient if the shutter middle retainer 15 is positioned as corresponding to the inside non-data area 1d of the disc 1. Accordingly, the shutter middle retainer 15 may be positioned near the data area 1a in the inside non-data area 1d. When provided near the data area 1a, however, the head movement area if will be restricted, imposing certain limits on the apparatus, and particularly on the head configuration. It is therefore preferred for the shutter middle retainer 15 to be provided near the turntable area 1c, i.e., at the optimum shutter middle retainer area 1g, as described in the above embodiment.

Figure 8:
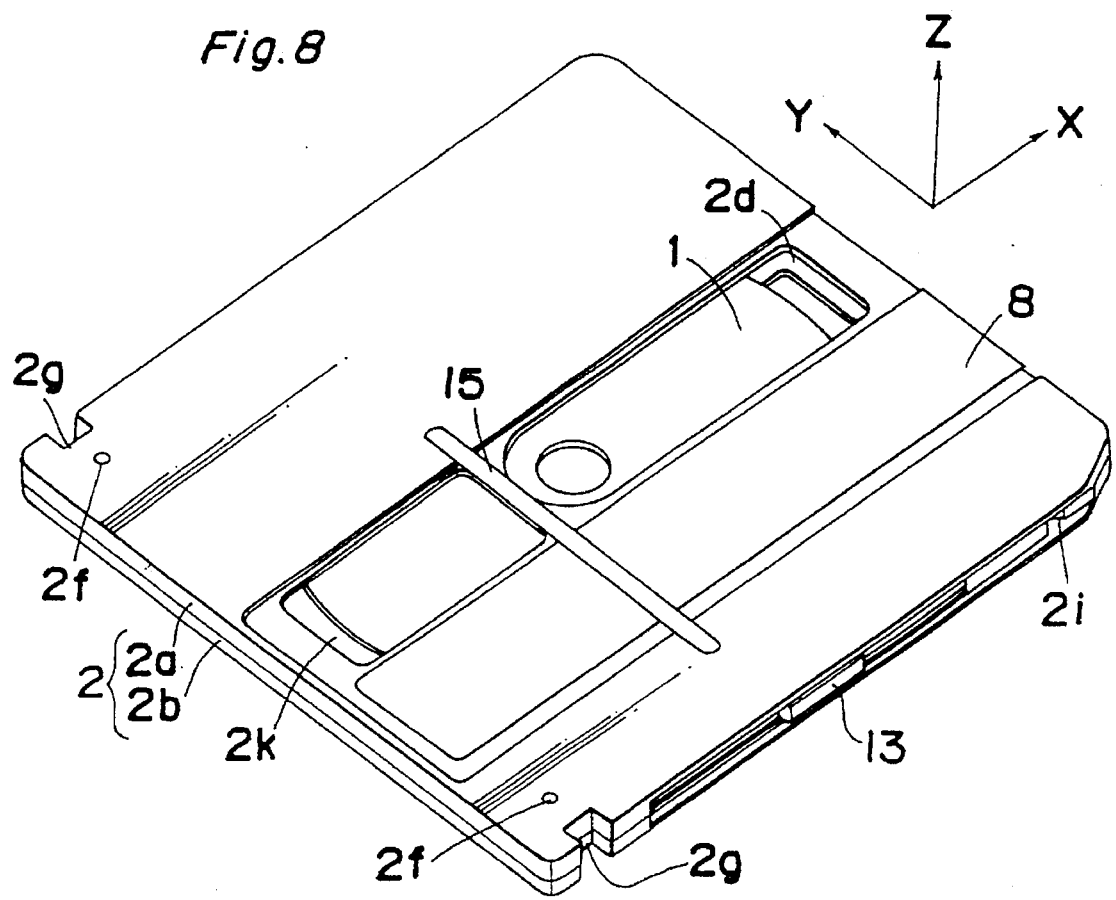
FIG. 8 is a view similar to FIG. 2 but showing a modification of the first embodiment.

While both the shutter middle retainer 15 and shutter retainer 14 are provided in the first embodiment above, the shutter retainer 14 can be eliminated as may be required as shown in FIG. 8, a first alternative configuration of this first embodiment shown as loaded and positioned in the apparatus.

The shutter middle retainer 15 is provided at the second aperture side, i.e., on the −X side of the disc 1, in this embodiment, but the shutter middle retainer 15 may be provided as required at the first aperture side, i.e., on the +X side of the disc 1, as shown in FIG. 9, a second alternative configuration of this first embodiment shown as loaded and positioned in the apparatus.

The shutter middle retainer 15 is provided at the second aperture side, i.e., only on the −X side of the disc 1, in this embodiment, but the shutter middle retainer 15 may be provided as required on both +X and −X sides of the disc 1 as shown in FIG. 10, a third alternative configuration of this first embodiment shown as loaded and positioned in the apparatus. This configuration prevents the penetration of dust to even a greater degree.

Figure 11:
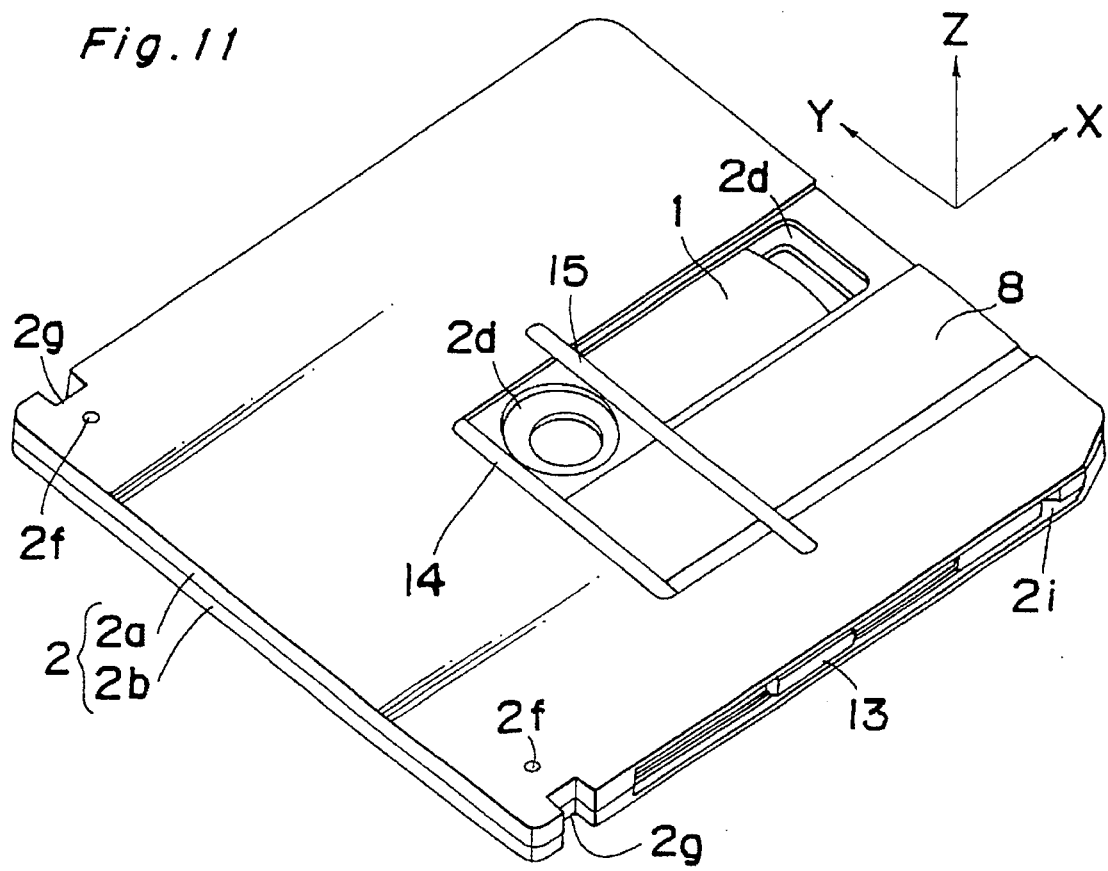
FIG. 11 is a view similar to FIG. 2 but showing a still further modification of the first embodiment.

The first aperture 2d and second aperture 2k are also provided on +X and −X sides of the disc center in the first embodiment to enable the use of more heads but it is also possible to provide the aperture 2d on only the +X side of the disc center as may be required. This is the most common disc cartridge configuration, and is shown in FIG. 11 as a fourth alternative configuration of this first embodiment shown as loaded and positioned in the apparatus.

In the preferred first embodiment and first alternative configuration of this embodiment as described above, the first aperture 2d is a single hole enabling insertion of the head, disc motor spindle, and clamp. As shown in the second to fourth alternative embodiments above, the first aperture 2d can be configured for head insertion only, while a separate hole is provided for insertion of the disc motor spindle and clamp.

Embodiment 2

A second embodiment of the present invention is described below with reference to the accompanying FIGS. 12 through 18.

Figure 12:
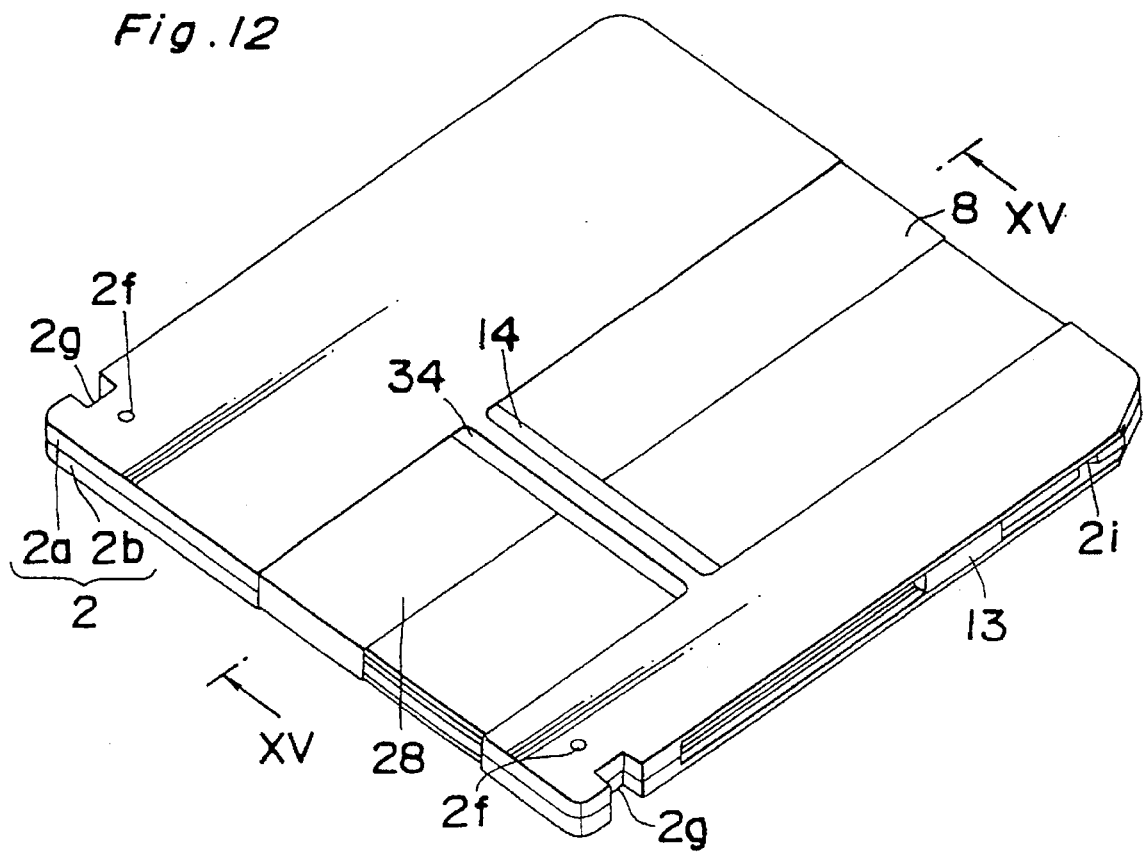
FIG. 12 is a perspective view of a second embodiment of a disc cartridge according to of the present invention when not loaded in a recording and/or reproducing apparatus.
Figure 13:
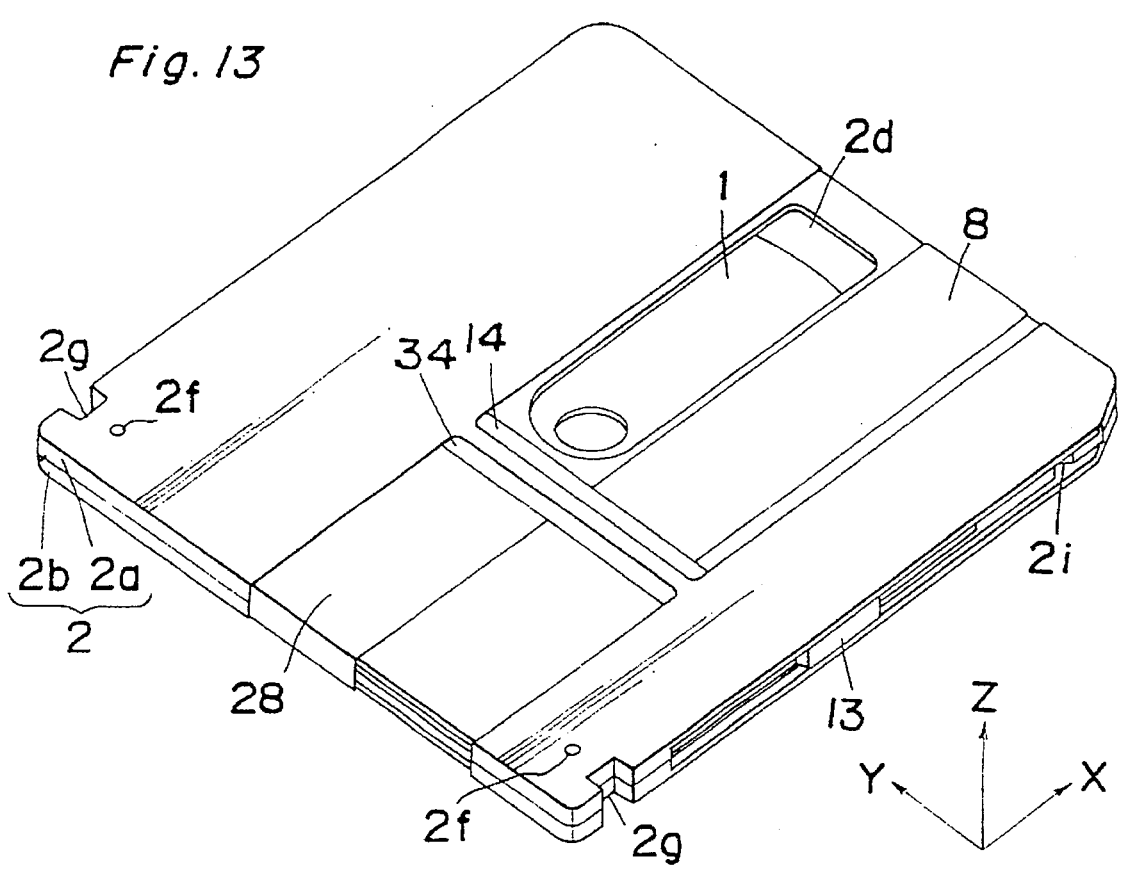
FIG. 13 is a perspective view of the disc cartridge of FIG. 12 when loaded and positioned in a standard specification recording and/or reproducing apparatus.
Figure 14:
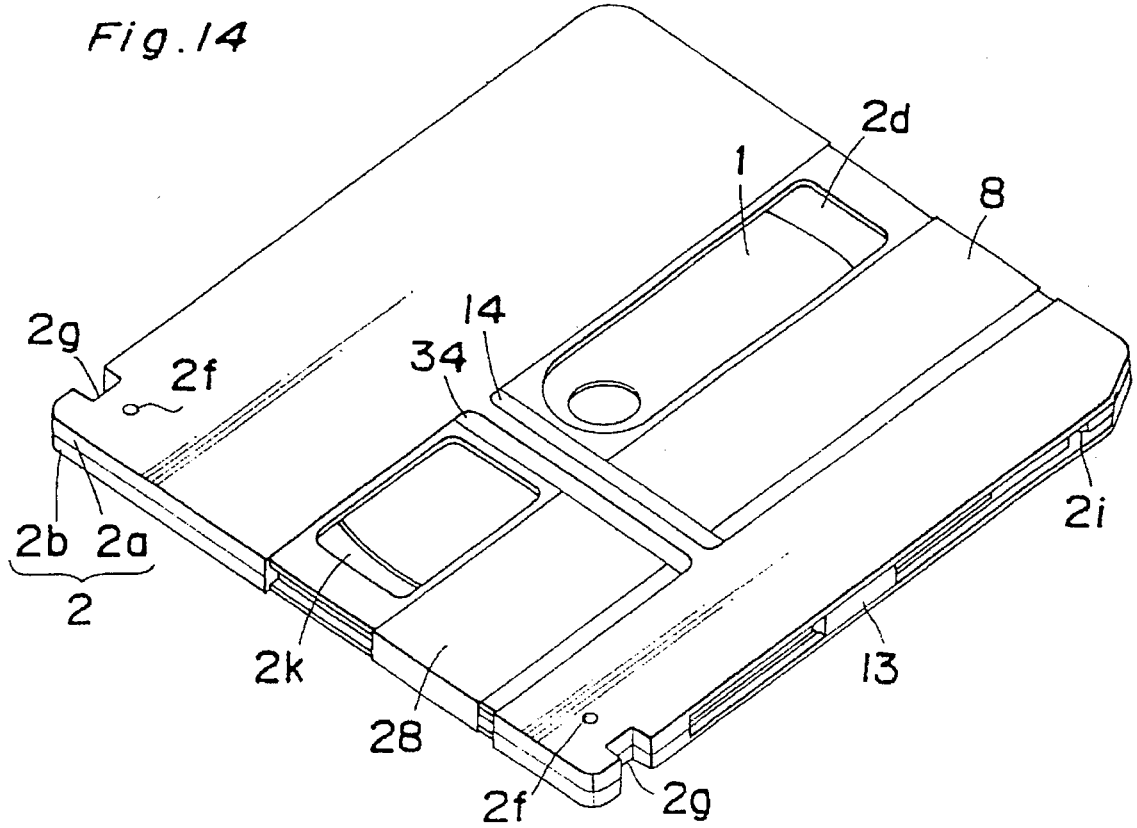
FIG. 14 is a perspective view of the disc cartridge of FIG. 12 when loaded and positioned in an optional specification recording and/or reproducing apparatus.
Figure 16:
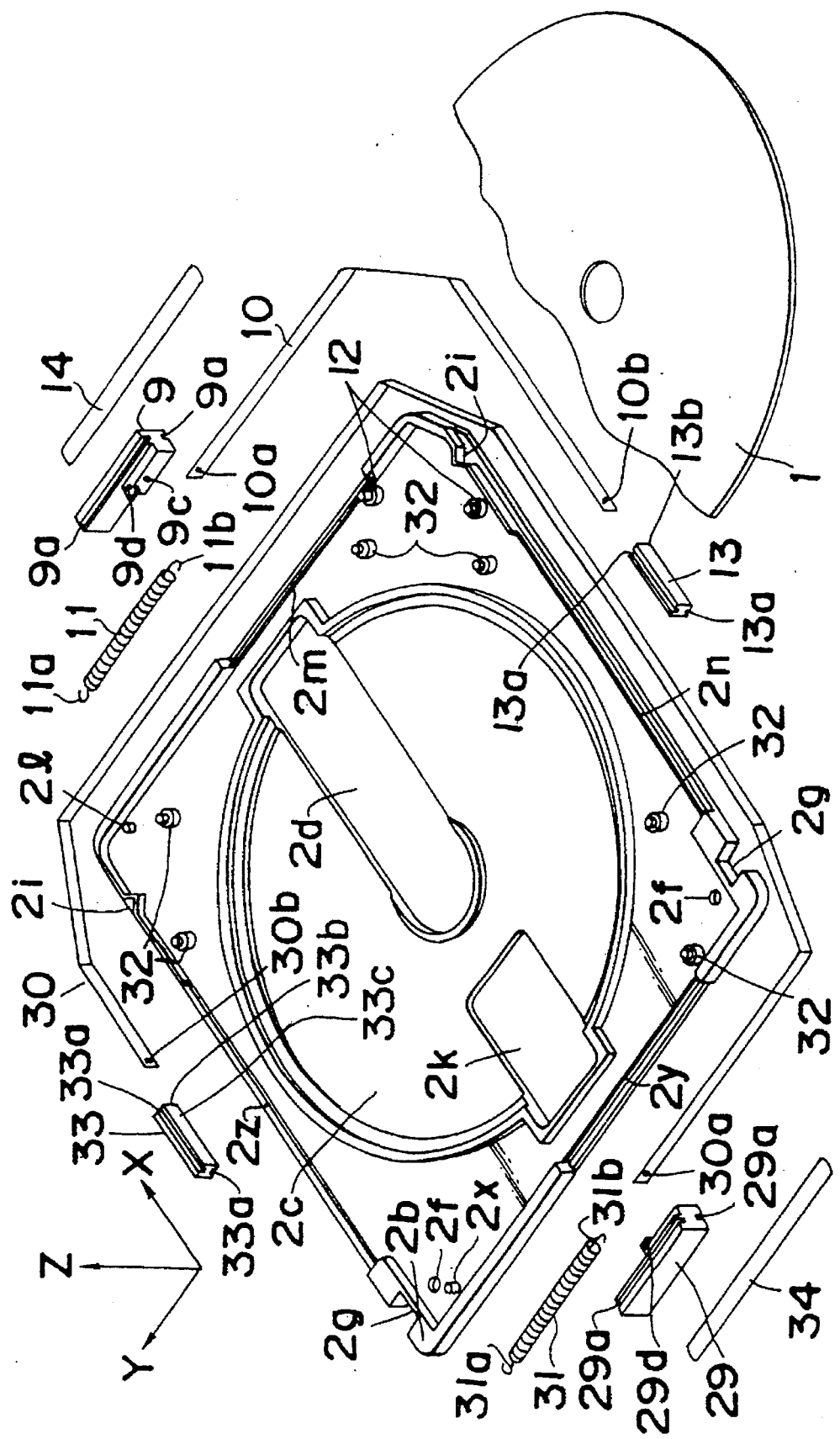
FIG. 16 is a partially exploded perspective view of the disc cartridge of FIG. 12.
Figure 17:
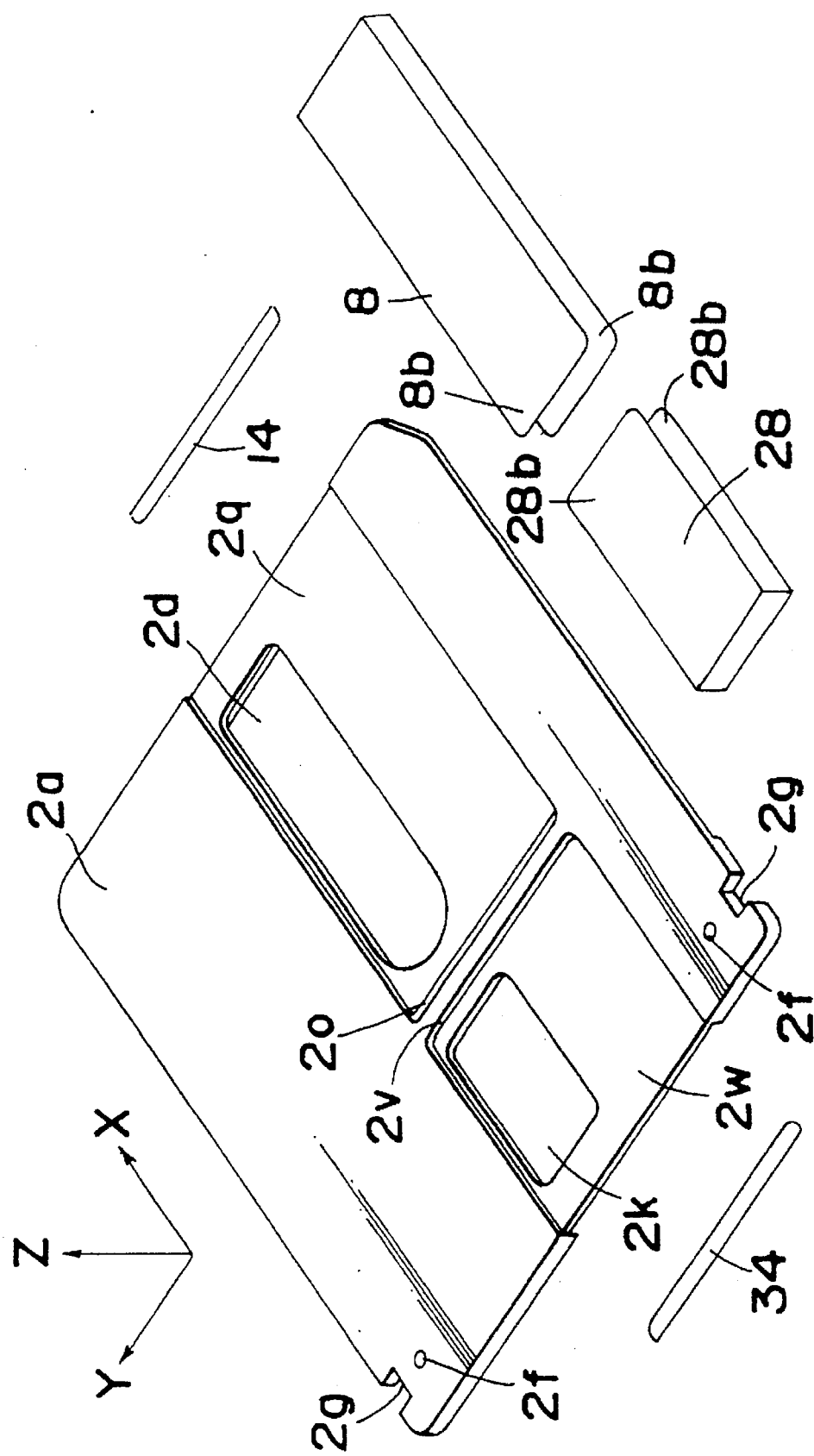
FIG. 17 is another partially exploded perspective view of the disc cartridge of FIG. 12.

Note that the recording and/or reproducing apparatus is not shown in FIGS. 12 through 14.

Referring to FIGS. 12 through 18, the disc 1 has a recording surface on one or both sides.

The casing 2 is formed by a top half 2a and a bottom half 2b fastened together by screws or heat fusion. The top and bottom halves 2a and 2b are molded from ABS resin or another resin to form a disc cavity or pocket 2c in which the disc 1 is held inside the casing 2 when the two halves 2a and 2b are joined. Two apertures 2d and 2k are formed in the casing 2.

The first aperture 2d allows insertion of a first head, a disc motor spindle, and a disc clamp from the apparatus. The second aperture 2k is provided in line with the first aperture 2d, and allows insertion of a second head provided in an apparatus according to optional specifications.

The positioning holes 2f, one of which is round and the other oval, are used to correctly position the casing 2 when loaded in the apparatus. The positioning notches 2g are provided for compatibility with stocker type apparatus as mentioned previously. The positioning notches 2g specifically enable chucking in the automatic loading and unloading mechanism. The V-shaped positioning notches 2i enable chucking when the disc cartridge is loaded in the apparatus. The pin 2l is used to hold one end 11a of the spring 11.

The channel 9a in the shutter guide 9 rides on the rail 2m. The channel 13a in the shutter opener 13 rides on the rail 2n. The positioning channel 2o guides the shutter retainer 14, which is mounted therein. The channel 2q enabling the shutter 8 to slide in the Y direction is formed at a position lower than the positioning channel 2o.

The shutter 8 opens and closes the first aperture 2d. The shutter guide 9 holds the shutter 8 with screws, for example, with the channel 9a fit over the rail 2m to enable sliding in the Y direction, thus forming a guide whereby the shutter 8 slides in the Y direction relative to the casing 2. The shutter guide 9 is preferably of polyacetal or another resin providing the lowest possible sliding resistance and wear when moved against the mating material (i.e., the ABS casing 2 in this embodiment).

The belt 10 has one end 10a secured by, for example, a screw to the screw hole 9c in the shutter guide 9, and the other end 10b secured by, for example, a screw to the shutter opener 13. The belt 10 is guided by pulleys 12 mounted in the casing 2.

One end 11a of the spring 11 is caught on the pin 2l in the casing 2, and the other end 11b is hooked in the hole 9d of the shutter guide 9. When the disc cartridge is not loaded in the apparatus, i.e., when it is not in use, the spring 11 pulls the shutter 8 closed over the first aperture 2d.

The shutter opener 13 fits over the rail 2n, and slides in the X direction. The shutter retainer 14 is fastened to the positioning channel 2o with adhesive, for example, with the end 8b of the shutter 8 held between the shutter retainer 14 and the channel 2q, thus preventing the end 8b of the shutter 8 from lifting up in the Z direction.

A second shutter 28 opens and closes the second aperture 2k. A shutter guide 29 holds the second shutter 28 with screws, for example, with a channel 29a receiving a rail 2y to enable sliding in the Y direction, thus forming a guide whereby the second shutter 28 slides in the Y direction relative to the casing 2. The shutter guide 29 is preferably of polyacetal or another resin providing the lowest possible sliding resistance and wear when moved against the mating material (i.e., the ABS casing 2 in this embodiment).

A belt 30 has one end 30a secured by, for example, a screw to the shutter guide 29, and the other end 30b screwed to a threaded member 33c of a second shutter opener 33. The belt 30 is guided by pulleys 32 mounted in the casing 2.

One end 31a of a spring 31 is caught on a pin 2x in the casing 2, and the other end 31b is hooked in a hole 29d of the shutter guide 29. When the disc cartridge is not loaded in the apparatus, i.e., when it is not in use, and when the disc cartridge is loaded in a standard specifications apparatus, the spring 31 pulls the shutter 28 closed over the second aperture 2k.

The second shutter opener 33 fits over a rail 2z, and slides in the X direction. A shutter retainer 34 is fastened to a positioning channel 2v with adhesive, for example, with the end 28b of the second shutter 28 held between the shutter retainer 34 and a channel 2w, thus preventing the end 28b of the second shutter 28 from lifting up in the Z direction.

It is to be noted that both the shutter retainers 14 and 34 are provided at a position corresponding to the non-data area 1d of the disc 1.

The operation of the second embodiment of the present invention thus comprised is described below.

The operation whereby the disc cartridge is loaded and positioned in a standard specifications apparatus is described first.

It is to be noted that the apparatus according to the standard specifications has only one first head corresponding to the position of the first aperture 2d on one or both sides of the disc 1.

When the disc cartridge is held at the −X axis side thereof and inserted into the standard specifications apparatus, the positioning notches 2i in the casing 2 are chucked by the holding pins of the cartridge guide mechanism of the apparatus, and the disc cartridge is thus guided in the +X direction, i.e., into the apparatus.

When the end 13b of the first shutter opener 13 is caught by a claw provided in the −Y side of the apparatus, a +X direction movement of the casing 2 causes only the first shutter opener 13 to move in the −X direction relative to the casing 2. The belt 10 connected to the shutter opener 13 thus pulls the spring 11, and the shutter 8 moves in the −Y direction to fully open the first aperture 2d.

The casing 2 is accurately positioned by, for example, positioning pins of the apparatus using the positioning holes 2f. The disc motor spindle and disc clamp of the apparatus are inserted through the first aperture 2d, and the disc 1 is thus clamped by the clamp coaxially to the disc motor turntable. The first heads, one head on each side of the disc 1 in this example, are then inserted through the first aperture 2d. It is thereby possible to record, read, and erase data from the disc.

The operation whereby the disc cartridge is ejected from the standard specifications apparatus is described next.

When the positioning of the casing 2 by the use of the positioning holes 2f is released, the disc clamp is also released, the disc motor spindle and clamp of the apparatus are removed from the first aperture 2d, and the first heads are removed from the first aperture 2d.

The disc cartridge is then ejected by essentially the reverse of the loading operation. It follows that when the positioning notches 2i are unchucked and the apparatus claw disengages from the end 13b of the first shutter opener 13, the restoring force of the spring 11 moves the first shutter 8 in the +Y direction to completely close the first aperture 2d. The first shutter opener 13 is also moved in the +X direction via the belt 10.

When the disc cartridge is inserted into and loaded in the apparatus, the permanent tension of the spring 31 on the second shutter 28 keeps the second aperture 2k closed.

When the disc cartridge is ejected from the apparatus, the permanent tension of the springs 11 and 31 on the first shutter 8 and the second shutter 28 keeps both the first aperture 2d and the second aperture 2k closed.

The operation whereby the disc cartridge is loaded and positioned in an optional specifications apparatus is described next.

It is to be noted that the apparatus according to the optional specifications has one first head corresponding to the position of the first aperture 2d on one or both sides of the disc 1, and has one second head corresponding to the position of the second aperture 2k on one or both sides of the disc 1.

When the disc cartridge is held at the −X axis side thereof and inserted into the optional specifications apparatus, the positioning notches 2i in the casing 2 are chucked by the holding pins of the cartridge guide mechanism of the apparatus, and the disc cartridge is thus guided in the +X direction, i.e., into the apparatus.

When the ends 13b and 33b of the first shutter opener 13 and second shutter opener 33 are caught by the claws provided in the −Y and +Y sides of the apparatus, a +X direction movement of the casing 2 causes both the first shutter opener 13 and second shutter opener 33 to move in the −X direction relative to the casing 2. The belts 10 and 30 connected to the first shutter opener 13 and second shutter opener 33 thus pull the springs 11 and 31, respectively, and the first shutter 8 and second shutter 28 move in the −Y direction to fully open the first aperture 2d and second aperture 2k, respectively.

The casing 2 is accurately positioned by, for example, positioning pins of the apparatus using the positioning holes 2f. The disc motor spindle and disc clamp of the apparatus are inserted through the first aperture 2d, and the disc 1 is thus clamped by the clamp coaxially to the disc motor turntable. Two first heads, one head on each side of the disc 1 in this example, are then inserted through the first aperture 2d, and two second heads, one head on each side of the disc 1 in this example, are simultaneously inserted through the second aperture 2k. It is thereby possible to record, read, and erase data from the disc.

The operation whereby the disc cartridge is ejected from the optional specifications apparatus is described next.

When the positioning of the casing 2 by the use of the positioning holes 2f is released, the disc clamp is also released, the disc motor spindle and clamp of the apparatus are removed from the first aperture 2d, and the first heads are removed from the first aperture 2d. The second heads are also removed from the second aperture 2k.

The disc cartridge is then ejected by essentially the reverse of the loading operation. It follows that when the positioning notches 2i are unchucked and the apparatus claws disengage from the end 13b of the first shutter opener 13 and the end 33b of the second shutter opener 33, the restoring force of the spring 11 and 31 moves the first shutter 8 and second shutter 28 in the +Y direction to completely close the first aperture 2d and second aperture 2k, respectively. The first shutter opener 13 and second shutter opener 33 are also moved in the +X direction via the belts 10 and 30, respectively.

When the disc cartridge is ejected from the apparatus, the permanent tension of the springs 11 and 31 on the first shutter 8 and the second shutter 28 keeps both the first aperture 2d and the second aperture 2k closed.

Because two shutters, specifically the first shutter 8 and second shutter 28, are provided for the two apertures (first aperture 2d and second aperture 2k), the length of the shutters in the X direction can be shortened when compared with the conventional disc cartridge as disclosed in the Japanese Laid-open Patent Publication No. 61-983 in which a single shutter covers plural apertures, and flexing of the shutters can be effectively prevented.

By connecting the first shutter opener 13 exposed to the outside of the casing 2 to the first shutter 8, and connecting the second shutter opener 33 exposed to the outside of the casing 2 to the second shutter 28, the disc cartridge can be made compatible with apparatus having plural heads on one or both sides of the disc 1. By so doing, flexing of the shutters can be suppressed, and the first shutter 8.and second shutter 28 can be independently opened and closed. Accordingly, a highly reliable disc cartridge can be provided whereby only the required apertures are opened, penetration of dust and other foreign matter into the casing 2 can be minimized, and shutter-disc contact can be prevented.

By exposing the first and second shutter openers 13 and 33 on opposite sides (+Y side and −Y side) of the casing 2 relative to the direction of insertion (X direction) of the casing 2 into the apparatus, and causing both the first and second shutter openers 13 and 33 to be movable in the insertion direction (X direction) of the casing 2, only the provision of stopper members such as claws in the apparatus can move the first and second shutter openers 13 and 33 relative to the casing 2 by making use of the insertion of the casing 2 into the apparatus. Accordingly, a highly practical disc cartridge can be provided wherein opening and closing of the shutters is considerably facilitated.

Embodiment 3

A third embodiment of the present invention is described below with reference to the accompanying FIGS. 19 through 25.

Figure 19:
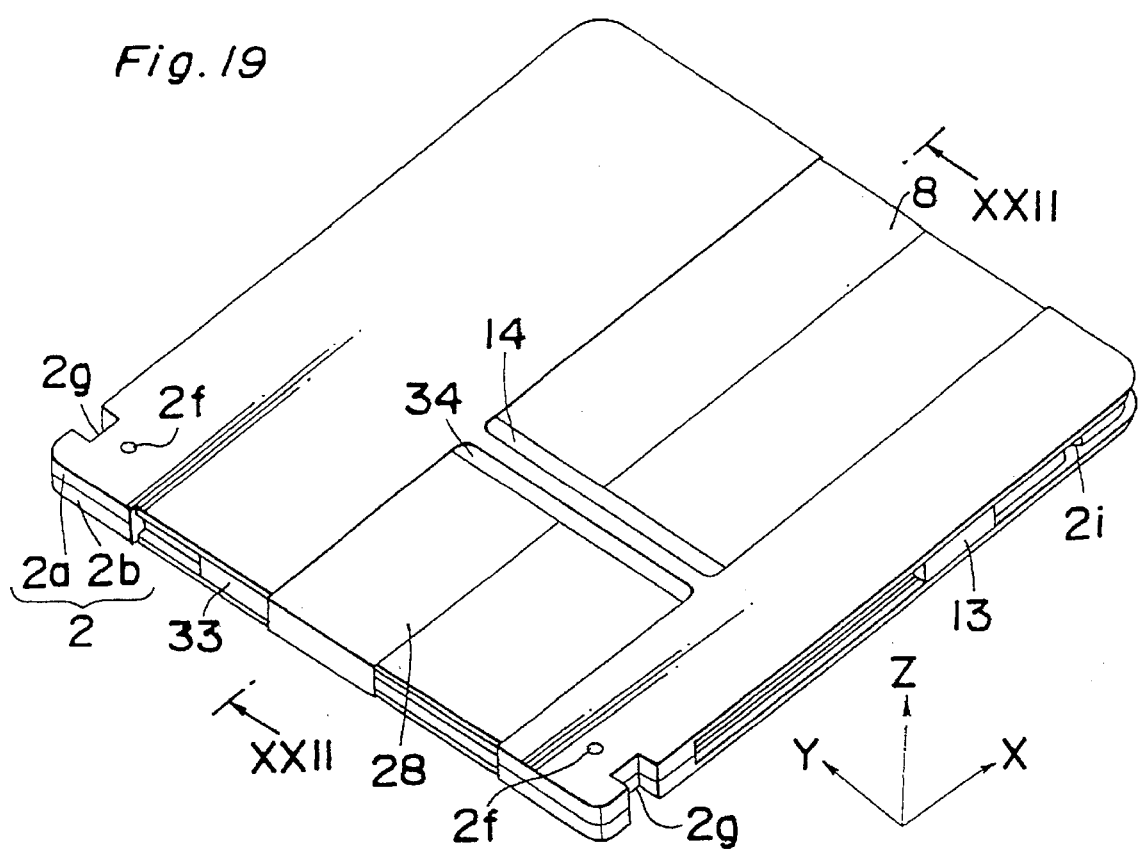
FIG. 19 is a perspective view of a third embodiment of a disc cartridge according to the present invention when not loaded in a recording and/or reproducing apparatus.
Figure 20:
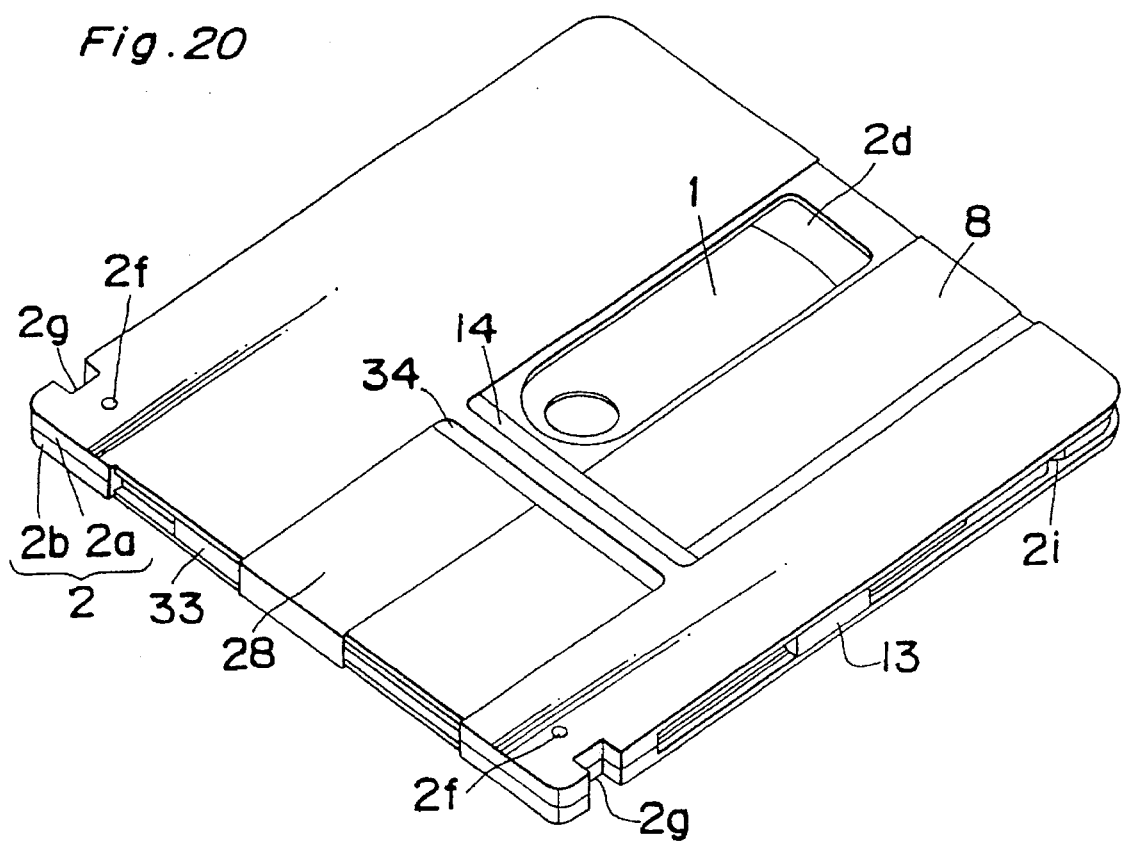
FIG. 20 is a perspective view of the disc cartridge of FIG. 19 when loaded and positioned in a standard specification recording and/or reproducing apparatus.
Figure 21:
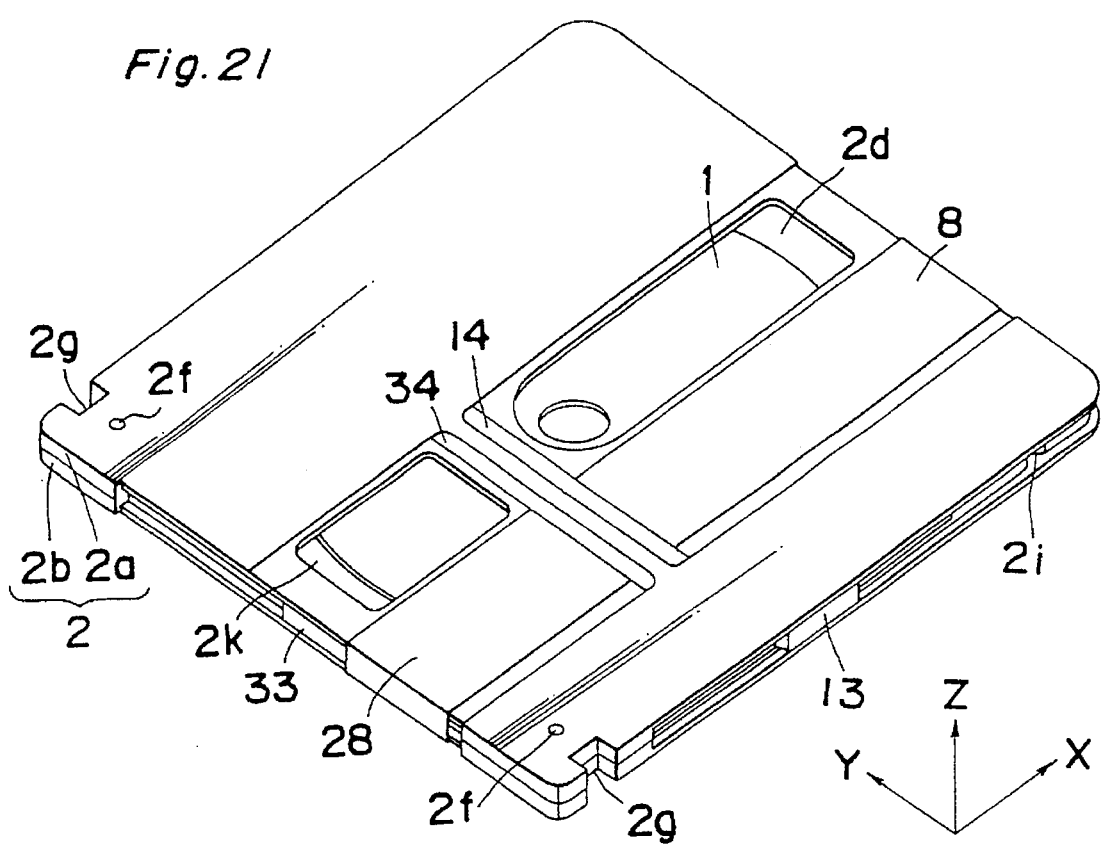
FIG. 21 is a perspective view of the disc cartridge of FIG. 19 when loaded and positioned in an optional specification recording and/or reproducing apparatus.
Figure 26:
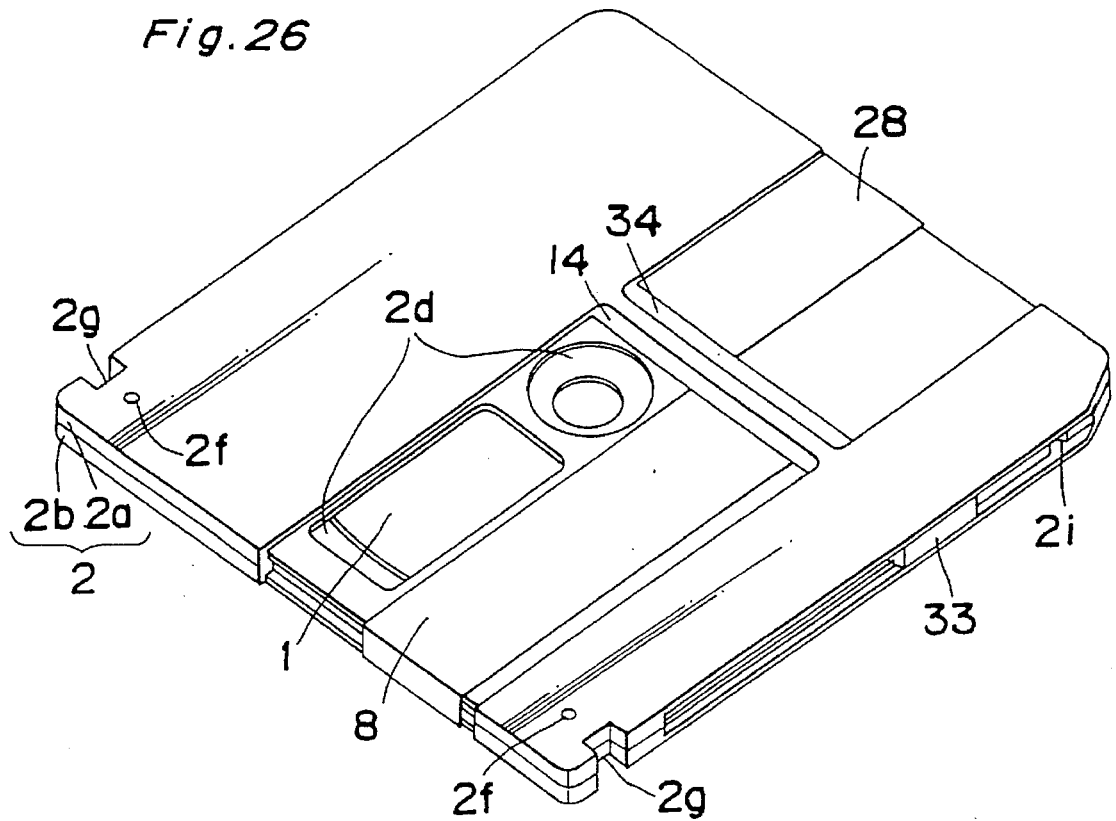
FIG. 26 is a view similar to FIG. 13 but showing a modification of the second embodiment.
Figure 27:
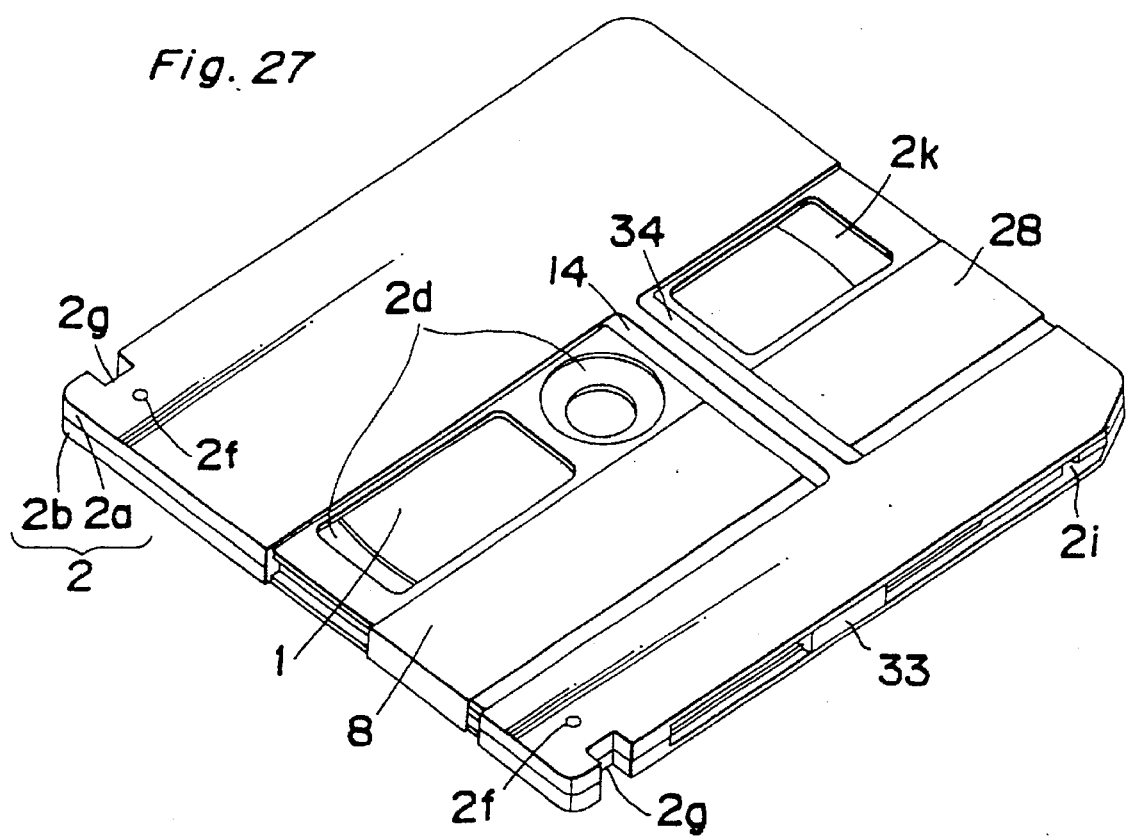
FIG. 27 is a perspective view of the disc cartridge of FIG. 26 when loaded and positioned in an optional specification recording and/or reproducing apparatus.
Figure 28:
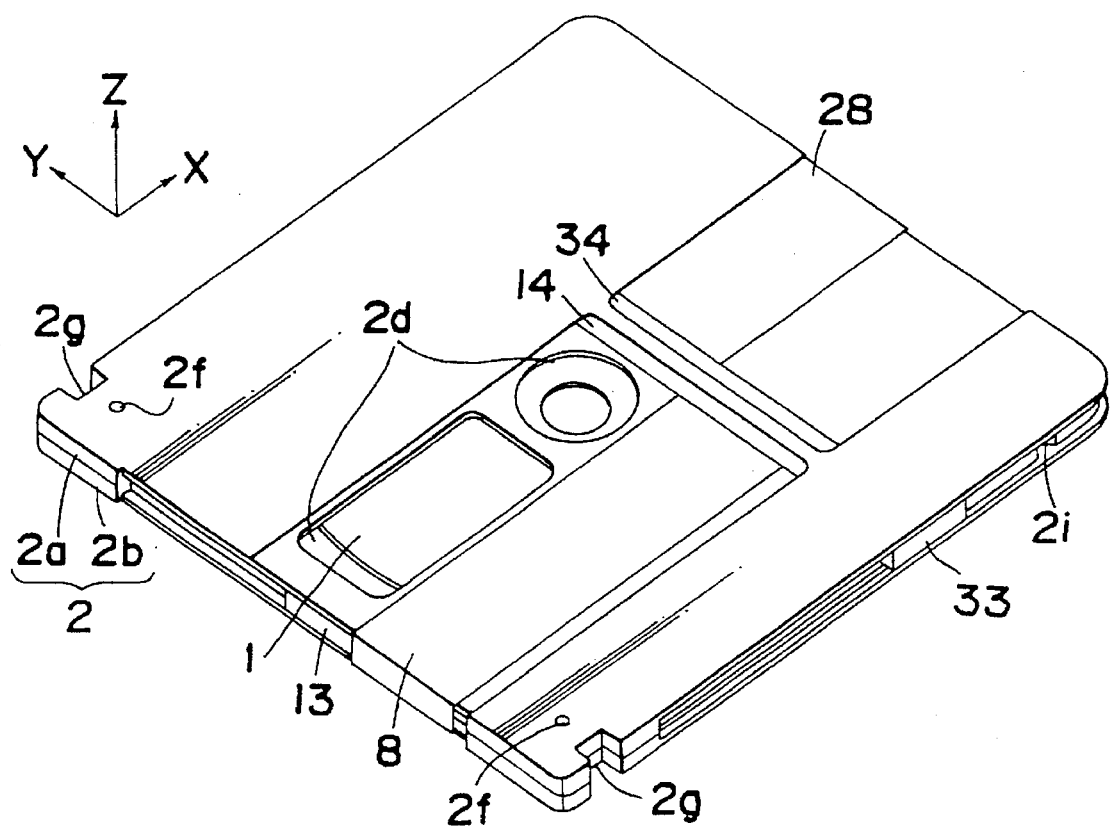
FIG. 28 is a view similar to FIG. 20 but showing a modification of the second embodiment.
Figure 29:
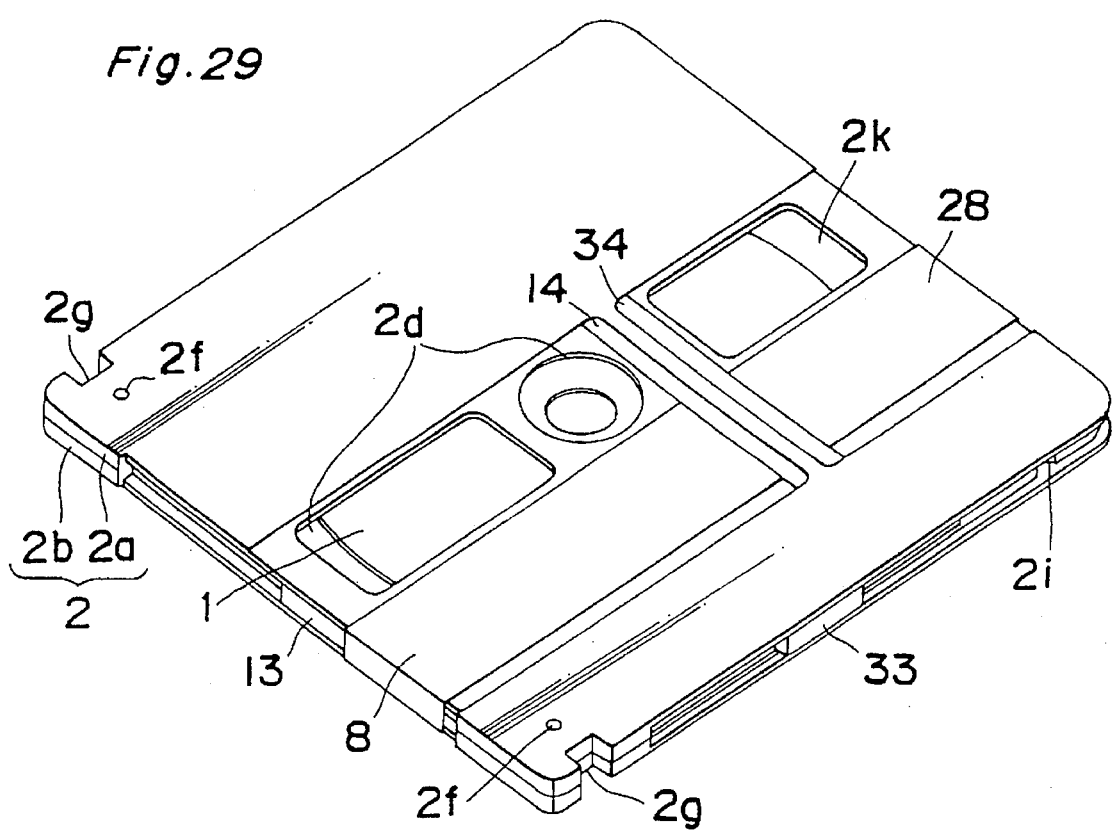
FIG. 29 is a perspective view of the disc cartridge of FIG. 28 when loaded and positioned in an optional specification recording and/or reproducing apparatus.

Note that the recording and/or reproducing apparatus is not shown in FIGS. 19 through 21.

Referring to FIGS. 19 through 25, the disc 1 has a recording surface on one or both sides.

The casing 2 is formed by a top half 2a and bottom half 2b fastened together by screws or heat fusion. The top and bottom halves 2a and 2b are molded from ABS resin or another resin to form a disc cavity or pocket 2c in which the disc 1 is held inside the casing 2 when the two halves 2a and 2b are joined. Two apertures 2d and 2k are formed in the casing 2.

The first aperture 2d allows insertion of a first head, a disc motor spindle, and a disc clamp from the apparatus. The second aperture 2k is provided in line with the first aperture 2d, and allows insertion of a second head provided in an apparatus according to optional specifications.

The positioning holes 2f, one of which is round and the other oval, are used to position the casing 2 when loaded in the apparatus. The positioning notches 2g are provided for compatibility with stocker type apparatus as mentioned previously. The positioning notches 2g specifically enable chucking in the automatic loading and unloading mechanism. The V-shaped positioning notches 2i enable chucking when the disc cartridge is loaded in the apparatus. The pin 2l is used to hold one end 11a of the spring 11.

The channel 9a in the shutter guide 9 rides on the rail 2m. The channel 13a in the shutter opener 13 rides on the rail 2n. The positioning channel 2o guides the shutter retainer 14, which is mounted therein. The channel 2q enabling the shutter 8 to slide in the Y direction is formed at a position lower than the positioning channel 2o.

The shutter 8 opens and closes the first aperture 2d. The shutter guide 9 holds the shutter 8 with screws, for example, with the channel 9a receiving the rail 2m to enable sliding in the Y direction, thus forming a guide whereby the shutter 8 slides in the Y direction relative to the casing 2. The shutter guide 9 is preferably of polyacetal or another resin providing the lowest possible sliding resistance and wear when moved against the mating material (i.e., the ABS casing 2 in this embodiment).

The belt 10 has one end 10a secured by, for example, a screw to the screw hole 9c in the shutter guide 9, and the other hole 10b secured by, for example, a screw to the shutter opener 13. The belt 10 is guided by pulleys 12 mounted in the casing 2.

One end 11a of the spring 11 is caught on the pin 2l in the casing 2, and the other end 11b is hooked in the hole 9d of the shutter guide 9. When the disc cartridge is not loaded in the apparatus, i.e., when it is not in use, the spring 11 pulls the shutter 8 closed over the first aperture 2d.

The shutter opener 13 fits over the rail 2n, and slides in the X direction. The shutter retainer 14 is fastened to the positioning channel 2o with adhesive, for example, with the end 8b of the shutter 8 held between the shutter retainer 14 and the channel 2q, thus preventing the end 8b of the shutter 8 from lifting up in the Z direction.

The second shutter 28 opens and closes the second aperture 2k. The belt 30 has one end 30a secured by, for example, a screw to the second shutter opener 33. The other end 30b is secured by a screw to a threaded member 36c of a relay guide 36. One end 31a of the spring 31 is caught on a pin 2x in the casing 2, and the other end 31b is hooked in the hole 36d of the relay guide 36. When the disc cartridge is not loaded in the apparatus, i.e., when it is not in use, and when the disc cartridge is loaded in a standard specifications apparatus, the spring 31 pulls the shutter 28 closed over the second aperture 2k.

The belt 30 is guided by pulleys 32 mounted in the casing 2.

The second shutter opener 33 functions as both a guide for the second shutter 28 and as the shutter opener. The second shutter 28 is secured by a screw to the second shutter opener 33. The channel 33a of the second shutter opener 33 receives the rail 2y, and slides in the Y direction, thus functioning as a guide for movement of the second shutter 28 in the Y direction relative to the casing 2. This second shutter opener 33 is preferably of polyacetal or another resin providing the lowest possible sliding resistance and wear when moved against the mating material (i.e., the ABS casing 2 in this embodiment).

The relay guide 36 slides in the X direction on the mated rail 2z of the casing 2, and is provided inside the casing 2 so that it is not exposed to the outside.

The shutter retainer 34 is fastened to the positioning channel 2v with adhesive, for example, with the end 28b of the second shutter 28 held between the shutter retainer 34 and the channel 2w, thus preventing the end 28b of the second shutter 28 from lifting up in the Z direction.

It is to be noted that both the shutter retainers 14 and 34 are provided at a position corresponding to the non-data area 1d of the disc 1.

The operation of the third embodiment of the present invention thus comprised is described below.

The operation whereby the disc cartridge is loaded and positioned, and then ejected, in a standard specifications apparatus is described first.

It is to be noted that the apparatus according to the standard specifications has only one first head corresponding to the position of the first aperture 2d on one or both sides of the disc 1.

When the disc cartridge is held at the −X axis side thereof and inserted to the standard specifications apparatus with the top half 2a of the disc cartridge towards the clamp side of the apparatus (i.e., the bottom half 2b is towards the disc motor side of the apparatus), the positioning notches 2i in the casing 2 are chucked by the holding pins of the cartridge guide mechanism of the apparatus, and the disc cartridge is thus guided in the +X direction, i.e., into the apparatus.

When the end 13b of the first shutter opener 13 is caught only by the −Y side claw of the apparatus (which has claws on both +Y and −Y sides), a +X direction movement of the casing 2 causes only the first shutter opener 13 to move in the −X direction relative to the casing 2. The belt 10 connected to the shutter opener 13 thus pulls the spring 11, and the shutter 8 moves in the −Y direction to fully open the first aperture 2d.

The casing 2 is accurately positioned by positioning pins or other members of the apparatus using the positioning holes 2f. The disc motor spindle and disc clamp of the apparatus are inserted through the first aperture 2d, and the disc 1 is thus clamped by the clamp coaxially to the disc motor turntable. The first heads, one head on each side of the disc 1 in this example, are then inserted through the first aperture 2d. It is thereby possible to record, read, and erase data from the disc.

The operation whereby the disc cartridge is ejected from the apparatus is described next.

When the positioning of the casing 2 by the use of the positioning holes 2f is released, the disc clamp is also released, the disc motor spindle and clamp of the apparatus are removed from the first aperture 2d, and the first heads are removed from the first aperture 2d.

The disc cartridge is then ejected by essentially the reverse of the loading operation. It follows that when the positioning notches 2i are unchucked and the −Y side apparatus claw disengages from the end 13b of the first shutter opener 13, the restoring force of the spring 11 moves the first shutter 8 in the +Y direction to completely close the first aperture 2d. The first shutter opener 13 is also moved in the +X direction via the belt 10.

Conversely, when the disc cartridge is held at the −X axis side thereof and inserted into the standard specifications apparatus with the top and bottom inverted, i.e., with the bottom half 2b towards the clamp side of the apparatus (i.e., the top half 2a towards the disc motor side of the apparatus), the positioning notches 2i in the casing 2 are chucked by the holding pins of the cartridge guide mechanism of the apparatus, and the disc cartridge is thus guided in the +X direction, i.e., into the apparatus.

When the end 13b of the first shutter opener 13 is caught only by the +Y side claw of the apparatus, a +X direction movement of the casing 2 causes only the first shutter opener 13 to move in the −X direction relative to the casing 2. The belt 10 connected to the shutter opener 13 thus pulls the spring 11, and the shutter 8 moves in the Y direction to fully open the first aperture 2d.

The casing 2 is then accurately positioned by the positioning pins or other members of the apparatus using the positioning holes 2f. The disc motor spindle and disc clamp of the apparatus are inserted through the first aperture 2d, and the disc 1 is thus clamped by the clamp coaxially to the disc motor turntable. The first heads, one head on each side of the disc 1 in this example, are then inserted through the first aperture 2d. It is thereby possible to record, read, and erase data from the disc.

The operation whereby the disc cartridge is ejected from the apparatus in this loading situation is described next.

When the positioning of the casing 2 by the use of the positioning holes 2f is released, the disc clamp is also released, the disc motor spindle and clamp of the apparatus are removed from the first aperture 2d, and the first heads are removed from the first aperture 2d.

The disc cartridge is then ejected by essentially the reverse of the loading operation. It follows that when the positioning notches 2i are unchucked and the +Y side apparatus claw disengages from the end 13b of the first shutter opener 13, the restoring force of the spring 11 moves the first shutter 8 in the −Y direction to completely close the first aperture 2d. The first shutter opener 13 is also moved in the +X direction via the belt 10.

When the disc cartridge is inserted into and loaded in the apparatus, the permanent tension of the spring 31 on the second shutter 28 keeps the second aperture 2k closed.

When the disc cartridge is ejected from the apparatus, the permanent tension of the springs 11 and 31 on the first shutter 8 and the second shutter 28 keeps both the first aperture 2d and the second aperture 2k closed.

The operation whereby the disc cartridge is loaded and positioned in an optional specifications apparatus is described next.

It is to be noted that the apparatus according to the optional specifications has one first head corresponding to the position of the first aperture 2d on one or both sides of the disc 1, and has one second head corresponding to the position of the second aperture 2k on one or both sides of the disc 1.

When the disc cartridge is held at the −X axis side thereof and inserted into the optional specifications apparatus with the top half 2a of the disc cartridge towards the clamp side of the apparatus (i.e., the bottom half 2b is towards the disc motor side of the apparatus), the positioning notches 2i in the casing 2 are chucked by the holding pins of the cartridge guide mechanism of the apparatus, and the disc cartridge is thus guided in the +X direction, i.e., into the apparatus.

When the end 13b of the first shutter opener 13 is caught only by the −Y side claw of the apparatus (which has claws on both +Y and −Y sides), a +X direction movement of the casing 2 causes the first shutter opener 13 to move in the −X direction relative to the casing 2. The belt 10 connected to the shutter opener 13 thus pulls the spring 11, and the shutter 8 moves in the −Y direction to fully open the first aperture 2d.

The end 33b of the second shutter opener 33 is also connected to a shutter opening mechanism located on the −X side in the apparatus. When the casing 2 is loaded in the +X direction, the second shutter opener 33 therefore moves in the −Y direction. The belt 30 connected to the second shutter opener 33 thus pulls the spring 31, and the second shutter 28 moves in the −Y direction to fully open the second aperture 2k.

The casing 2 is then accurately positioned by the positioning pins or other members of the apparatus using the positioning holes 2f. The disc motor spindle and disc clamp of the apparatus are inserted through the first aperture 2d, and the disc 1 is thus clamped by the clamp coaxially to the disc motor turntable. The two first heads, one head on each side of the disc 1 in this example, are then inserted through the first aperture 2d, and the two second heads are also inserted from both sides to the second aperture 2k. It is thereby possible to record, read, and erase data from the disc.

The operation whereby the disc cartridge is ejected from the apparatus is described next.

When the positioning of the casing 2 is released, the disc clamp is also released, the disc motor spindle and clamp of the apparatus are removed from the first aperture 2d, and the first heads are removed from the first aperture 2d. The second heads are also removed from the second aperture 2k.

The disc cartridge is then ejected by essentially the reverse of the loading operation. It follows that when the positioning notches 2i are unchucked and the −Y side apparatus claw and the −X side shutter opening mechanism disengage from the end 13b of the first shutter opener 13 and the end 33b of the second shutter opener 33, the restoring force of the springs 11 and 31 moves the first shutter 8 and the second shutter 28 in the +Y direction to completely close the first and second apertures 2d and 2k, respectively. The first and second shutter openers 13 and 33 are also moved in the +X and +Y directions, respectively, via the belts 10 and 30.

Conversely, when the disc cartridge is held at the −X axis side thereof and inserted into the optional specifications apparatus with the top and bottom inverted, i.e., with the bottom half 2b towards the clamp side of the apparatus (i.e., the top half 2a towards the disc motor side of the apparatus), the positioning notches 2i in the casing 2 are chucked by the holding pins of the cartridge guide mechanism of the apparatus, and the disc cartridge is thus guided in the +X direction, i.e., into the apparatus.

When the end 13b of the first shutter opener 13 is caught only by the +Y side claw of the apparatus, a +X direction movement of the casing 2 causes only the first shutter opener 13 to move in the −X direction relative to the casing 2. The belt 10 connected to the shutter opener 13 thus pulls the spring 11, and the shutter 8 moves in the +Y direction to fully open the first aperture 2d.

The end 33b of the second shutter opener 33 is also connected to the −X side shutter opening mechanism of the apparatus. When the casing 2 is loaded in the +X direction, the second shutter opener 33 therefore moves in the +Y direction. The belt 30 connected to the second shutter opener 33 thus pulls the spring 31, and the second shutter 28 moves in the +Y direction to fully open the second aperture 2k.

The casing 2 is then accurately positioned by the positioning pins or other members of the apparatus using the positioning holes 2f. The disc motor spindle and disc clamp of the apparatus are inserted through the first aperture 2d, and the disc 1 is thus clamped by the clamp coaxially to the disc motor turntable. The two first heads, one head on each side of the disc 1 in this example, are then inserted through the first aperture 2d, and the two second heads are also inserted from both sides to the second aperture 2k. It is thereby possible to record, read, and erase data from the disc.

The operation whereby the disc cartridge is ejected from the apparatus is described next.

When the positioning of the casing 2 is released, the disc clamp is also released, the disc motor spindle and clamp of the apparatus are removed from the first aperture 2d, and the first heads are removed from the first aperture 2d. The second heads are also removed from the second aperture 2k.

The disc cartridge is then ejected by essentially the reverse of the loading operation. It follows that when the positioning notches 2i are unchucked and the +Y side apparatus claw and the −X side shutter opening mechanism disengage from the end 13b of the first shutter opener 13 and the end 33b of the second shutter opener 33, the restoring force of the springs 11 and 31 moves the first shutter 8 and the second shutter 28 in the −Y direction to completely close the first and second apertures 2d and 2k, respectively. The first and second shutter openers 13 and 33 are also moved in the +X and −Y directions, respectively, via the belts 10 and 30.

When the disc cartridge is ejected from the apparatus, the permanent tension of the springs 11 and 31 on the first shutter 8 and the second shutter 28 keeps both the first aperture 2d and the second aperture 2k closed.

Because two shutters, specifically the first shutter 8 and second shutter 28, are provided for the two apertures (first aperture 2d and second aperture 2k), the length of the shutters in the X direction can be shortened when compared with the conventional disc cartridge as disclosed in the JP 61-983 in which a single shutter covers plural apertures, and flexing of the shutters can be effectively prevented.

By connecting the first shutter opener 13 exposed to the outside of the casing 2 to the first shutter 8, and connecting the second shutter opener 33 exposed to the outside of the casing 2 to the second shutter 28, the disc cartridge can be made compatible with apparatus having plural heads on one or both sides of the disc 1. By so doing, flexing of the shutters can be suppressed, and the first shutter 8 and second shutter 28 can be independently opened and closed. Accordingly, a highly reliable disc cartridge can be provided whereby only the required apertures are opened, penetration of dust and other foreign matter into the casing 2 can be minimized, and shutter-disc contact can be prevented.

By exposing the first shutter opener 13 on the Y side relative to the direction of insertion (X direction) of the casing 2 into the apparatus so that the first shutter opener 13 can move in the X direction, and exposing the second shutter opener 33 to the back (−X side) relative to the direction of insertion (X direction) of the casing 2 into the apparatus so that the second shutter opener 33 can move in the direction perpendicular (Y direction) to the insertion direction (X direction), it is possible to open only the first shutter 8 when the casing 2 is inserted into a standard specifications apparatus whether the casing top is facing up or down. It is therefore possible to provide a disc cartridge that can open only the necessary aperture, effectively prevent penetration of dust and other foreign matter into the casing 2, and can prevent shutter-disc contact whether the casing 2 is inserted with the top facing up or down.

In this third embodiment, it is possible to open and close only the first shutter 8 whether the casing 2 is inserted with the casing top facing up or down when using a standard specifications apparatus because the first shutter opener 13 is exposed and can slide in the direction of insertion (X direction), and the second shutter opener 33 is exposed to the back (−X side) and can slide in the direction perpendicular (Y direction) to the insertion direction (X direction). It is possible, however, to open and close only the first shutter whether the casing 2 is inserted with the casing top facing up or down when using a standard specifications apparatus insofar as either one of the first and second shutter openers is exposed on one side of the casing 2 relative to the direction of insertion and can slide in the insertion direction, and the other is exposed to the front or back and can slide in the direction perpendicular to the insertion direction.

It will be noted that in the second and third embodiments described above, the first shutter 8 opening and closing the first aperture 2d is set on the +X side, and the second shutter 28 opening and closing the second aperture 2k is set on the −X side but as shown in the first alternative configuration of the second embodiment and the alternative configuration of the third embodiment shown in FIGS. 26 and 27 and FIGS. 28 and 29, respectively, these positions can be reversed. Specifically, the first shutter 8 can be set on the −X side, whereas the second shutter 28 can be set on the +X side.

Furthermore, while the first head and disc motor spindle are inserted into the single hole forming the first aperture 2d in the second and third embodiments described above, the first aperture 2d can provide separate holes for inserting the first head and the disc motor as shown in FIGS. 26 and 27 and FIGS. 28 and 29.

Figure 30:
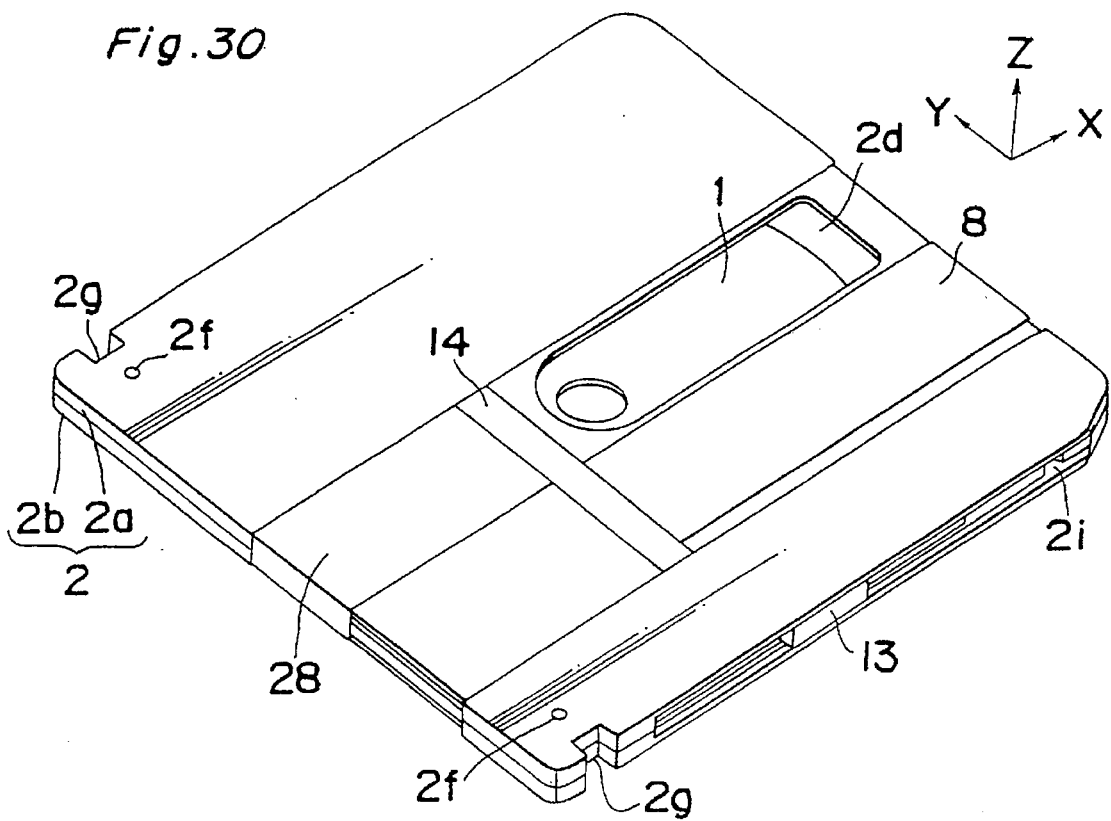
FIG. 30 is a view similar to FIG. 13 but showing another modification of the second embodiment.
Figure 31:
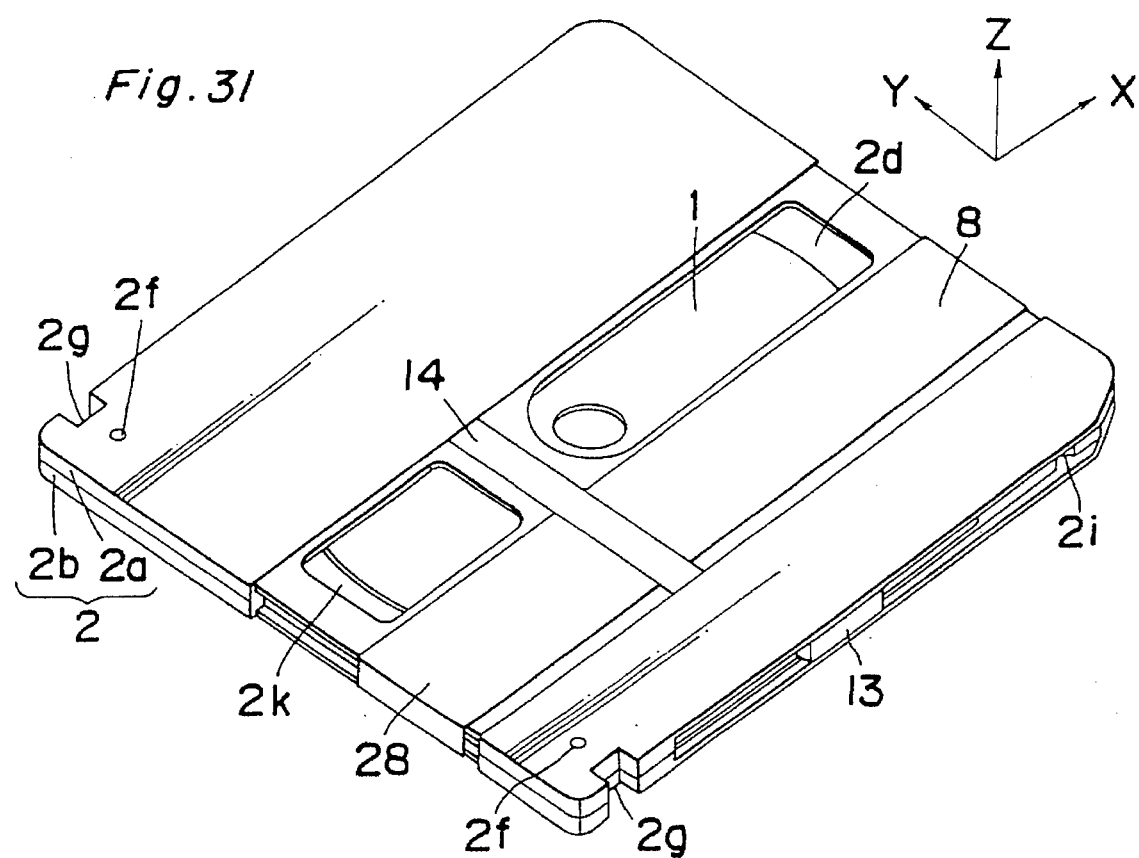
FIG. 31 is a perspective view of the disc cartridge of FIG. 30 when loaded and positioned in an optional specification recording and/or reproducing apparatus.

In addition, while the end 8b of the first shutter 8 and the end 28b of the second shutter 28 are separately guided by the shutter retainer 14 and shutter retainer 34, respectively, in the second and third embodiments above, the end 8b of the first shutter 8 and the end 28b of the second shutter 28 can both be guided by a single shutter retainer 14 as shown in the second alternative configuration of the second embodiment in FIGS. 30 through 32. With this second alternative configuration of the second embodiment, an extremely practical disc cartridge with a smaller number of parts can be provided at a lower cost.

Embodiment 4

A fourth embodiment of the present invention is described below with reference to the accompanying FIGS. 33 through 38.

Figure 33:
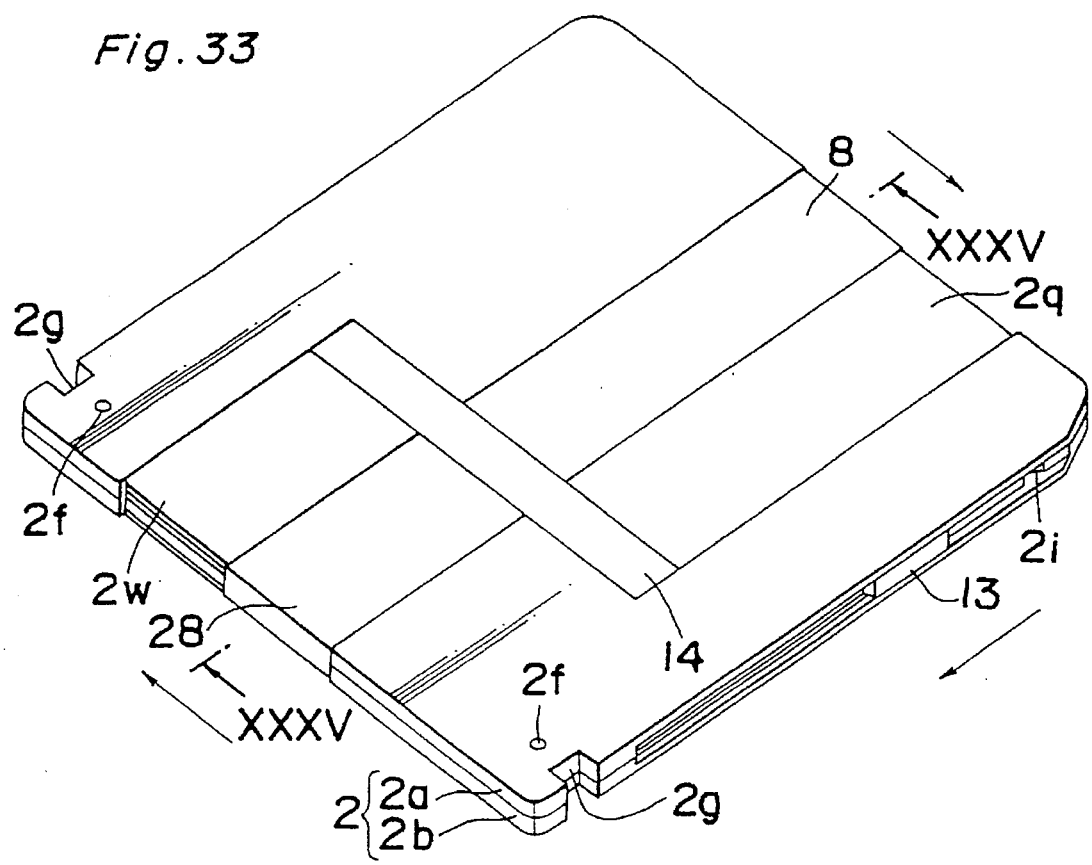
FIG. 33 is a perspective view of a fourth embodiment of a disc cartridge according to the present invention when not loaded in a recording and/or reproducing apparatus.
Figure 34:
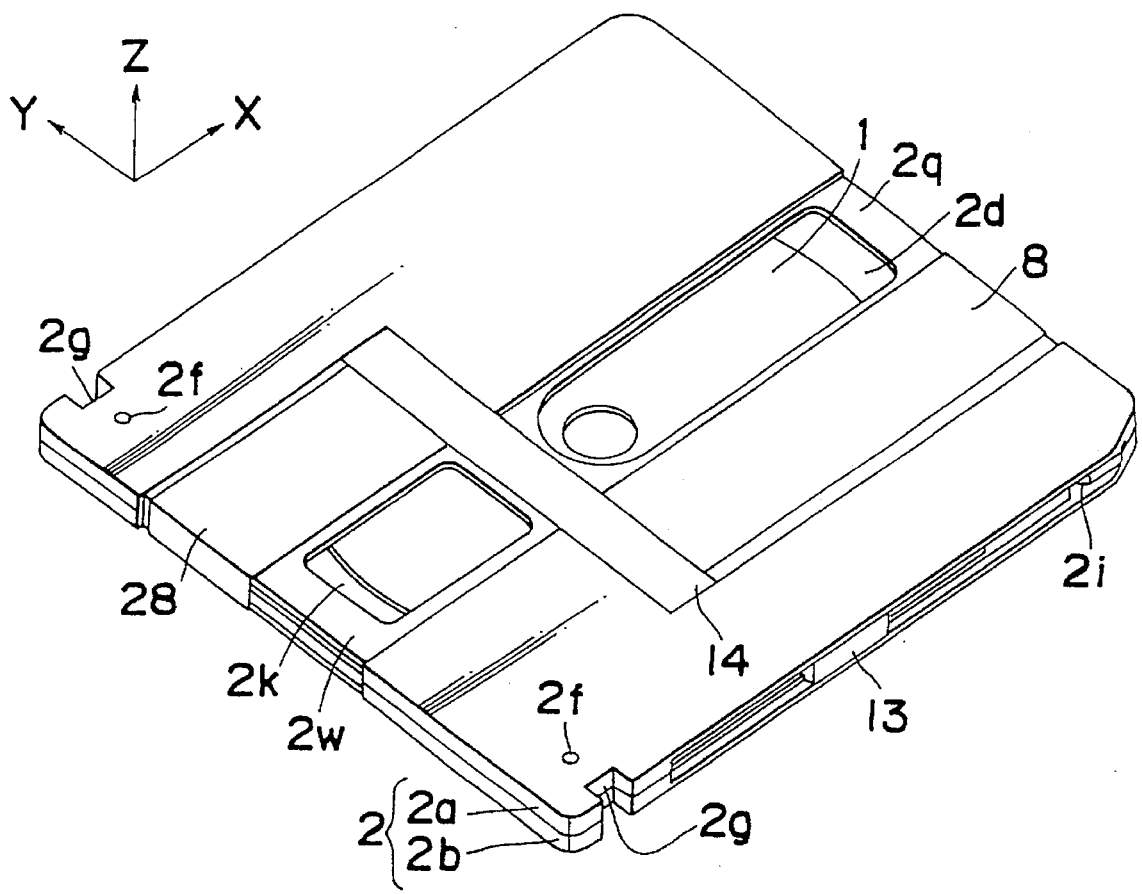
FIG. 34 is a perspective view of the disc cartridge of FIG. 33 when loaded and positioned in the recording and/or reproducing apparatus.
Figure 36:
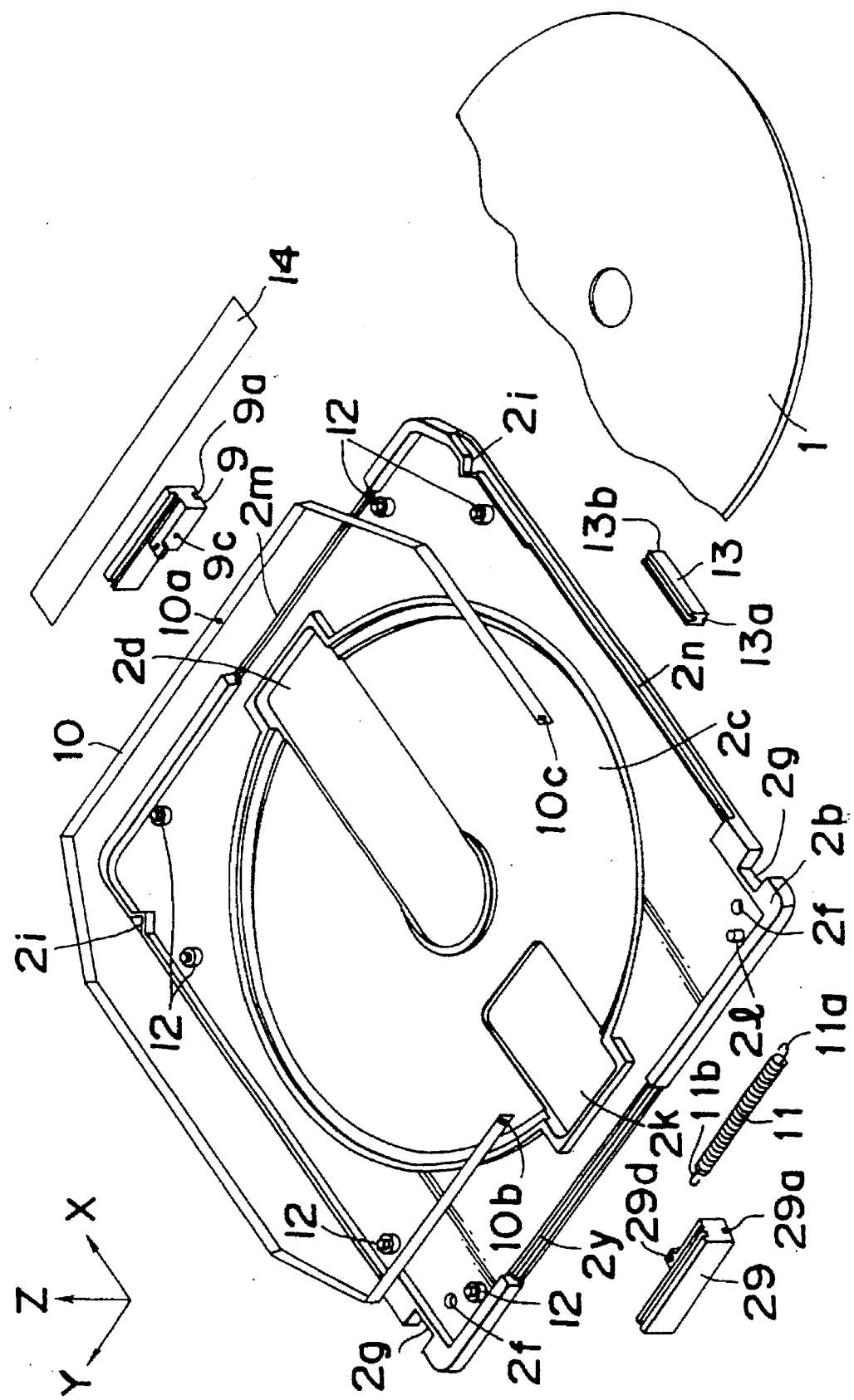
FIG. 36 is a partially exploded perspective view of the disc cartridge of FIG. 33.
Figure 37:
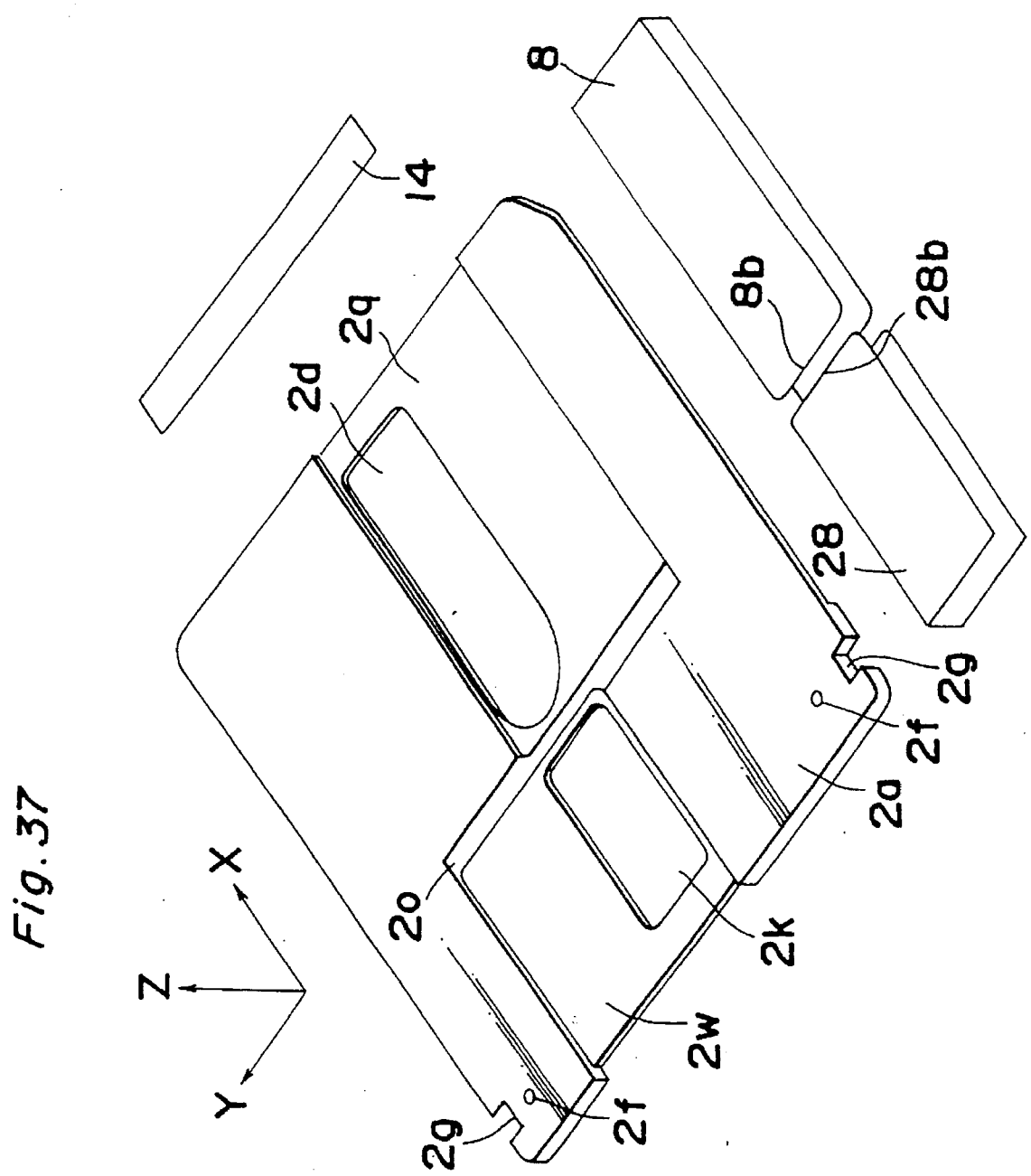
FIG. 37 is another partially exploded perspective view of the disc cartridge of FIG. 33.
Figure 38:
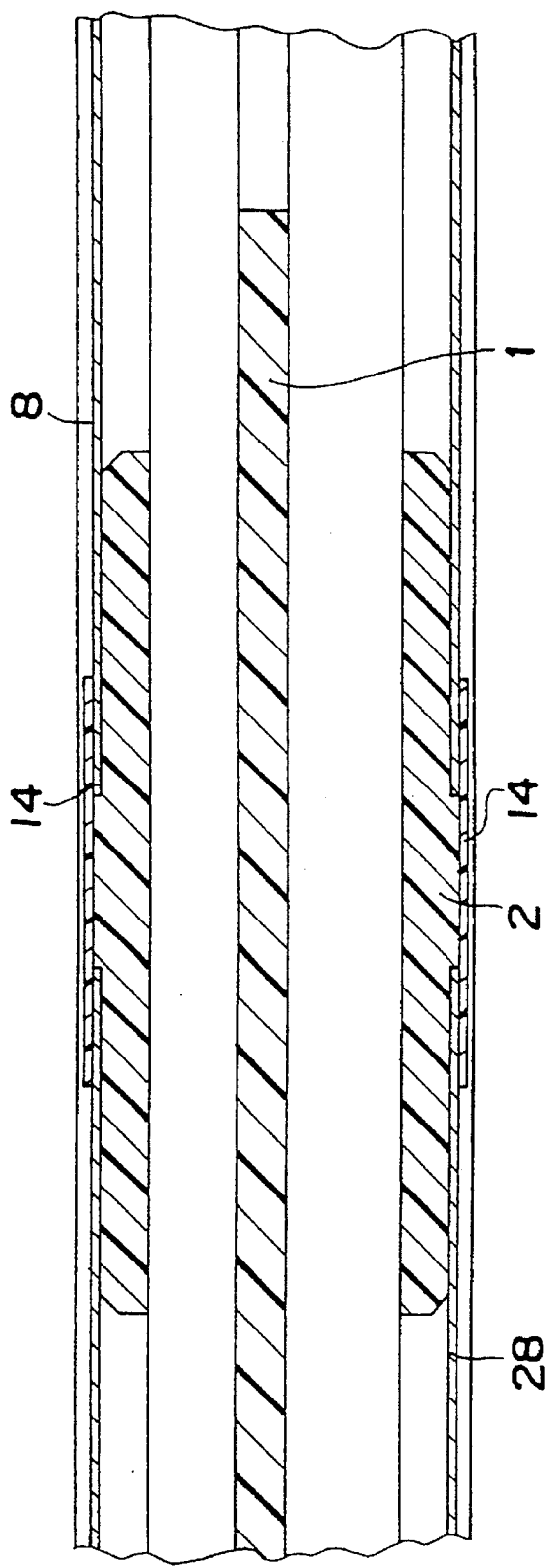
FIG. 38 is an enlarged cross-sectional view of part XXXVIII in FIG. 35.
Figure 44:
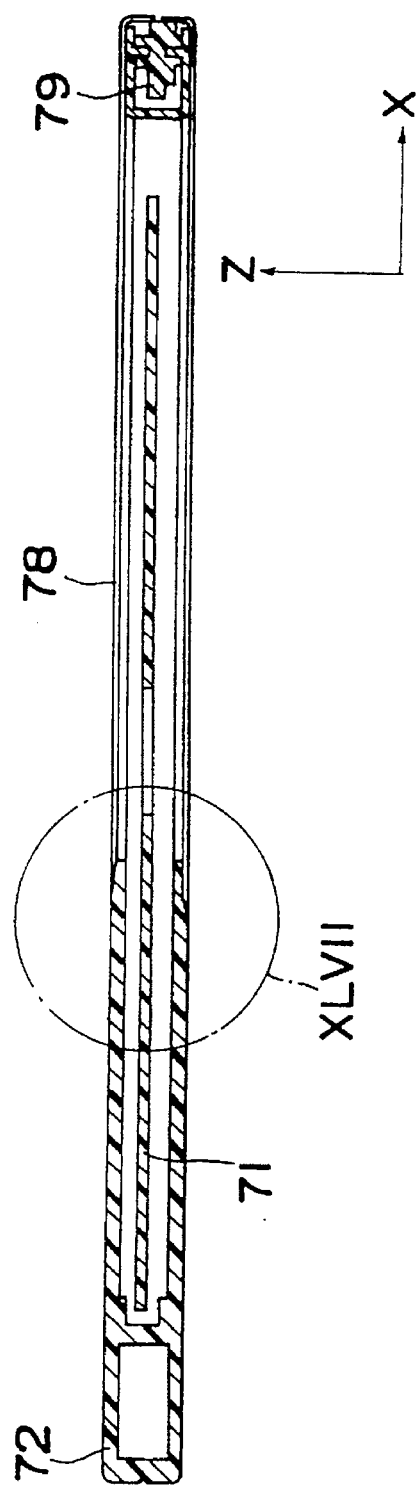
FIG. 44 is a cross-sectional view taken along line XLIV—XLIV in FIG. 42.

Note that the recording and/or reproducing apparatus is not shown in FIGS. 33 and 34.

Referring to FIGS. 33 through 38, the disc 1 has a recording surface on one or both sides.

The casing 2 is formed by a top half 2a and a bottom half 2b fastened together by screws or heat fusion. The top and bottom halves 2a and 2b are molded from ABS resin or another resin to form a disc cavity or pocket 2c in which the disc 1 is held inside the casing 2 when the two halves 2a and 2b are joined. Two apertures 2d and 2k are formed in the casing 2.

The first aperture 2d allows insertion of a first head, a disc motor spindle, and a disc clamp from the apparatus. The second aperture 2k is provided in line with the first aperture 2d, and allows insertion of a second head provided in the apparatus.

The positioning holes 2f, one of which is round and the other oval, are used to correctly position the casing 2 when loaded in the apparatus. The positioning notches 2g are provided for compatibility with stocker type apparatus as mentioned previously. The positioning notches 2g specifically enable chucking in the automatic loading and unloading mechanism. The V-shaped positioning notches 2i enable chucking when the disc cartridge is loaded in the apparatus. The pin 2l is used to hold one end 11a of the spring 11.

The channel 9a in a first shutter guide 9 rides on the rail 2m. The channel 29a in a second shutter guide 29 rides on the rail 2y. The channel 13a in the shutter opener 13 rides on the rail 2n. The positioning channel 2o guides the shutter retainer 14, which is mounted therein. The channels 2q and 2w enabling the first shutter 8 and second shutter 28 to slide in the Y direction are formed at a position lower than the positioning channel 2o.

The shutter 8 opens and closes the first aperture 2d. The shutter guide 9 holds the shutter 8 with screws, for example, with the channel 9a receiving the rail 2m to enable sliding in the Y direction, thus forming a guide whereby the shutter 8 slides in the Y direction relative to the casing 2. The belt 10 has an intermediate portion 10a secured by, for example, a screw to the screw hole 9c in the shutter guide 9, and one end 10b secured by, for example, a screw to the other shutter guide 29, thus linking the first shutter 8 and the second shutter 28. The other end 10c of the belt 10 is also fastened by a screw to the shutter opener 13. The belt 10 is guided by pulleys 12 mounted in the casing 2.

One end 11a of the spring 11 is caught on the pin 2l in the casing 2, and the other end 11b is hooked in the hole 29d of the shutter guide 29. When the disc cartridge is not loaded in the apparatus, i.e., when it is not in use, the spring 11 pulls the first shutter 8 and the second shutter 28 closed over the first and second apertures 2d and 2k, respectively.

The shutter opener 13 fits over the rail 2n, and slides in the X direction. The shutter retainer 14 is fastened to the positioning channel 2o with adhesive, for example, with the end 8b of the first shutter 8 and the end 28b of the second shutter 28 held between the shutter retainer 14 and the channels 2q and 2w, thus preventing the ends 8b and 28b of the shutters 8 and 28 from lifting up in the Z direction.

The second shutter 28 opens and closes the second aperture 2k. The shutter guide 29 holds the second shutter 28 with screws, for example, with the channel 29a receiving the rail 2y to enable sliding in the Y direction, thus forming a guide whereby the second shutter 28 slides in the Y direction relative to the casing 2. This second shutter guide 29 and the first shutter guide 9 are preferably of the same shape. The material of both the shutter guides 9 and 29 is also preferably of polyacetal or another resin providing the lowest possible sliding resistance and wear when moved against the mating material (i.e., the ABS casing 2 in this embodiment).

The operation of the fourth embodiment of the present invention thus comprised is described below.

The operation whereby the disc cartridge is loaded and positioned in an apparatus is described first.

When the disc cartridge is held at the −X axis side thereof and inserted into the apparatus, the positioning notches 2i in the casing 2 are chucked by the holding pins of the cartridge guide mechanism of the apparatus, and the disc cartridge is thus guided in the +X direction, i.e., into the apparatus.

When the end 13b of the shutter opener 13 is caught by a claw provided in the apparatus, a +X direction movement of the casing 2 causes the first shutter opener 13 to move in the −X direction relative to the casing 2. The belt 10 connected to the shutter opener 13 thus pulls the spring 11, and the first shutter 8 moves in the −Y direction and the second shutter 28 moves in the +Y direction to fully open the first and second apertures 2d and 2k, respectively.

The casing 2 is then accurately positioned by the positioning pins or other members of the apparatus using the positioning holes 2f. The disc motor spindle and disc clamp of the apparatus are inserted through the first aperture 2d, and the disc 1 is thus clamped by the clamp coaxially to the disc motor turntable. The first and second heads, one for each of the first and second apertures on each side of the disc 1 in this example for a total four heads, are then inserted through the first and second apertures 2d and 2k. It is thereby possible to record, read, and erase data from the disc.

The operation whereby the disc cartridge is ejected from the apparatus is described next.

When the positioning of the casing 2 by the use of the positioning holes 2f is released, the disc clamp is also released, the disc motor spindle and clamp of the apparatus are removed from the first aperture 2d, and the first and second heads of the apparatus are removed from the first and second apertures 2d and 2k, respectively.

The disc cartridge is then ejected by essentially the reverse of the loading operation. It follows that when the positioning notches 2i are unchucked and the apparatus claw disengages from the end 13b of the shutter opener 13, the restoring force of the spring 11 moves the first shutter 8 in the +Y direction and the second shutter 28 in the −Y direction to completely close the first and second apertures 2d and 2k, respectively. The shutter opener 13 is also moved in the +X direction via the belt 10.

When the disc cartridge is ejected from the apparatus, the permanent tension of the spring 11 on the first and second shutters 8 and 28 keeps both the first and second apertures 2d and 2k closed.

Because two shutters, specifically the first shutter 8 and second shutter 28, are provided for the two in-line apertures (first aperture 2d and second aperture 2k), this disc cartridge can be used with apparatus having plural heads on one or both sides of the disc 1, and is specifically compatible with an apparatus having a total four heads, two heads on each side of the disc with one head inserted into each of two apertures defined on opposite sides (+X side and −X side) of the disc center.

Because two shutters, specifically the first and second shutters 8 and 28, are provided for the two apertures, a highly reliable disc cartridge can be provided whereby flexing of the shutters can be effectively prevented, penetration of dust and other foreign matter into the casing 2 can be minimized, and shutter-disc contact can be prevented.

In addition, because operation of plural shutters is linked by connecting the shutter opener 13 exposed to the outside of the casing 2 to both the first and second shutters 8 and 28 via the belt 10, the shutter opening and closing operation by the apparatus loading mechanism can be simplified, and a high reliability disc cartridge can be provided at a low cost and with a small number of parts.

In addition, a disc cartridge with real practical effectiveness and a simple construction can be provided while efficiently preventing penetration of dust and other foreign matter into the casing 2 because the end 8b of the first shutter 8 and the end 28b of the second shutter 28 are guided by a common shutter retainer 14.

Embodiment 5

A fifth embodiment of the present invention is described below with reference to the accompanying FIG. 39.

This fifth embodiment is an alternative version of the fourth embodiment above, and a detailed description of like parts is therefore omitted below.

Figure 39:
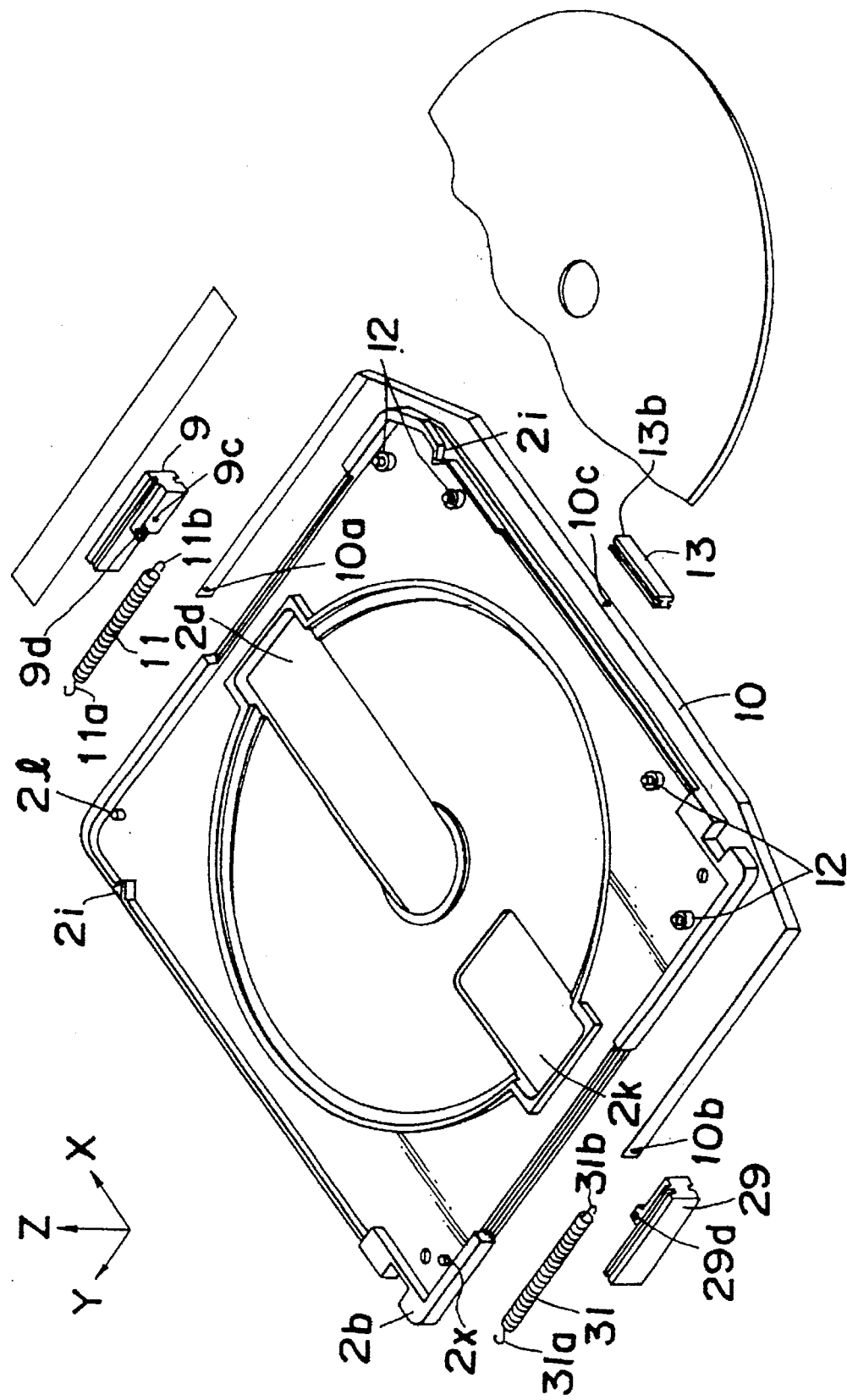
FIG. 39 is a partially exploded perspective view of a fifth embodiment of a disc cartridge according to the present invention.

As shown in FIG. 39, the belt 10 has one end 10a secured by, for example, a screw to the screw hole 9c in the shutter guide 9, and the other end 10b secured by, for example, a screw to the other shutter guide 29, thus linking the first shutter 8 and the second shutter 28. An intermediate portion 10c of the belt 10 is also fastened by a screw to the shutter opener 13. The belt 10 is guided by pulleys 12 mounted in the casing 2.

One end 11a of the spring 11 is caught on the pin 2l in the casing 2, and the other end 11b is hooked in the hole 9d of the shutter guide 9. The spring 11 thus pulls the shutter guide 9 in the +Y direction. When the disc cartridge is not loaded in the apparatus, i.e., when it is not in use, the spring 11 pulls the first shutter 8 and the second shutter 28 closed over the first and second apertures 2d and 2k, respectively.

One end 31a of the spring 31 is caught on a pin 2x in the casing 2, and the other end 31b is hooked in the hole 29d of the shutter guide 29. The spring 31 thus pulls the shutter guide 29 in the +Y direction. The strength of this tension spring 31 is less than that of the first tension spring 11. In other words, the first shutter 8 and the second shutter 28 are closed over the first and second apertures 2d and 2k, by the difference in the strength of the two tension springs 11 and 31.

The operation of the fifth embodiment of the invention thus comprised is described below. Detailed description of operations similarly effected by the fourth and fifth embodiments are omitted.

The operation whereby the disc cartridge is loaded and positioned in the apparatus is described first.

When the end 13b of the first shutter opener 13 is caught by a claw provided in the apparatus, a +X direction movement of the casing 2 causes the first shutter opener 13 to move in the −X direction relative to the casing 2. The belt 10 connected to the shutter opener 13 thus pulls the spring 11, and the first shutter 8 moves in the −Y direction to fully open the first aperture 2d in resistance to the tension of the spring 11. Because the shutter opener 13 is held by the apparatus claw, the tension of the strong spring 11 against the weak spring 31 is effectively released and the restoring force of only the weak spring 31 is exerted on the second shutter 28. As a result, the strength of the weak spring 31 pulls the second shutter 28 in the +Y direction and thus completely opens the second aperture 2k.

The operation whereby the disc cartridge is ejected from the apparatus is described next.

When the positioning notches 2i are unchucked and the apparatus claw disengages from the end 13b of the shutter opener 13, the tension difference of the two springs 11 and 31 moves the first shutter 8 in the +Y direction and the second shutter 28 in the −Y direction to completely close the first and second apertures 2d and 2k, respectively. The shutter opener 13 is also moved in the +X direction via the belt 10.

After the disc cartridge is ejected from the apparatus, the tension difference of the two springs 11 and 31 remains applied to the first shutter 8 and the second shutter 28 to keep both the first and second apertures 2d and 2k closed.

The effects obtained by the fourth embodiment are also obtained by this fifth embodiment.

Figure 40:
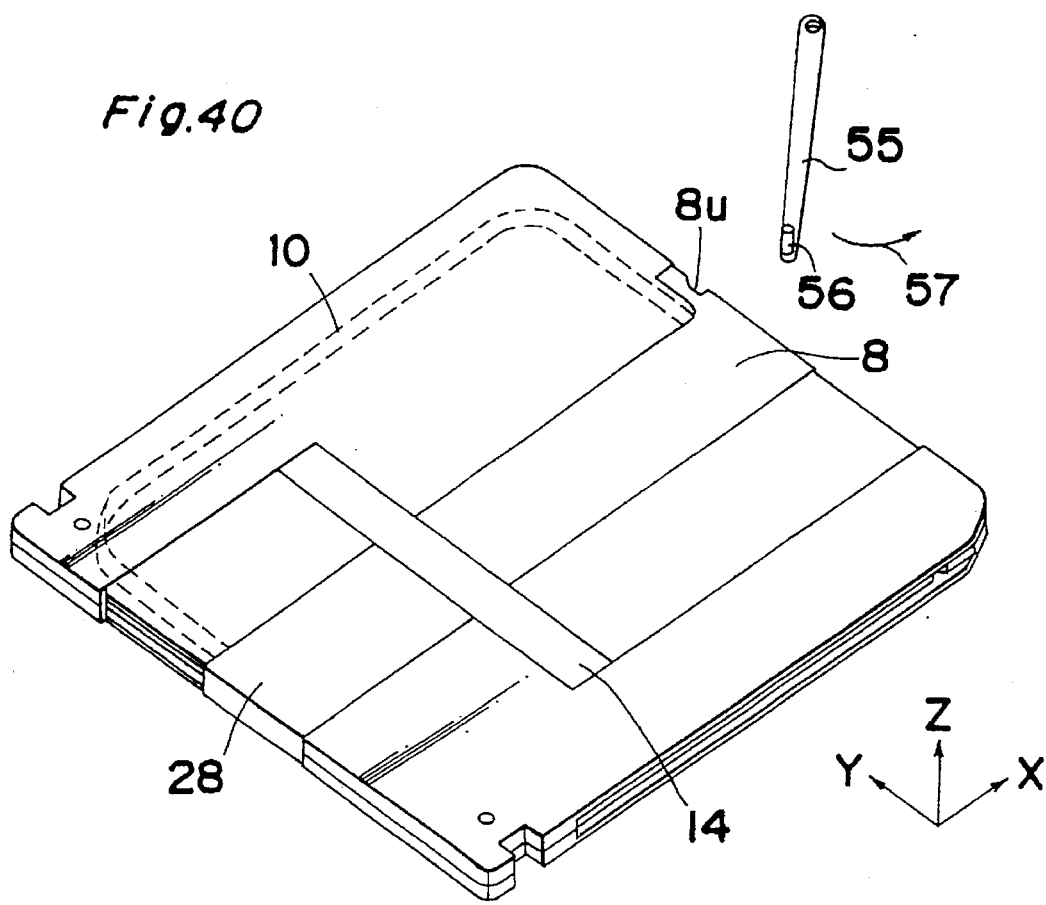
FIG. 40 is a view similar to FIG. 33 but showing a modification of the fourth embodiment.

While the method of opening the first and second apertures 2d and 2k in the fourth and fifth embodiments, i.e., the method of moving the first shutter 8 and second shutter 28, depends upon the shutter opener 13, an alternative method whereby the first and second shutters 8 and 28 are linked by the belt 10 can also be used. This is accomplished by an alternative configuration of the fourth embodiment in FIG. 40. According to this modification, a recess 8u is provided in the first shutter 8 as a shutter opening means, and a pin 56 is provided on one end of a shutter opening lever 55, which is pivotally mounted in the apparatus. By inserting the disc cartridge in the +X direction, the pin 56 of the shutter opening lever 55 is initially brought into the recess 8u of the first shutter 8, and the shutter opening lever 55 is subsequently rotated in a direction shown by an arrow 57, thereby moving the first and second shutters 8 and 28 together.

Figure 41:
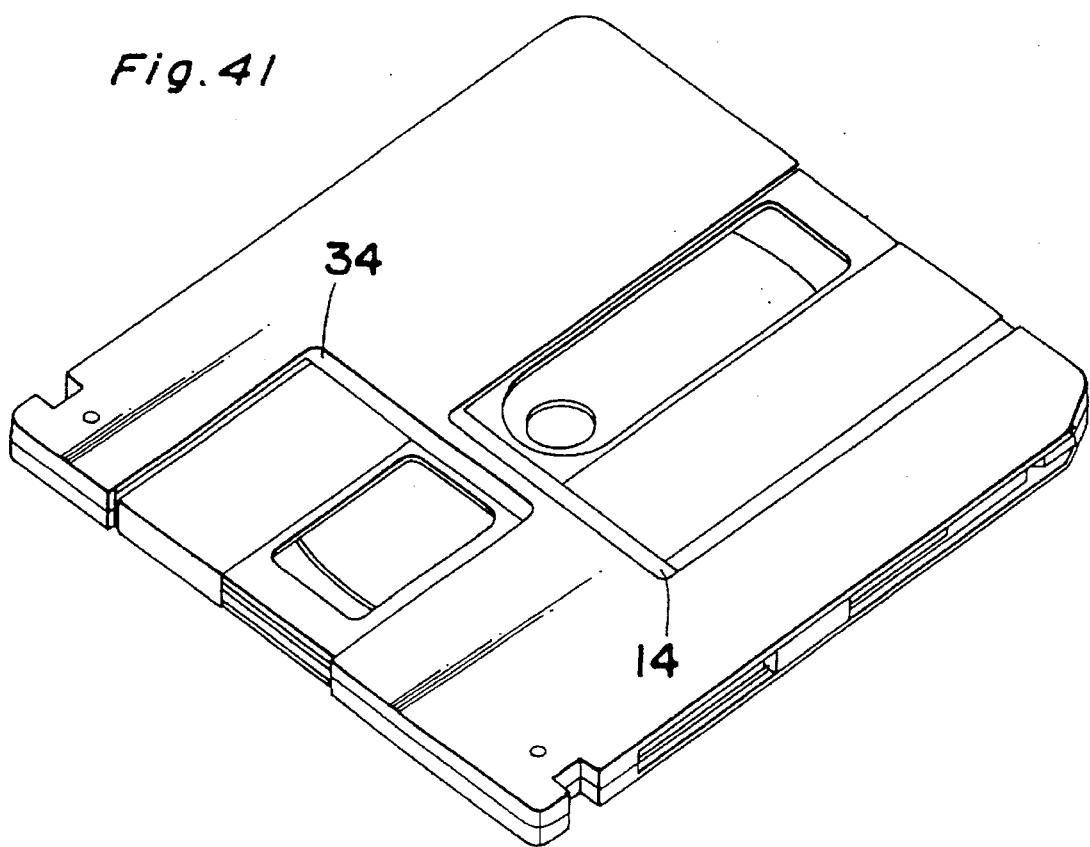
FIG. 41 is a view similar to FIG. 34 but showing another modification of the fourth embodiment.

In addition, while the end 8b of the first shutter 8 and the end 28b of the second shutter 28 are guided by the common shutter retainer 14 in the fourth and fifth embodiments, the end 8b of the first shutter 8 and the end 28b of the second shutter 28 can be separately guided by shutter retainers 14 and 34, respectively, as shown in FIG. 41 indicating a second alternative configuration of the fourth embodiment.

Embodiment 6

A sixth embodiment of the present invention is described below with reference to the accompanying FIGS. 42 through 47. In this embodiment, the term "conventional" is used below to distinguish apparatuses having a single head accessing the disc stored in the disc cartridge through a single aperture from those having plural heads and referred to in the above embodiments.

Figure 42:
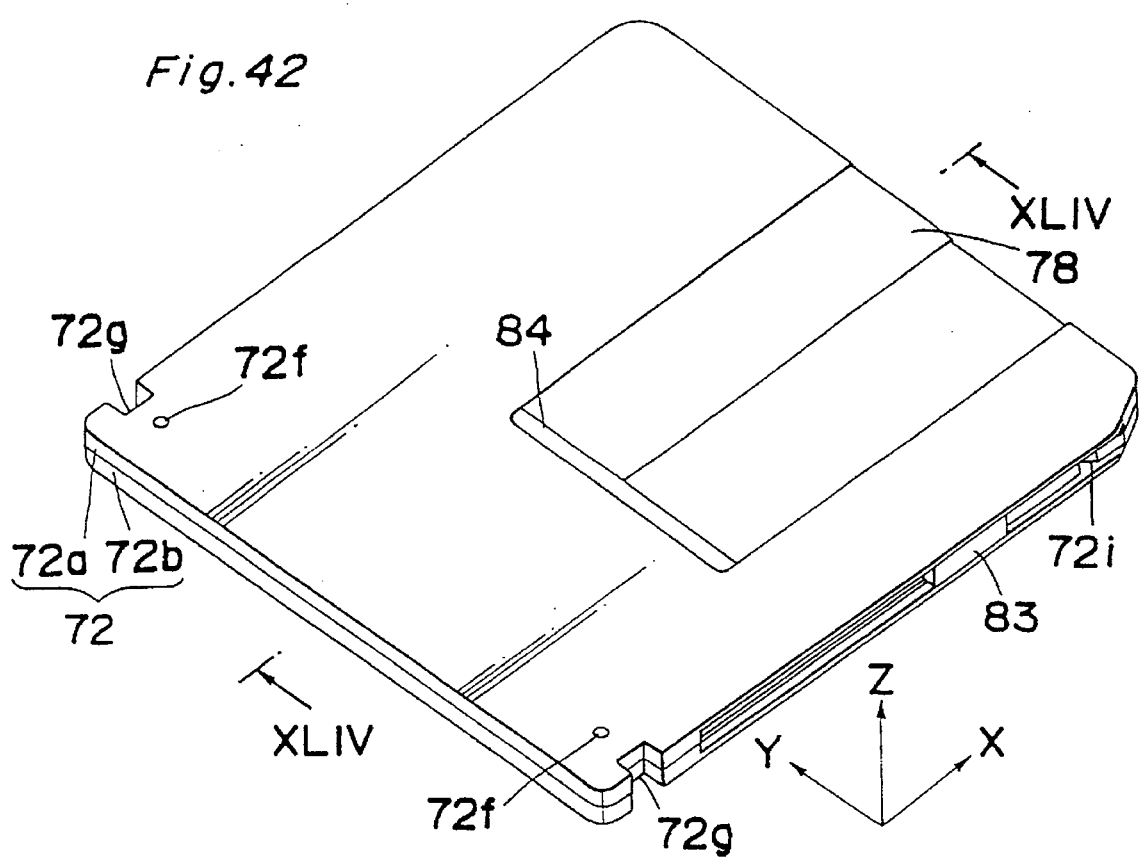
FIG. 42 is a perspective view of a sixth embodiment a disc cartridge according to the present invention when not loaded in a conventional recording and/or reproducing apparatus.
Figure 43:
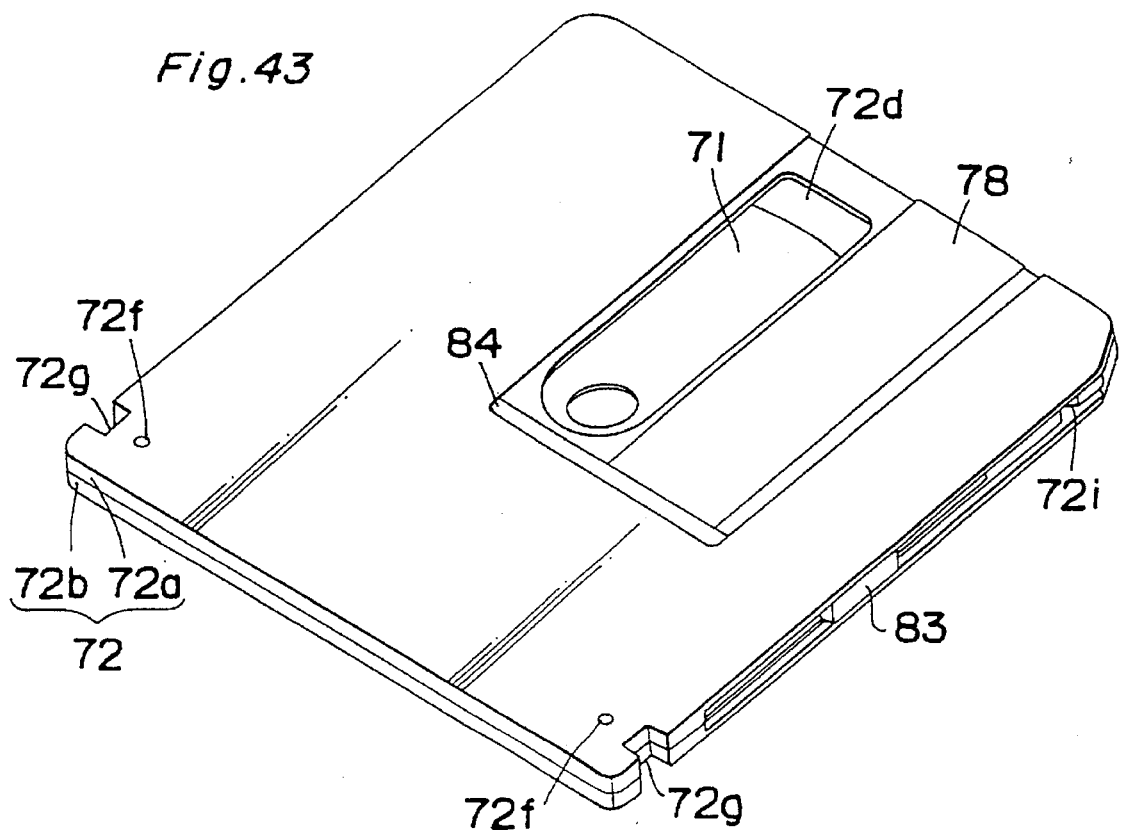
FIG. 43 is a perspective view of the disc cartridge of FIG. 42 when loaded and positioned in the conventional recording and/or reproducing apparatus.
Figure 45:
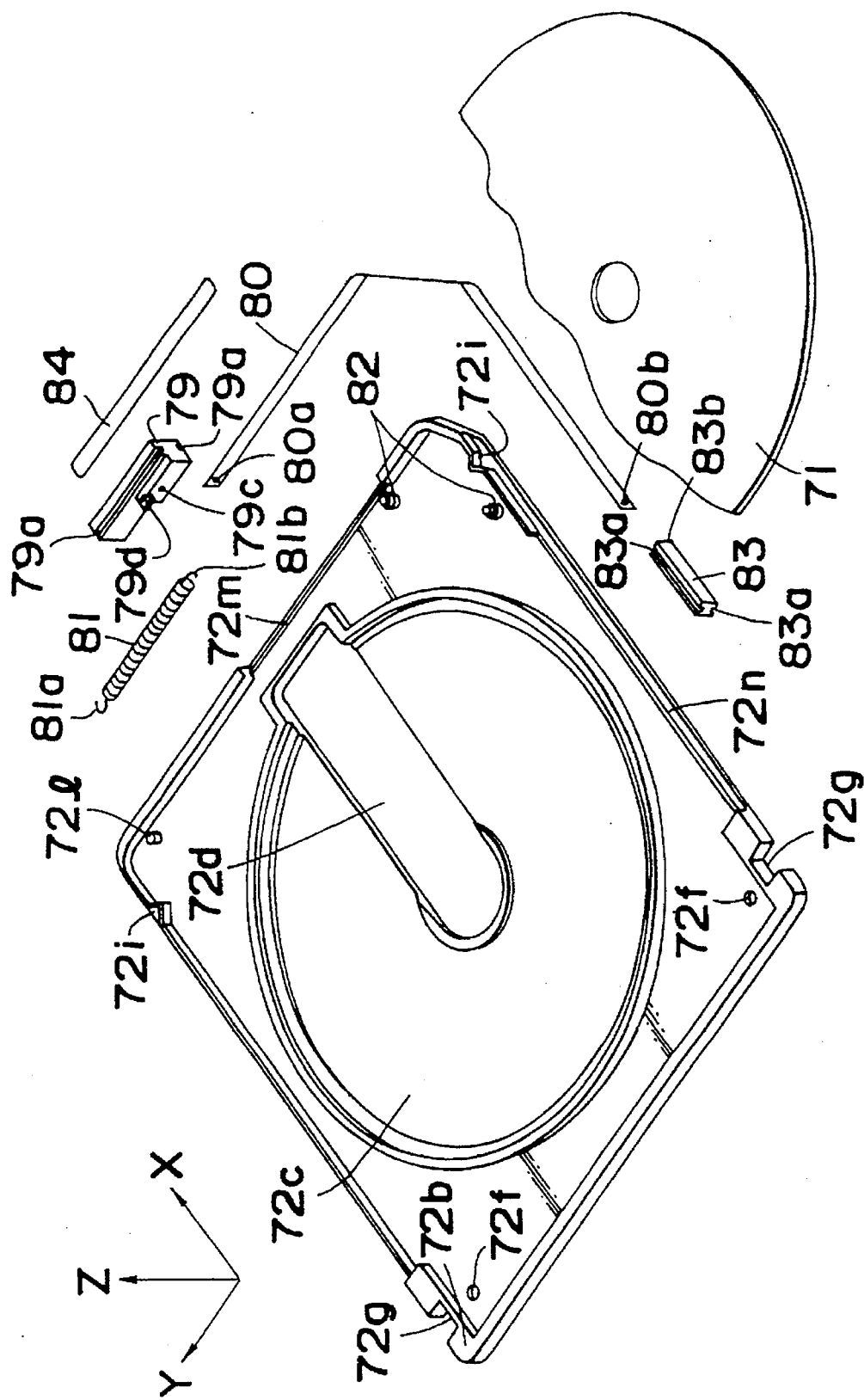
FIG. 45 is a partially exploded perspective view of the disc cartridge of FIG. 42.
Figure 46:
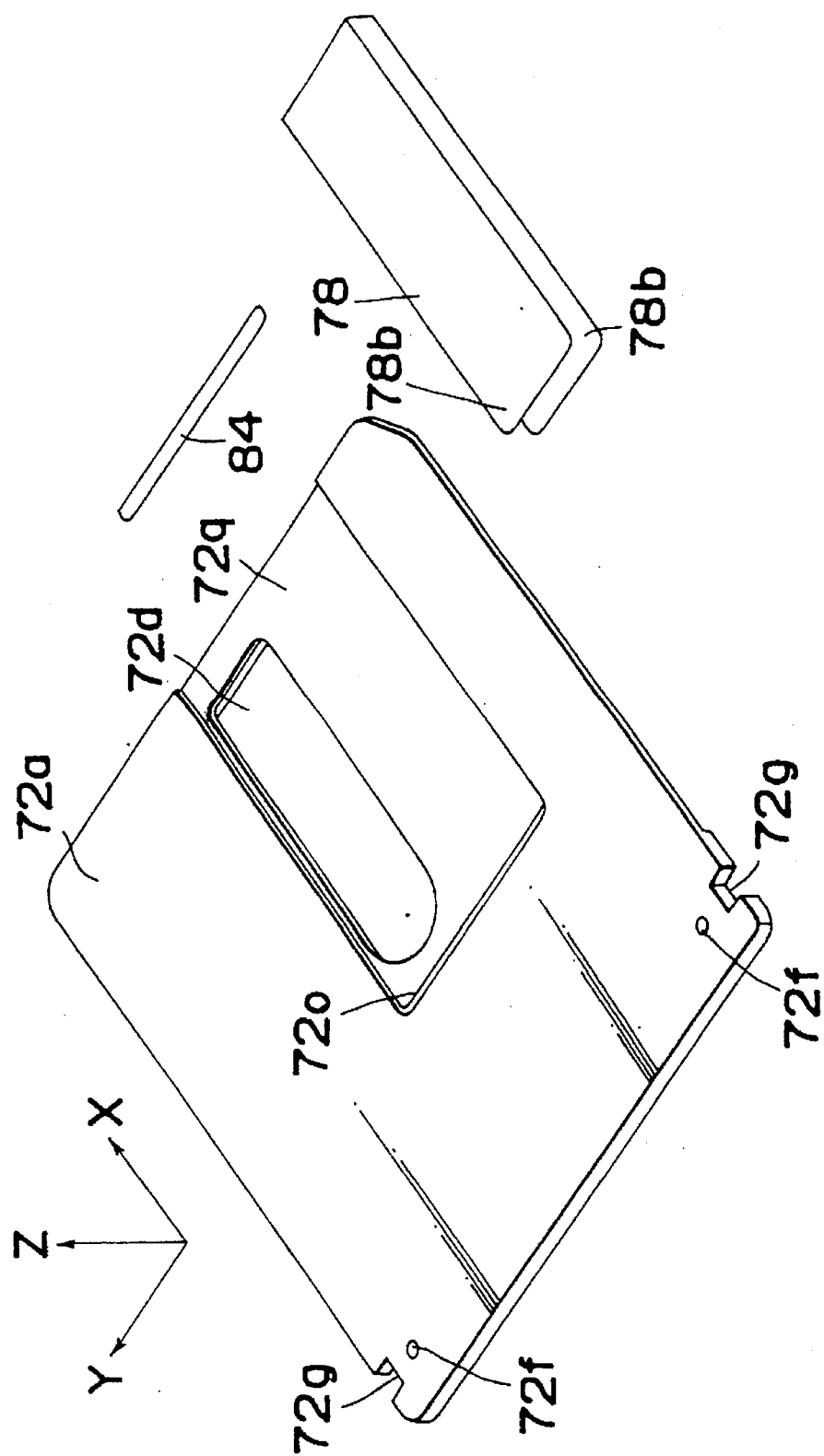
FIG. 46 is another partially exploded perspective view of the disc cartridge of FIG. 42.
Figure 47:
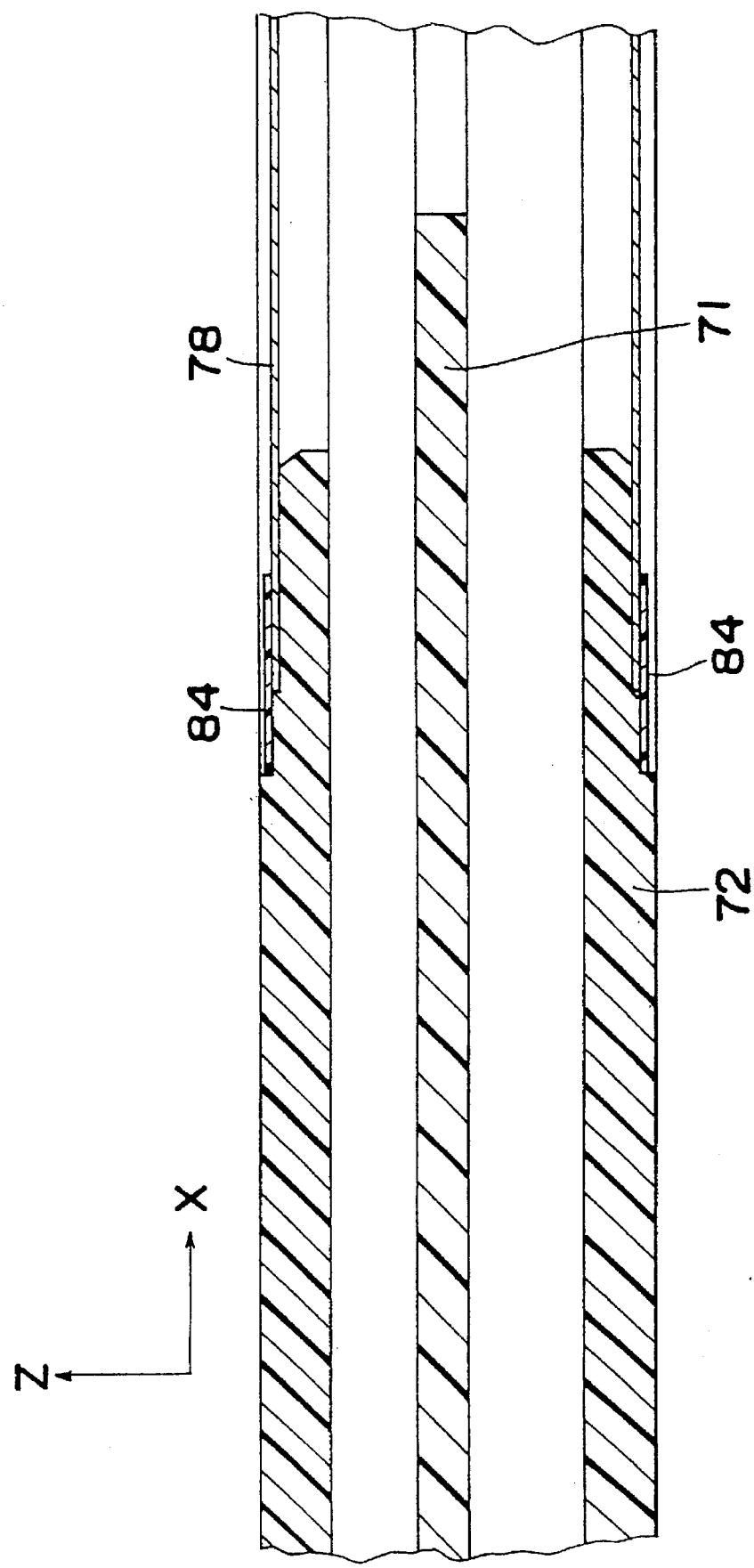
FIG. 47 is an enlarged cross-sectional view of part XLVII in FIG. 44.

Note that the recording and/or reproducing apparatus is not shown in FIGS. 42 and 43.

The disc cartridge described in the second embodiment above is compatible with the loading and unloading mechanism of the disc cartridge shown in FIGS. 42 through 47, and because the construction thereof and the loading and unloading operations have already been described in connection with the second embodiment above, a description in connections with the sixth embodiment is omitted.

The construction of the sixth embodiment is described below together with a description of how the disc cartridge of the second embodiment is compatible therewith.

Referring to FIGS. 42 through 47, a disc 71 has a recording surface on one or both sides, and the inside and outside diameters of the disc 71 are the same as those of the disc 1.

A casing 72 is formed by a top half 72a and a bottom half 72b fastened together by screws or heat fusion. The top and bottom halves 72a and 72b are molded from ABS resin or another resin to form a disc cavity or pocket 72c in which the disc 71 (and therefore the disc 1 of the second embodiment) is held inside the casing 72 when the two halves 72a and 72b are joined. Note that, at the minimum, the width, i.e., the Y direction, dimension of the casing 72 is the same as the width, i.e., the Y direction, dimension of the casing 2 of the second embodiment.

An aperture 72d allows insertion of a conventional head, a conventional disc motor spindle, and a conventional disc clamp from the conventional apparatus, and is the same as the first aperture 2d.

Positioning holes 72f, one of which is round and the other oval, are used to correctly position the casing 72 when loaded in the apparatus, and are the same as the positioning holes 2f. Positioning notches 72g are provided for compatibility with stocker type apparatus as mentioned previously. The positioning notches 72g specifically enable chucking in the automatic loading and unloading mechanism, and are the same as the positioning notches 2g. V-shaped positioning notches 72i enable chucking when the disc cartridge is loaded in the conventional apparatus, and are the same as the positioning notches 2i. A pin 72l is used to hold one end 81a of a spring 81, and is the same as the pin 2l.

A channel 79a in a shutter guide 79 rides on a rail 72m, which is the same as the rail 2m. A channel 83a in a shutter opener 83 rides on a rail 72n, which is the same as the rail 2n. A positioning channel 72o guides a shutter retainer 84, which is mounted therein, and the positioning channel 72o is the same as the positioning channel 2o. A channel 72q enabling a shutter 78 to slide in the Y direction is formed at a position lower than the positioning channel 72o, and is the same as the channel 2q.

The shutter 78 opens and closes the aperture 72d, and is the same as the shutter 8. The shutter guide 79 holds the shutter 78 with screws, for example, with the channel 79a receiving the rail 72m to enable sliding in the Y direction, thus forming a guide whereby the shutter 78 slides in the Y direction relative to the casing 72. The shutter guide 79 is the same as the shutter guide 9. The shutter guide 79 is preferably of polyacetal or another resin providing the lowest possible sliding resistance and wear when moved against the mating material (i.e., the ABS casing 72 in this embodiment).

A belt 80 has one end 80a secured by, for example, a screw to a screw hole 79c in the shutter guide 79, and the other end 80b secured by, for example, a screw to the shutter opener 83. The belt 80 is the same as the belt 10, and is guided by pulleys 82 mounted in the casing 72. These pulleys 82 are the same as the pulleys 12.

One end 81a of the spring 81 is caught on the pin 72l in the casing 72, and the other end 81b is hooked in a hole 79d of the shutter guide 79. When the disc cartridge is not loaded in the conventional apparatus, i.e., when it is not in use, the spring 81 pulls the shutter 78 closed over the aperture 72d. The spring 81 is the same as the spring 11.

The shutter opener 83 fits over the rail 72n, and slides in the X direction, and is the same as the shutter opener 13. The shutter retainer 84 is fastened to the positioning channel 72o with adhesive, for example, with the end 78b of the shutter 78 held between the shutter retainer 84 and the channel 72q, thus preventing the end 78b of the shutter 78 from lifting up in the Z direction. The shutter retainer 84 is the same as the shutter retainer 14. The shutter retainer 84 is set at a position corresponding to the non-data area of the disc 71.

The operation of the sixth embodiment of the present invention thus comprised is described below.

The operation whereby the disc cartridge is loaded and positioned in the conventional apparatus is described first.

It is to be noted that the conventional apparatus has only one head corresponding to the position of the aperture 72d on one side of the disc 71. (Note that while in nearly all cases there is only one conventional head that can be inserted into the aperture 72d in this conventional apparatus, the present invention shall not be so limited and is compatible with plural heads insofar as the plural heads can be inserted into the aperture 72d. For example, there can be two heads, one inserted into an aperture on each side of the disc, or two heads can be inserted into the aperture on one side of the disc.)

When the disc cartridge is held at the −X axis side thereof and inserted into the conventional apparatus, the positioning notches 72i in the casing 72 are chucked by the holding pins of the cartridge guide mechanism of the apparatus, and the disc cartridge is thus guided in the +X direction, i.e., into the apparatus.

When the end 83b of the shutter opener 83 is caught by a claw provided in the −Y side of the apparatus, a +X direction movement of the casing 72 causes the shutter opener 83 to move in the −X direction relative to the casing 72. The belt 80 connected to the shutter opener 83 thus pulls the spring 81, and the shutter 78 moves in the −Y direction to fully open the aperture 72d.

The casing 72 is then accurately positioned by, for example, positioning pins of the conventional apparatus using the positioning holes 72f. The disc motor spindle and disc clamp of the apparatus are inserted through the aperture 72d, and the disc 71 is thus clamped by the clamp coaxially to the disc motor turntable. The one head is then inserted through the aperture 72d. It is thereby possible to record, read, and erase data from the disc.

The operation whereby the disc cartridge is ejected from the conventional apparatus is described next.

When the positioning of the casing 72 by the use of the positioning holes 72f is released, the disc clamp is also released, the disc motor spindle and clamp of the apparatus are removed from the aperture 72d, and the head is removed from the aperture 72d.

The disc cartridge is then ejected by essentially the reverse of the loading operation. It follows that when the positioning notches 72i are unchucked and the apparatus claw disengages from the end 83b of the shutter opener 83, the restoring force of the spring 81 moves the shutter 78 in the +Y direction to completely close the aperture 72d. At the same time, the shutter opener 83 is moved in the +X direction via the belt 80.

When the disc cartridge is ejected from the apparatus, the permanent tension of the spring 81 on the shutter 78 keeps the aperture 72d closed.

The disc cartridge of the second embodiment can also be mounted and ejected in the conventional apparatus in precisely the same manner as the disc cartridge of the sixth embodiment. This is because the positioning holes 2f employed as the positioning means, the first aperture 2d, and the shutter opener 13 are identical to the positioning holes 72f, the aperture 72d, and the shutter opener 83, respectively. The disc cartridge of the second embodiment differs in the addition of the second shutter 28 enabling the second aperture 2k to be opened and closed. Detailed descriptions of the loading and unloading operations of the disc cartridge according to the second embodiment in the conventional apparatus are therefore omitted.

Therefore, by providing positioning holes 2f as the positioning means identical to the positioning holes 72f functioning as the positioning means in the conventional apparatus, the disc cartridge is compatible with apparatuses having plural heads on one or both sides of the disc, and a disc cartridge that is compatible not only with apparatuses having plural heads but also with conventional apparatuses having a single head can be provided.

In addition, by providing the end 13b functioning as the engagement member of the shutter opener 13 in the same shape as the end 83b functioning as the engagement member of the shutter opener 83, the disc cartridge is compatible with the conventional shutter opening and closing mechanism, and a disc cartridge for which the shutter can be opened and closed automatically when loaded in the plural head apparatus and even conventional apparatus can be provided.

It is to be noted that while the first aperture 2d is identical to the aperture 72d of the sixth embodiment, the former can be larger than the latter.

In addition, the first shutter opener 13 is the same as the shutter opener 83 in this sixth embodiment, but it is sufficient if the end 13b and end 83b exposed from the casing and functioning as the engagement member with the claw of the conventional apparatus have the same shape and relative position.

The belt 80 and spring 81 in the sixth embodiment are the same as the belt 10 and spring 11, but these may be modified as required.

Furthermore, compatibility is assured between the disc cartridge of the second embodiment and that of the sixth embodiment in the loading and unloading operations, but compatibility between the disc cartridge according to one of the first to fifth embodiments and the disc cartridge according to the sixth embodiment can also be assured in the loading and unloading operations.

The type of disc 1 or 71 housed in the casing 2 or 72 is not limited in the first to sixth embodiments above, and any type of disc can be used, including, for example, phase-change erasable optical discs, magneto-optical discs, and removable magnetic discs.

In the first to sixth embodiments above, a mechanical clamp method is used to secure the disc 1 to the disc motor turntable wherein the disc 1 is clamped between the turntable and a clamp inserted through the aperture 2d or 72d in the top half 2a or 72a of the casing 2 or 72 but other clamping methods can be alternatively used. For example, a magnetic clamping method can be used wherein a magnet or magnets are provided on the turntable to magnetically attract the disc. In this case, the aperture defined in the top half at a position corresponding to the clamp insertion area, i.e., around the center of the disc is no longer required.

It is important to note the recent development of apparatuses for recording and/or reproducing digitally encoded motion pictures using NTSC composite signals, component signals, or HDTV-format signals. These apparatuses feature an improved data transfer rate by providing plural heads on one or both sides of the disc, and recording/reproducing the data by simultaneously accessing plural data blocks with plural heads. Other apparatuses have been developed for simultaneously accessing plural channels in the recording/reproducing of audio signals, for example, by providing plural heads on one or both sides of the disc. Disc cartridges according to the present invention are suited for use with such apparatuses capable of recording and/or reproducing motion pictures at a high data transfer rate, and with apparatuses capable of simultaneously recording and/or reproducing audio signals from plural channels because they enable the insertion of plural heads through one or plural apertures.

Apparatuses offering a variety of optional capabilities by providing first and second heads on one or both sides of the disc to separately record/reproduce various types of data signals, including image information, have also been developed. One method used in such apparatuses moves the second head to a second data access point during data recording/reproduction by the first head to enable continuous, uninterrupted recording/reproduction by the second head immediately after recording/reproduction by the first head is completed. It is also possible to record data with the first head and simultaneously reproduce the recorded data with the second head. It should be noted that apparatuses have been developed and marketed in two versions, a standard specifications version equipped with only the first head, and an optional specifications version equipped with both the first and second heads enabling the functions described above. Disc cartridges according to the second and third embodiments of the present invention are compatible with apparatuses available in such standard and optional specifications versions.

Conventional apparatuses having a conventional head, and in most cases only one head, are widely available as image filing systems for business, computer storage systems, and CD players. This makes it extremely important for new apparatuses offering higher performance by having plural heads on one or both disc sides to possess read or read/write compatibility with existing discs used in the conventional apparatuses. To read or read/write with these discs in a new apparatus, the disc is removed from the casing and loaded into a new casing. Of course, it may also be necessary to read or read/write this disc assembled into the new casing in the conventional apparatus. It is therefore extremely important for the new casing housing the disc to be compatible with the loading/unloading mechanism used with the existing casing in the conventional apparatus. The disc cartridge according to the present invention is therefore suited for use with new apparatuses offering read or read/write compatibility with the discs used in these conventional apparatuses in the large markets for business image filing systems, computer storage systems, and CD players.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A disc cartridge comprising:

a casing having first and second opposing walls defining a disc cavity therebetween for accommodating a disc and also having a first aperture extending through at least one of said walls, said first aperture being sized to allow a disc motor spindle and a first head of a recording and/or reproducing apparatus to be inserted therethrough when said disc cartridge is loaded in such an apparatus, said walls also defining a channel in the casing;

a shutter extending longitudinally substantially across a full length of said casing, said shutter being slidable in said channel between open and closed positions, and said shutter in said closed position closing said first aperture; and a shutter retainer secured to said casing at a generally middle portion of the cartridge, said shutter retainer being positioned on top of a generally middle portion of said shutter with respect to the longitudinal direction of the shutter for preventing flexing of said shutter in the longitudinal direction and cooperating with said generally middle portion of the shutter located at said generally middle portion of the cartridge to guide and retain said shutter in said channel.

2. The disc cartridge according to claim 1, wherein said casing further has a second aperture extending through at least one of said walls, said second aperture being aligned with, and on one side of a center of the disc cartridge opposite to, said first aperture, said second aperture being sized to allow a second head of the recording and/or reproducing apparatus to be inserted therethrough when said disc cartridge is loaded in such an apparatus, and wherein said shutter also closes said second aperture when in the closed position.

3. The disc cartridge according to claim 1, wherein one of said walls has a retainer channel in an outer surface thereof, and said shutter retainer is received in said retainer channel as extending over the generally middle portion of said shutter.

4. A disc cartridge comprising:

a casing having first and second opposing walls defining a disc cavity therebetween for accommodating a disc and also having a first aperture extending through at least one of said walls and a second aperture extending through the same said at least one of the walls as the first aperture, said first aperture being sized to allow a disc motor spindle and a first head of a recording and/or reproducing apparatus to be inserted therethrough when said disc cartridge is loaded in such an apparatus, the second aperture being sized to allow a second head of the recording and/or reproducing apparatus to be inserted therethrough when said disc cartridge is loaded in such an apparatus, and at least one of said walls defining first and second channels in said casing;

a first shutter mounted to said casing for sliding movement between open and closed positions, said first shutter in said closed position closing said first aperture;

a second shutter mounted to said casing for sliding movement between open and closed positions, said second shutter in said closed position thereof closing said second aperture, and said shutters being received in said first and second channels, respectively;

shutter opening means, connected to said first and second shutters, for opening said first and second shutters upon insertion of said disc cartridge into the recording and/or reproducing apparatus, wherein said shutter opening means is slidably mounted to said casing and exposed to the outside of said casing at opposite sides of said casing with respect to the direction in which said disc cartridge is to be inserted into the recording and/or reproducing apparatus; and a shutter retainer guiding ends of said first and second shutters to retain said shutters in said channels, respectively.

5. A disc cartridge comprising:

a casing having first and second opposing walls defining a disc cavity therebetween for accommodating a disc and also having a first aperture extending through at least one of said walls and a second aperture extending through the same said at least one of said walls as the first aperture, said first aperture being sized to allow a disc motor spindle and a first head of a recording and/or reproducing apparatus to be inserted therethrough when said disc cartridge is loaded in such an apparatus, the second aperture being sized to allow a second head of the recording and/or reproducing apparatus to be inserted therethrough when said disc cartridge is loaded in such an apparatus;

a first shutter mounted to said casing for sliding movement between open and closed positions, said first shutter in said closed position closing said first aperture;

a second shutter mounted to said casing for sliding movement between open and closed positions, said second shutter in said closed position thereof closing said second aperture;

discrete first and second shutter opening members slidably mounted to said casing and exposed to the outside of said casing at opposite sides of said casing with respect to a direction in which said disc cartridge is to be inserted into the recording and/or reproducing apparatus, both of said shutter opening members being movable in a direction opposite to said direction of insertion, said first shutter opening member being connected to said first shutter so as to place said first shutter in the open position thereof when moved in said direction opposite to the direction of insertion, and said second shutter opening member being connected to said second shutter so as to place said second shutter in the open position thereof when moved in said direction opposite to the direction of insertion; and a shutter retainer positioned over adjacent ends of said first and second shutters and guiding said shutters to retain said shutters.

6. A disc cartridge comprising:

a casing having first and second opposing walls defining a disc cavity therebetween for accommodating a disc and also having a first aperture extending through at least one of said walls and a second aperture extending through the same said at least one of the walls as the first aperture, said first aperture being sized to allow a disc motor spindle and a first head of a recording and/or reproducing apparatus to be inserted therethrough when said disc cartridge is loaded in such an apparatus, the second aperture being sized to allow a second head of the recording and/or reproducing apparatus to be inserted therethrough when said disc cartridge is loaded in such an apparatus;

a first shutter mounted to said casing for sliding movement between open and closed positions, said first shutter in said closed position closing said first aperture;

a second shutter mounted to said casing for sliding movement between open and closed positions, said second shutter in said closed position thereof closing said second aperture;

a shutter retainer positioned over adjacent ends of said first and second shutters to retain said shutters on said casing and guide sliding movement of said shutters; and a shutter opening member connected to both of said first and second shutters, said shutter opening member being slidably mounted to said casing and exposed to the outside of said casing.

7. A disc cartridge comprising:

a disc having a data area at which data is recordable and/or reproducible and a non-data area at which data cannot be recorded, said non-data area being located radially inwardly of said data area;

a casing having first and second walls defining therebetween a disc cavity in which said disc is rotatably supported, said casing also having a first aperture extending through at least one of said walls, said first aperture being sized to allow a disc motor spindle and a first head of a recording and/or reproducing apparatus to be inserted therethrough when said disc cartridge is loaded in such an apparatus, said walls also defining a channel in the casing;

a shutter extending longitudinally substantially across a full length of said casing, said shutter being slidable in said channel between open and closed positions, and said shutter in said closed position closing said first aperture; and a shutter retainer secured to said casing and located directly over the non-data area of said disk at a generally middle portion of the cartridge, said shutter retainer being positioned on top of a generally middle portion of said shutter with respect to the longitudinal direction of the shutter for preventing flexing of said shutter in the longitudinal direction, and said retainer guiding and retaining said shutter in said channel.

8. The disc cartridge according to claim 7, wherein one of said walls has a retainer channel in an outer surface thereof, and said shutter retainer is received in said retainer channel as extending over the generally middle portion of said shutter.

* * * * *